(12) United States Patent
Katsuta et al.

(10) Patent No.: US 9,013,388 B2
(45) Date of Patent: Apr. 21, 2015

(54) LIQUID CRYSTAL DISPLAY DEVICE AND DISPLAY APPARATUS

(75) Inventors: Shohei Katsuta, Osaka (JP); Tsuyoshi Kamada, Osaka (JP); Seiji Ohhashi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 167 days.

(21) Appl. No.: 13/823,146

(22) PCT Filed: Sep. 15, 2011

(86) PCT No.: PCT/JP2011/071134
§ 371 (c)(1),
(2), (4) Date: Mar. 14, 2013

(87) PCT Pub. No.: WO2012/039345
PCT Pub. Date: Mar. 29, 2012

(65) Prior Publication Data
US 2013/0176198 A1  Jul. 11, 2013

(30) Foreign Application Priority Data
Sep. 22, 2010  (JP) .................. 2010-212601

(51) Int. Cl.
| G09G 3/36 | (2006.01) |
| G03B 21/00 | (2006.01) |
| H04N 13/00 | (2006.01) |
| H04N 13/04 | (2006.01) |
| G09G 3/00 | (2006.01) |
| G02B 27/26 | (2006.01) |
| G02F 1/13363 | (2006.01) |

(52) U.S. Cl.
CPC .............. G09G 3/001 (2013.01); G09G 3/003 (2013.01); G09G 3/3677 (2013.01); H04N 13/0434 (2013.01); G02B 27/26 (2013.01); *G02F 2001/133631* (2013.01)

(58) Field of Classification Search
CPC ............... G09G 3/36; G09G 2300/04; G09G 2300/0439; G09G 2300/08; G02F 1/00; G02F 1/1335; G02F 27/02; H04N 2013/00; H04N 2213/001

USPC ............. 345/87, 90, 92; 353/7, 8; 349/42, 51, 349/54, 57, 58
See application file for complete search history.

(56) References Cited

U.S. PATENT DOCUMENTS

| 7,688,393 | B2* | 3/2010 | Ueda et al. ...................... 349/48 |
| 8,184,080 | B2* | 5/2012 | Song et al. ...................... 345/94 |
| 2002/0191073 | A1* | 12/2002 | Satoh .............................. 348/51 |
| 2012/0327320 | A1* | 12/2012 | Yokoyama et al. ............. 349/39 |

FOREIGN PATENT DOCUMENTS

| JP | 2000-078617 A | 3/2000 |
| JP | 2002-196281 A | 7/2002 |
| JP | 2005-115276 A | 4/2005 |

OTHER PUBLICATIONS

Official Communication issued in International Patent Application No. PCT/JP2011/071134, mailed on Nov. 1, 2011.
Kang et al., "3.1: A Novel Polarizer Glasses-type 3D Displays with a Patterned Retarder," SID 10 Digest, 2010, pp. 1-4.

* cited by examiner

*Primary Examiner* — Ilana Spar
(74) *Attorney, Agent, or Firm* — Keating & Bennett, LLP

(57) ABSTRACT

A liquid crystal display device (1) includes a liquid crystal panel having a plurality of pixels disposed in a matrix form, and a patterned retarder having retarder plates (RR) and retarder plates (RL) formed at positions corresponding to odd-numbered rows and even-numbered rows, respectively, of the liquid crystal panel. Among sub pixels disposed in the pixels positioned in the n-th row, a sub pixel electrode of a boundary-proximity sub pixel, which is positioned closest to a boundary between the associated retarder plate (RR) and the associated retarder plate (RL), is connected to an auxiliary bus line via a transistor having a gate electrode connected to a gate bus line in the (n−1)-th or prior row. In the second display mode, gate signals are sequentially supplied to the gate bus lines in order from the first to the N-th rows, and, in the first display mode, gate signals are sequentially supplied to the gate bus lines in order from the N-th to the first rows.

14 Claims, 19 Drawing Sheets

LIQUID CRYSTAL DISPLAY DEVICE AND DISPLAY APPARATUS

TECHNICAL FIELD

The present invention relates to a liquid crystal display device that displays images by using liquid crystals. More particularly, the invention relates to a liquid crystal display device that may display images three-dimensionally by using a patterned retarder system. The invention also relates to a display apparatus including such a liquid crystal display device.

BACKGROUND ART

These days, a liquid crystal display device having a function of displaying images in a three-dimensional manner (hereinafter may also referred to as "displaying 3D (three-dimensional) pictures") in addition to a function of displaying images not in a three-dimensional manner (hereinafter may also referred to as "displaying 2D (two-dimensional) images" are in practical use.

As technologies for displaying three-dimensional pictures, an active shutter system, a naked-eye lenticular system, a patterned retarder system (polarization system, which is also called a PR system), and so on, are known. In any of the systems, a right-eye image is presented only to the right eye of a user, and a left-eye image is presented only to the left eye of the user, thereby enabling the user to view the images three-dimensionally.

In a liquid crystal display device using the active shutter system, right-eye frames (R frames) and left-eye frames (L frames) are alternately displayed. A user views images displayed on the liquid crystal display device with 3D glasses having a right-eye lens and a left-eye lens which perform a shutter operation in synchronization with the switching of the L frames and the R frames, thereby viewing the images three-dimensionally.

In a liquid crystal display device using the naked-eye lenticular system, a right-eye image and a left-eye image are respectively presented to the right eye and the left eye of a user via a lenticular lens formed on the front side of a liquid crystal panel. This enables the user to view the images three-dimensionally without the need to use 3D glasses.

In a liquid crystal display device using the patterned retarder system, a right-eye image is displayed by using pixels defined by odd-numbered horizontal scanning lines, while a left-eye image is displayed by using images defined by even-numbered horizontal scanning lines.

The patterned retarder system will be discussed more specifically below with reference to parts (a) and (b) of FIG. 19 and FIG. 20. Part (a) of FIG. 19 is an exploded perspective view illustrating a backlight unit 50, a liquid crystal panel 60, and a patterned retarder 70 included in a known liquid crystal display device using the patterned retarder system.

The backlight unit 50 supplies backlight to the liquid crystal panel 60 from the back side of the liquid crystal panel 60. On the liquid crystal panel 60, pixels defined by horizontal scanning lines (lateral-direction scanning lines) HL1 through HLN (N is the total number of horizontal scanning lines) and vertical scanning lines (longitudinal-direction scanning lines) VL1 through VLM (M is the total number of vertical scanning lines) are formed. The liquid crystal panel 60 controls the orientation of a liquid crystal included in each pixel, thereby making it possible to control the transmittance of backlight to be supplied to each pixel. Additionally, the liquid crystal panel 60 displays a right-eye image by using pixels defined by the odd-numbered horizontal scanning lines HL1, HL3, and so on, and displays a left-eye image by using pixels defined by the even-numbered horizontal scanning lines HL2, HL4, and so on.

The patterned retarder 70 is a retarder plate unit having a length in the direction of the horizontal scanning lines, and includes two types of retarder plates RR and RL having characteristics different from each other. The retarder plates RR convert linearly polarized light into right-handed circularly polarized light, while the retarder plates RL convert linearly polarized light into left-handed circularly polarized light. As shown in part (a) of FIG. 19, the retarder plates RR are disposed on the front side of the pixels defined by the odd-numbered horizontal scanning lines HL1, HL3, and so on, while the retarder plates RL are disposed on the front side of the pixels defined by the even-numbered horizontal scanning lines HL2, HL4, and so on.

Accordingly, a right-eye image to be displayed by using pixels defined by the odd-numbered horizontal scanning lines is represented by light which is right-handed circularly polarized after passing through the patterned retarder, while a left-eye image to be displayed by using pixels defined by the even-numbered horizontal scanning lines is represented by light which is left-handed circularly polarized after passing through the patterned retarder.

Part (b) of FIG. 19 shows 3D glasses 80 used in the patterned retarder system. As shown in part (b) of FIG. 19, the 3D glasses 80 include a right-eye lens and a left-eye lens. The right-eye lens transmits only right-handed circularly polarized light, while the left-eye lens transmits only left-handed circularly polarized light. Accordingly, by using the 3D glasses 80, among images displayed on a liquid crystal display device, the user is able to view right-eye images displayed by using pixels defined by the odd-numbered horizontal scanning lines only with the right eye, and views left-eye images displayed by using pixels defined by the even-numbered horizontal scanning lines only with the left eye, thereby making it possible to view the images three-dimensionally.

A liquid crystal display device using the patterned retarder system can also display 2D images by using both of pixels defined by the odd-numbered horizontal scanning lines and pixels defined by the even-numbered horizontal scanning lines. In this case, the user simply views images displayed on the liquid crystal display device without using the 3D glasses.

The 3D glasses 80 used in the patterned retarder system do not need electrical control, which is necessary for 3D glasses used in the active shutter system. Thus, the 3D glasses 80 can be implemented with a simple structure.

On the other hand, however, in the patterned retarder system, it is known that a phenomenon called crosstalk occurs mainly due to a limited thickness of a glass layer forming a liquid crystal panel.

The crosstalk is the following phenomenon occurring, for example, when the user views a liquid crystal panel from the obliquely top side or the obliquely bottom side. Part of a right-eye image to be displayed by using pixels defined by odd-numbered horizontal scanning lines passes through left-eye retarder plates disposed on the front side of pixels defined by even-numbered horizontal scanning lines and is then viewed, and part of a left-eye image to be displayed by using pixels defined by the even-numbered horizontal scanning lines passes through right-eye retarder plates disposed on the front side of pixels defined by the odd-numbered horizontal scanning lines and is then viewed. Accordingly, the right-eye image is mixed into the left-eye image represented by left-handed circularly polarized light, and the left-eye image is mixed into the right-eye image represented by right-handed circularly polarized light.

Hitherto, the configuration in which the occurrence of crosstalk is suppressed by forming black matrixes and black stripes along horizontal scanning lines in a liquid crystal panel and in a patterned retarder, respectively, is known.

FIG. 20 is a sectional view, along vertical scanning lines (longitudinal direction), of the backlight unit 50, the liquid crystal panel 60, and the patterned retarder 70 included in a known liquid crystal display device, and illustrates an area around pixels defined by an n-th horizontal scanning line and pixels defined by an (n+1)-th horizontal scanning line. FIG. 20 illustrates the liquid crystal panel 60 and the patterned retarder 70 configured in which the occurrence of crosstalk is suppressed by the use of black matrixes and black stripes.

As shown in FIG. 20, the backlight unit 50 is disposed at the back side (the left side in FIG. 20) of the liquid crystal panel 60, and the patterned retarder 70 is disposed at the front side (the right side in FIG. 20) of the liquid crystal panel 60. The liquid crystal panel 60 includes a first polarizing sheet 60a, a TFT-Glass 60b, a TFT substrate 60c, a color filter 60d, a CF-Glass 60e, and a second polarizing sheet 60f.

As shown in FIG. 20, in the TFT substrate 60c, a black matrix BM is formed between a pixel Pn defined by the n-th horizontal scanning line and a pixel Pn+1 defined by the (n+1)-th horizontal scanning line. Moreover, at the front side of the black matrixes BM, black matrixes BM' are formed within the color filter 60d, and black stripes BS are formed within the patterned retarder 70.

By using such black matrixes and black stripes, as shown in FIG. 20, if the angle between the direction of a normal to the liquid crystal panel 60 and a viewing direction is within α degrees in the direction of the vertical scanning lines, it is possible to suppress the occurrence of crosstalk.

With this configuration, however, the provision of black matrixes and black stripes decreases the aperture, thereby causing a problem that the brightness of images is reduced.

NPL 1 discloses a technology for suppressing the occurrence of crosstalk without using black stripes by dividing each pixel into two sub pixels (an upper sub pixel and a lower sub pixel) in the direction of vertical scanning lines. In this technology, when displaying a 2D image, a data voltage for displaying an image is supplied to both of the sub pixels, and when displaying a 3D image, a data voltage for displaying an image is supplied to only the upper sub pixel, while a data voltage for displaying black is supplied to the lower sub pixel. The lower sub pixel to which the data voltage for displaying black is supplied functions as a black matrix.

According to the technology disclosed in NPL 1, therefore, the brightness of images is not reduced when displaying a 2D image. When a 3D image is displayed, it is possible to suppress the occurrence of crosstalk by black matrixes.

CITATION LIST

Non Patent Literature

NPL 1: "A Nobel Polarizer Glasses-type 3D Displays with a Patterned Retarder", 2010 SID International Symposium, Washington State Convention Center, Seattle, Wash. USA, May 25, 2010

SUMMARY OF INVENTION

Technical Problem

However, in the technology disclosed in NPL 1, when displaying a 3D image, it is necessary to supply different data voltages to the upper sub pixel and the lower sub pixel. Thus, twice as many data lines (data bus lines and source bus lines) as those used in the configuration in which only 2D images are displayed are necessary, thereby causing a problem that the designing of a liquid crystal panel becomes complicated.

The present invention has been made in view of the above-described problem. It is an object of the present invention to realize a liquid crystal display device in which it is possible to suppress the occurrence of crosstalk without increasing the number of data bus lines.

Solution to Problem

In order to solve the above-described problem, the following liquid crystal display device is provided. The liquid crystal display device of the present invention is a liquid crystal display device that is capable of performing display in a first display mode and a second display mode. The liquid crystal display device includes: a liquid crystal panel including a plurality of pixels disposed in a matrix having N rows and M columns (N and M are natural numbers), auxiliary bus lines, a gate bus line disposed in each row, a data bus line disposed in each column, a plurality of sub pixels disposed in, among the plurality of pixels, a pixel positioned in the n-th row and the m-th column (n and m are natural numbers which satisfy $1 \leq n \leq N$ and $1 \leq m \leq M$, respectively), a sub pixel electrode disposed in each of the sub pixels and opposing a common electrode with a liquid crystal layer therebetween, and an input transistor disposed in each of the sub pixels, the input transistor having a drain electrode connected to the sub pixel electrode, a source electrode connected to a data bus line in the m-th column, and a gate electrode connected to a gate bus line in the n-th row; and an optical panel including first optical plates which generate outgoing light having a first polarization state from incident light and second optical plates which generate outgoing light having a second polarization state, which is different from the first polarization state, from the incident light, the first optical plates and the second optical plates being formed at positions corresponding to odd-numbered rows and even-numbered rows, respectively, of the liquid crystal panel. Among the plurality of sub pixels disposed in the pixel positioned in the n-th row and the m-th column, a boundary-proximity sub pixel, which is positioned closest to a boundary between the associated first optical plate and the associated second optical plate, further includes an output transistor, the output transistor having a drain electrode electrically connected to the sub pixel electrode of the boundary-proximity sub pixel, a source electrode connected to the auxiliary bus line, and a gate electrode connected to a gate bus line in the (n−1)-th or prior row. In the second display mode, gate signals are sequentially supplied to the gate bus lines in order from the first to the N-th rows, and in the first display mode, gate signals are sequentially supplied to the gate bus lines in order from the N-th to the first rows.

In the liquid crystal display device of the present invention configured as described above, in the second display mode, by sequentially supplying gate signals to the gate bus lines in order from the first to the N-th rows, that is, by performing scanning in a forward direction, a common data voltage is applied to the sub pixel electrodes disposed in each pixel via the data bus line. Then, each of the sub pixels presents a desired level of brightness, thereby displaying an image.

On the other hand, in the first display mode, the above-described liquid crystal display device sequentially supplies gate signals to the gate bus lines in order from the N-th to the first rows, that is, the liquid crystal display device performs scanning in a backward direction. In this case, when a gate signal is supplied to the gate bus line in the n-th row, a common data voltage is applied to the sub pixel electrodes of the sub pixels disposed in a pixel positioned in the n-th row. Subsequently, when a gate signal is supplied to the gate bus line in the (n−1)-th or prior row, the output transistor is changed to the ON state, thereby changing the potential of the sub pixel electrode of the boundary-proximity sub pixel, among the sub pixels, to the potential of the above-described auxiliary bus line.

Accordingly, in the liquid crystal display device of the present invention configured as described above, it is possible to apply different voltages to the liquid crystal layer of the boundary-proximity sub pixel and to the liquid crystal layers of the sub pixels other than the boundary-proximity sub pixel without increasing the number of data bus lines. Additionally, by suitably setting the potential of the auxiliary bus line, the brightness presented by the boundary-proximity sub pixel can be made lower than that by the sub pixels other than the boundary-proximity sub pixel.

In the first mode, by displaying an image which can be viewed three-dimensionally by using a patterned retarder system, the above-described phenomenon of crosstalk can be suppressed.

In the second display mode, in each pixel, the boundary-proximity sub pixel presents the same level of brightness as that of the sub pixels other than the boundary-proximity sub pixel. Thus, by displaying an image which cannot be viewed three-dimensionally in the second mode, an image having a higher level of brightness can be displayed than in a known configuration in which a black matrix, which does not present brightness regardless of whether an image which cannot be viewed three-dimensionally or an image which can be viewed three-dimensionally is displayed is provided.

Advantageous Effects of Invention

As described above, a liquid crystal display device of the present invention is a liquid crystal display device that is capable of performing display in a first display mode and a second display mode. The liquid crystal display device includes: a liquid crystal panel including a plurality of pixels disposed in a matrix having N rows and M columns (N and M are natural numbers), auxiliary bus lines, a gate bus line disposed in each row, a data bus line disposed in each column, a plurality of sub pixels disposed in, among the plurality of pixels, a pixel positioned in the n-th row and the m-th column (n and m are natural numbers which satisfy 1≤n≤N and 1≤m≤M, respectively), a sub pixel electrode disposed in each of the sub pixels and opposing a common electrode with a liquid crystal layer therebetween, and an input transistor disposed in each of the sub pixels, the input transistor having a drain electrode connected to the sub pixel electrode, a source electrode connected to a data bus line in the m-th column, and a gate electrode connected to a gate bus line in the n-th row; and an optical panel including first optical plates which generate outgoing light having a first polarization state from incident light and second optical plates which generate outgoing light having a second polarization state, which is different from the first polarization state, from the incident light, the first optical plates and the second optical plates being formed at positions corresponding to odd-numbered rows and even-numbered rows, respectively, of the liquid crystal panel. Among the plurality of sub pixels disposed in the pixel positioned in the n-th row and the m-th column, a boundary-proximity sub pixel, which is positioned closest to a boundary between the associated first optical plate and the associated second optical plate, further includes an output transistor, the output transistor having a drain electrode electrically connected to the sub pixel electrode of the boundary-proximity sub pixel, a source electrode connected to the auxiliary bus line, and a gate electrode connected to a gate bus line in the (n−1)-th or prior row. In the second display mode, gate signals are sequentially supplied to the gate bus lines in order from the first to the N-th rows, and in the first display mode, gate signals are sequentially supplied to the gate bus lines in order from the N-th to the first rows.

In the liquid crystal display device of the present invention configured as described above, in the first display mode, the occurrence of crosstalk when displaying an image which may be viewed three-dimensionally can be suppressed without increasing the number of data bus lines.

part (a) schematically shows brightness levels presented by the sub pixels in the 2D display mode; and part (b) schematically shows brightness levels presented by the sub pixels in the 3D display mode.

Figure 8:
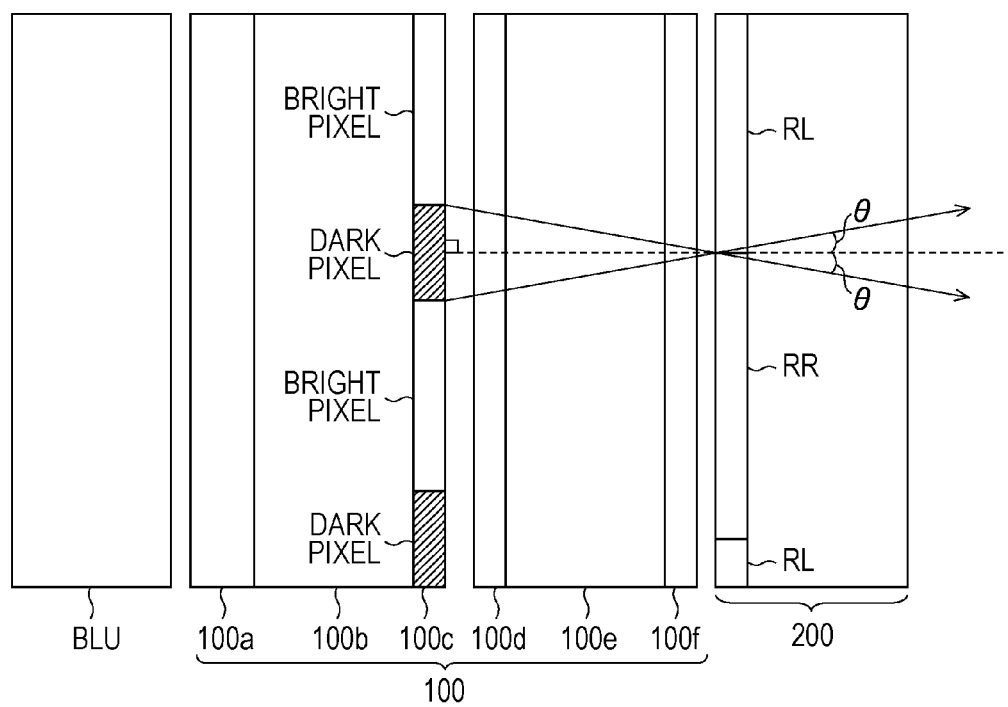

FIG. 8 is a sectional view, along a straight line parallel with the source bus lines, of the backlight unit, the liquid crystal panel, and the patterned retarder when the 3D display mode is selected in the liquid crystal display device according to the first embodiment of the present invention.

Figure 9:
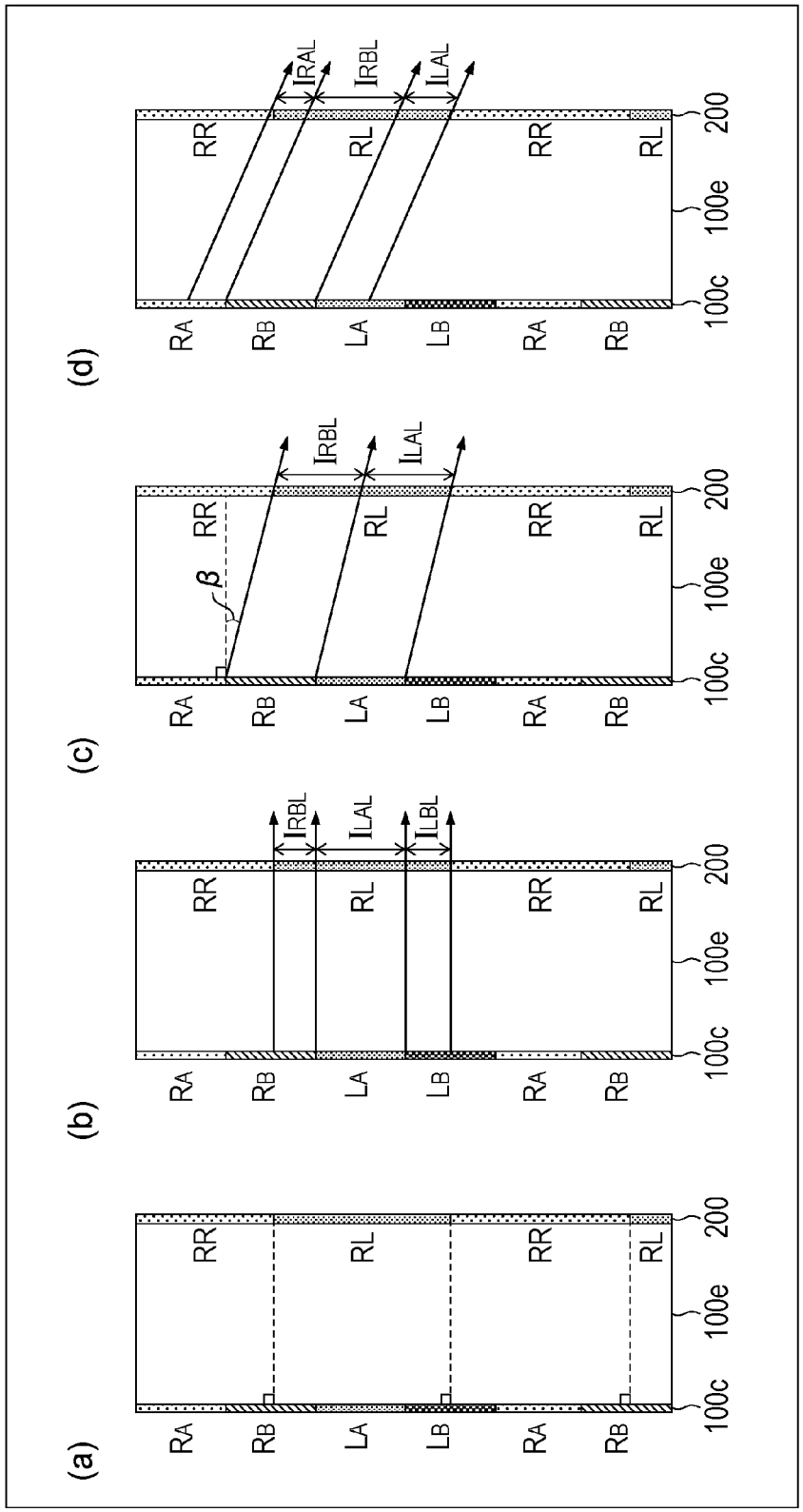

FIG. 9 shows a case in which the liquid crystal display device of the first embodiment is driven so that the brightness presented by dark pixels may be equal to or smaller than a predetermined brightness level: part (a) is a sectional view showing part of the liquid crystal panel and part of the patterned retarder; part (b) shows image light viewed by a viewer when the viewing direction is a direction of a normal to the liquid crystal panel; part (c) shows image light viewed by a viewer when the angle between a viewing direction and the direction of a normal to the liquid crystal panel, the angle being along the vertical direction of the liquid crystal panel, is a predetermined angle β (beta); and part (d) shows image light viewed by a viewer when the angle between a viewing direction and the direction of a normal to the liquid crystal panel, the angle being along the vertical direction of the liquid crystal panel, is greater than a predetermined angle.

Figure 10:
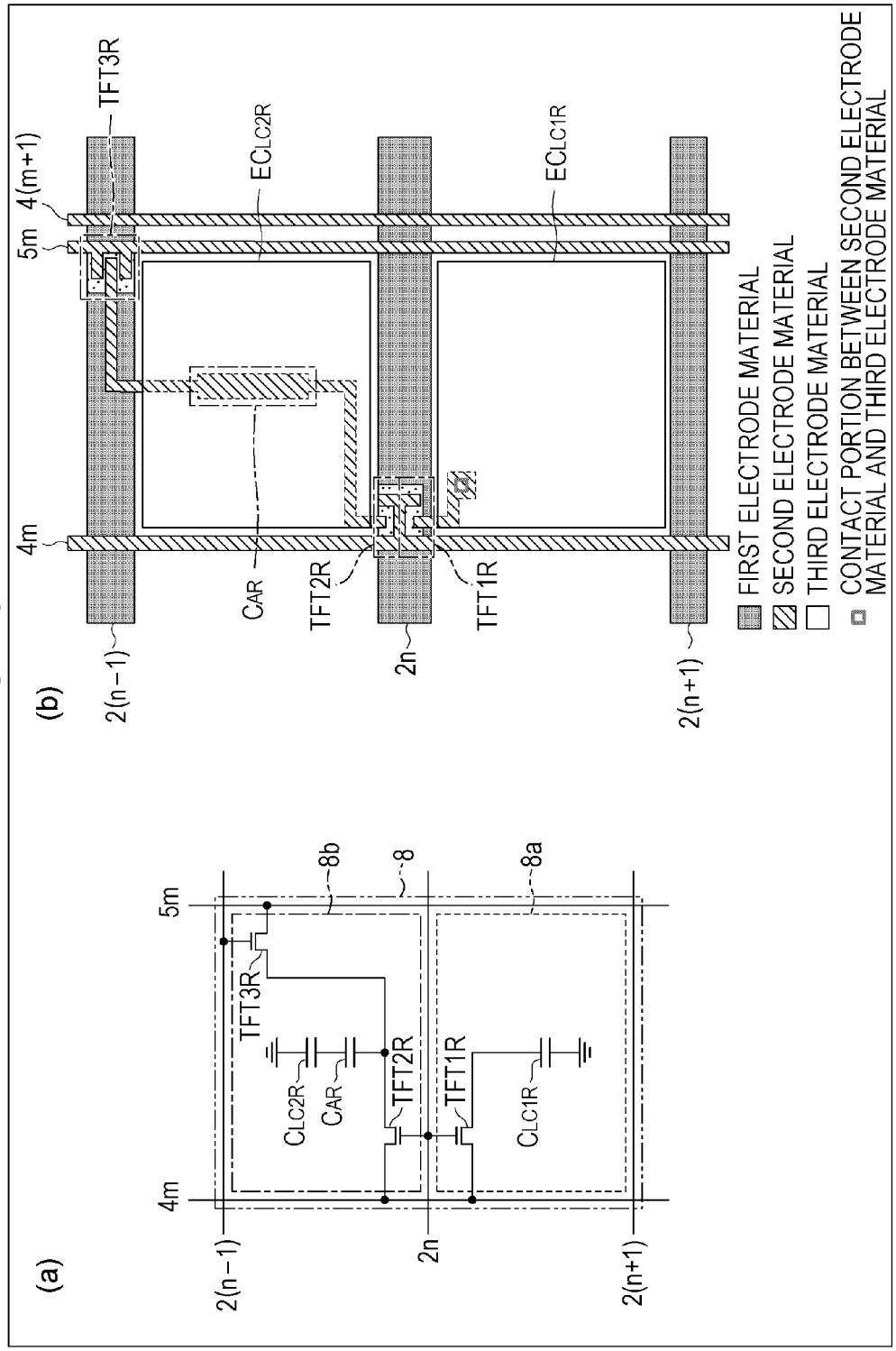

FIG. 10 illustrates a configuration of a liquid crystal panel according to a first modified example of the first embodiment of the present invention: part (a) is an equivalent circuit diagram of the liquid crystal panel according to this modified example; and part (b) is a plan view illustrating a layout of a specific configuration of the liquid crystal panel of this modified example.

Figure 11:
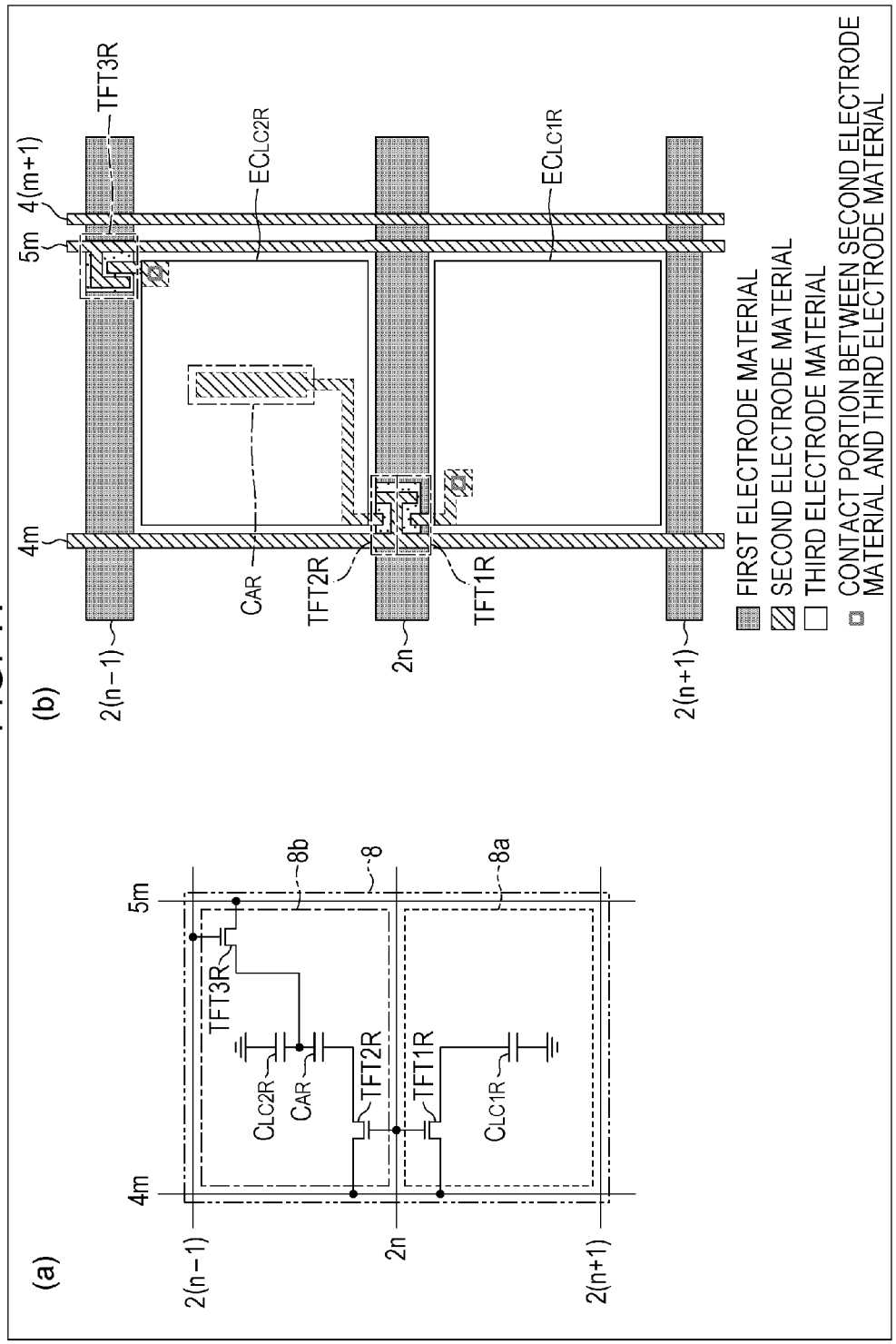

FIG. 11 illustrates a configuration of a liquid crystal panel according to a second modified example of the first embodiment of the present invention: part (a) is an equivalent circuit diagram of the liquid crystal panel according to this modified example; and part (b) is a plan view illustrating a layout of a specific configuration of the liquid crystal panel of this modified example.

Figure 12:
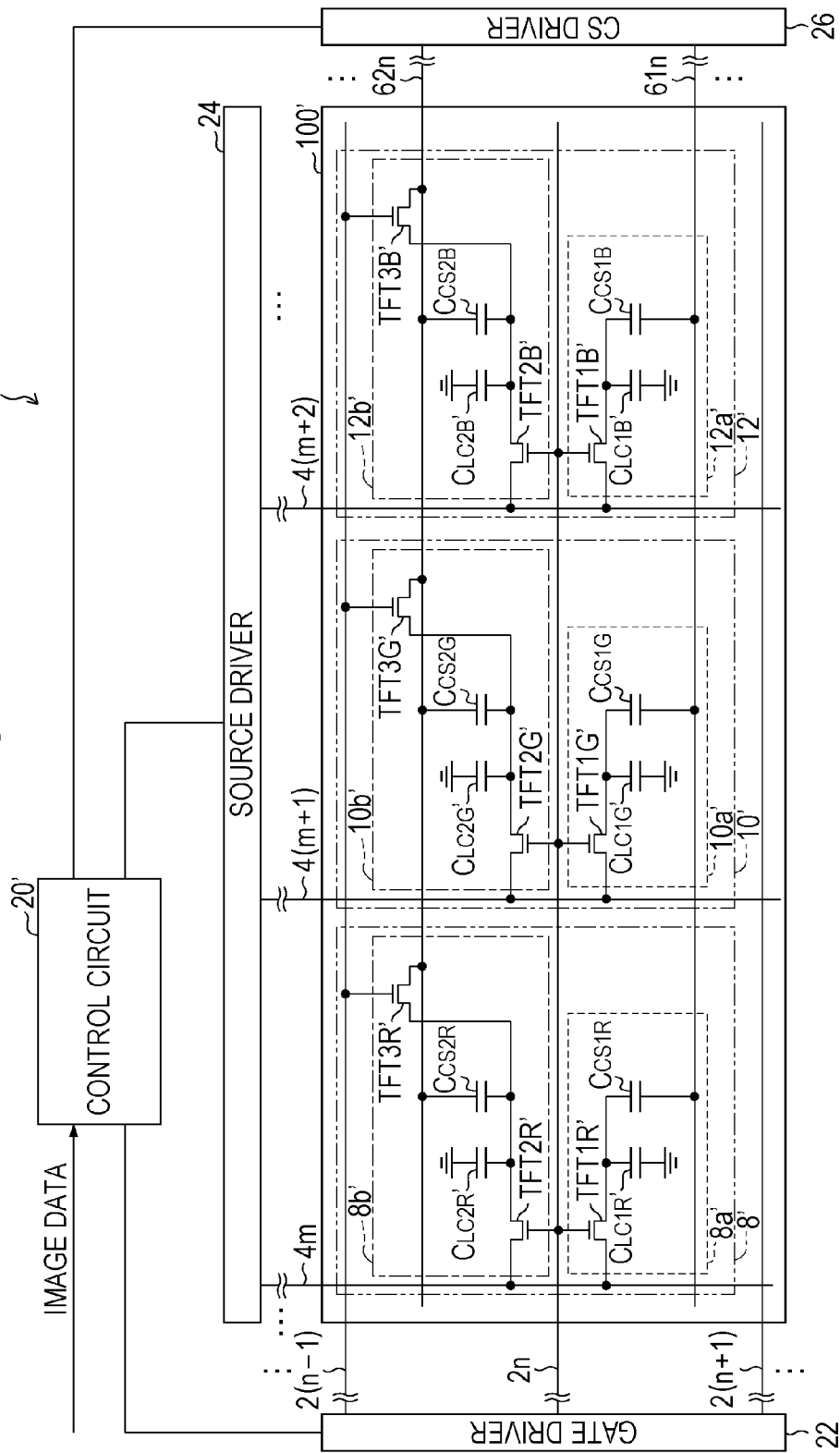

FIG. 12 illustrates, together with drivers and a control circuit, an equivalent circuit of a liquid crystal panel of a liquid crystal display device according to a second embodiment of the present invention.

Figure 13:
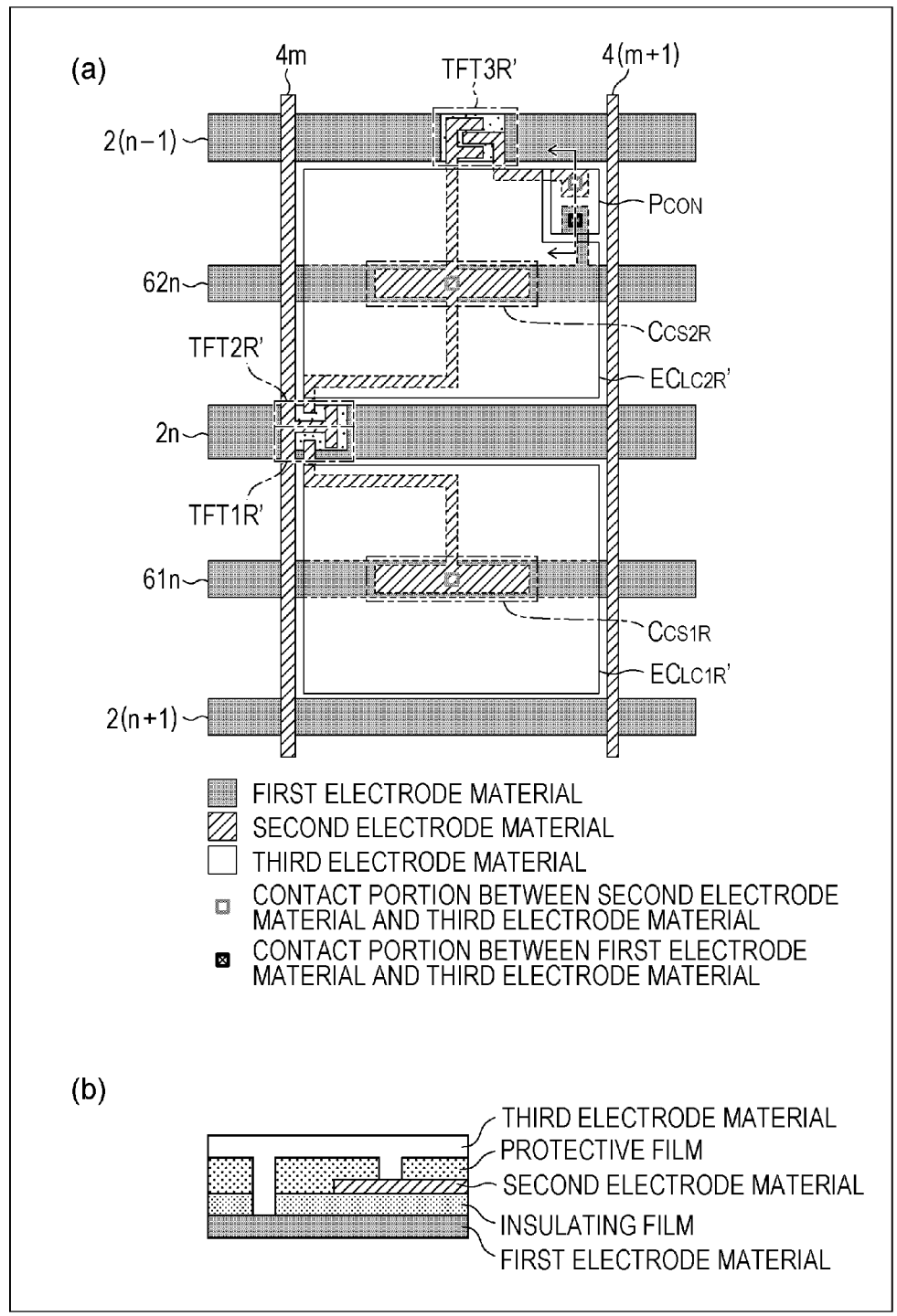

FIG. 13 illustrates a specific configuration of the liquid crystal panel according to the second embodiment of the present invention: part (a) is a plan view illustrating a layout of a specific configuration of the liquid crystal panel; and part (b) is a sectional view showing a contact portion of the liquid crystal panel.

Figure 14:
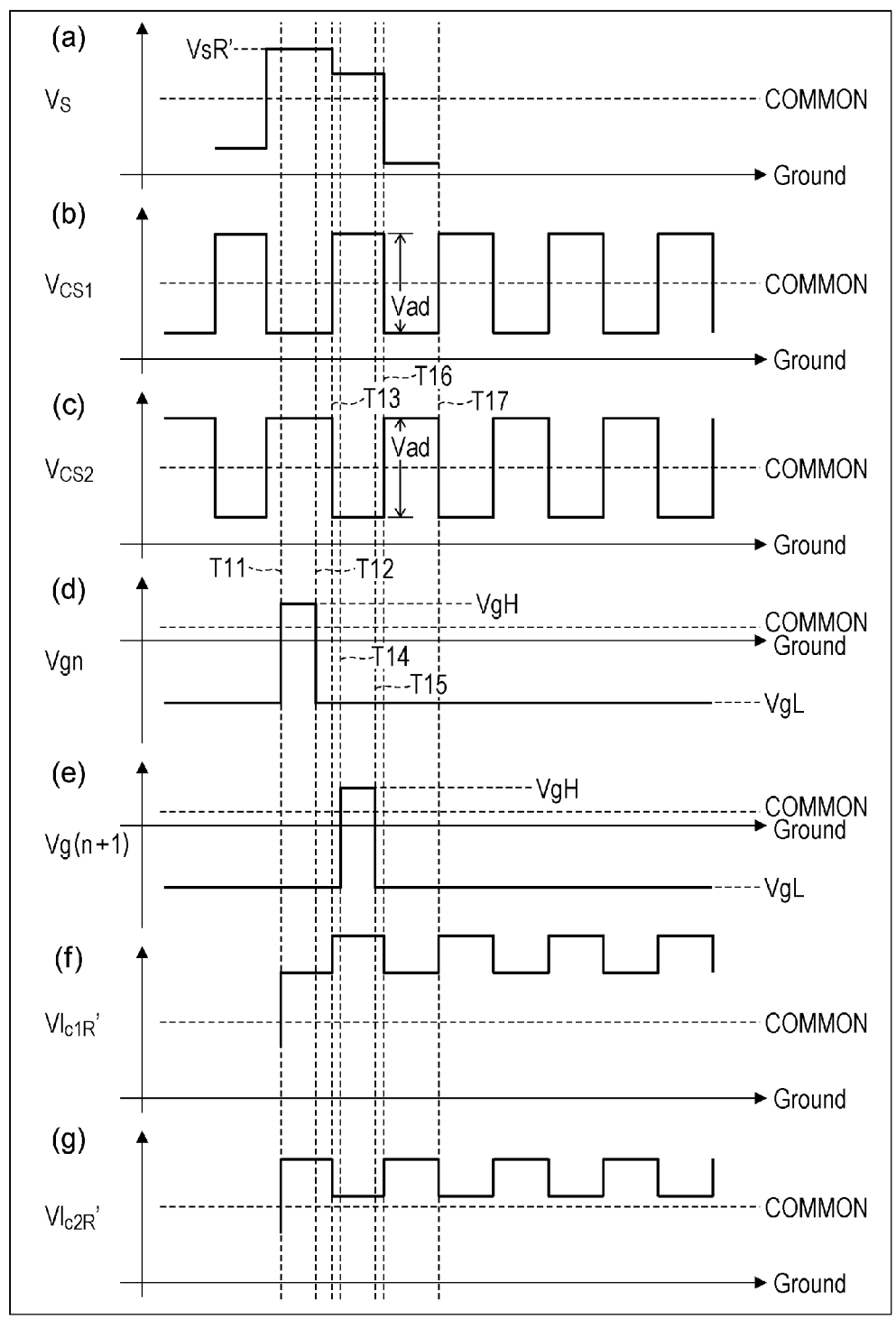

FIG. 14 shows timing charts schematically illustrating waveforms and timings of voltages when the liquid crystal panel according to the second embodiment of the present invention is driven in the 2D display mode: part (a) shows a voltage waveform of a data signal supplied from a source driver to a source bus line; part (b) shows a voltage waveform of an auxiliary capacitor driving signal supplied from a CS driver to a first CS bus line; part (c) shows a voltage waveform of an auxiliary capacitor driving signal supplied from the CS driver to a second CS bus line; part (d) shows a voltage waveform of a gate signal supplied from the gate driver to the n-th gate bus line; part (e) shows a voltage waveform of a gate signal supplied from the gate driver to the (n+1)-th gate bus line; part (f) shows a voltage waveform of a sub pixel electrode of a bright pixel disposed in a pixel which displays red; and part (g) shows a voltage waveform of a sub pixel electrode of a dark pixel disposed in a pixel which displays red.

Figure 15:
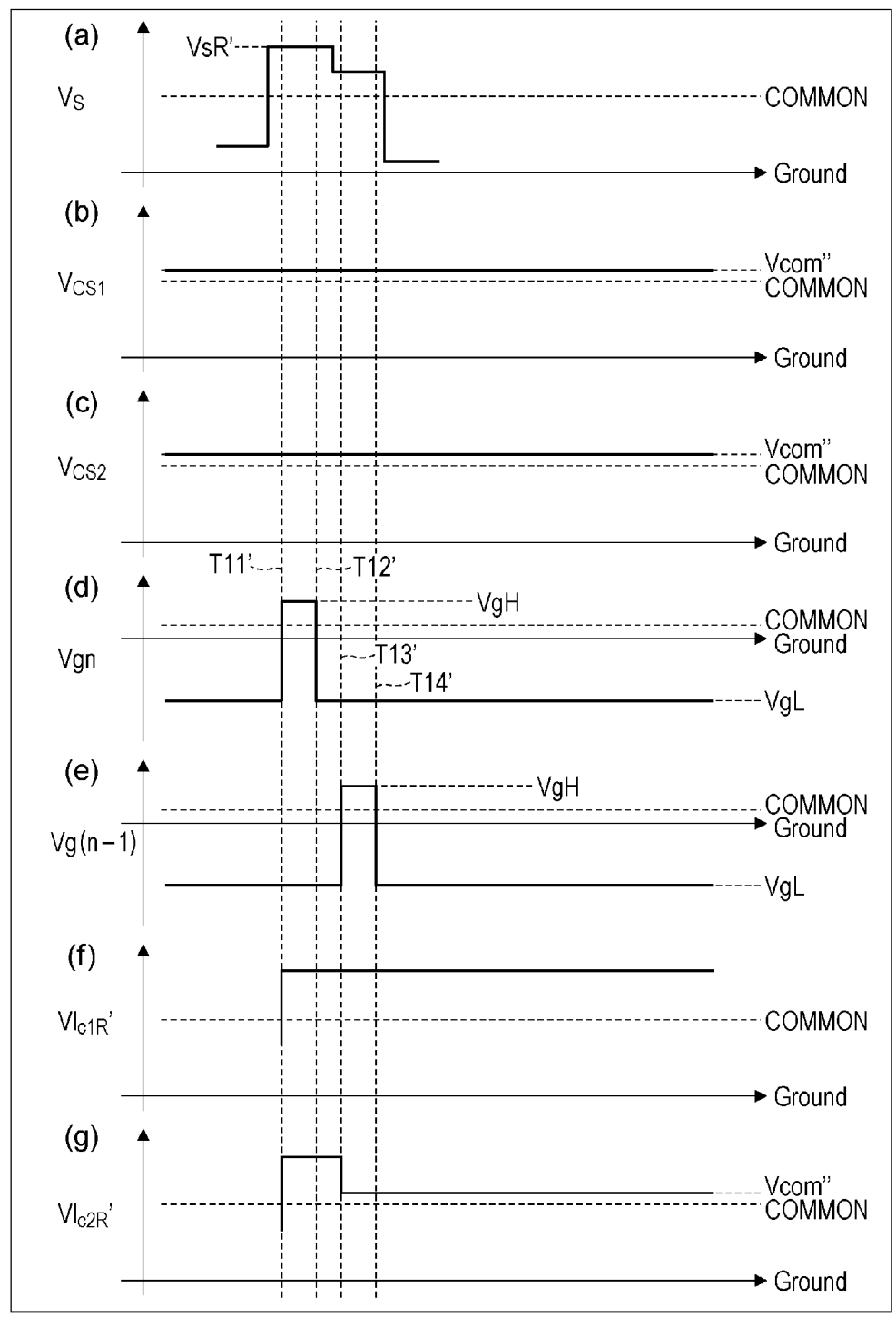

FIG. 15 shows timing charts schematically illustrating waveforms and timings of voltages when the liquid crystal panel according to the second embodiment of the present invention is driven in the 3D display mode: part (a) shows a voltage waveform of a data signal supplied from the source driver to a source bus line; part (b) shows a voltage waveform of an auxiliary capacitor driving signal supplied from the CS driver to the first CS bus line; part (c) shows a voltage waveform of an auxiliary capacitor driving signal supplied from the CS driver to the second CS bus line; part (d) shows a voltage waveform of a gate signal supplied from the gate driver to the n-th gate bus line; part (e) shows a voltage waveform of a gate signal supplied from the gate driver to the (n−1)-th gate bus line; part (f) shows a voltage waveform of a sub pixel electrode of a bright pixel disposed in a pixel which displays red; and part (g) shows a voltage waveform of a sub pixel electrode of a dark pixel disposed in a pixel which displays red.

Figure 16:
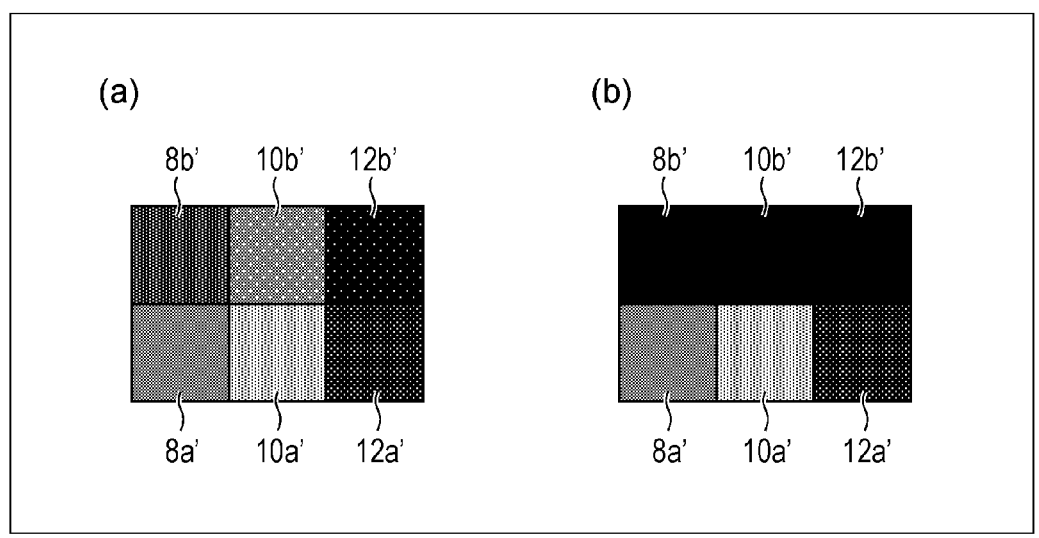

FIG. 16 schematically illustrates brightness levels presented by individual sub pixels of the liquid crystal display device according to the second embodiment of the present invention: part (a) schematically shows brightness levels presented by the sub pixels in the 2D display mode; and part (b) schematically shows brightness levels presented by the sub pixels in the 3D display mode.

Figure 17:
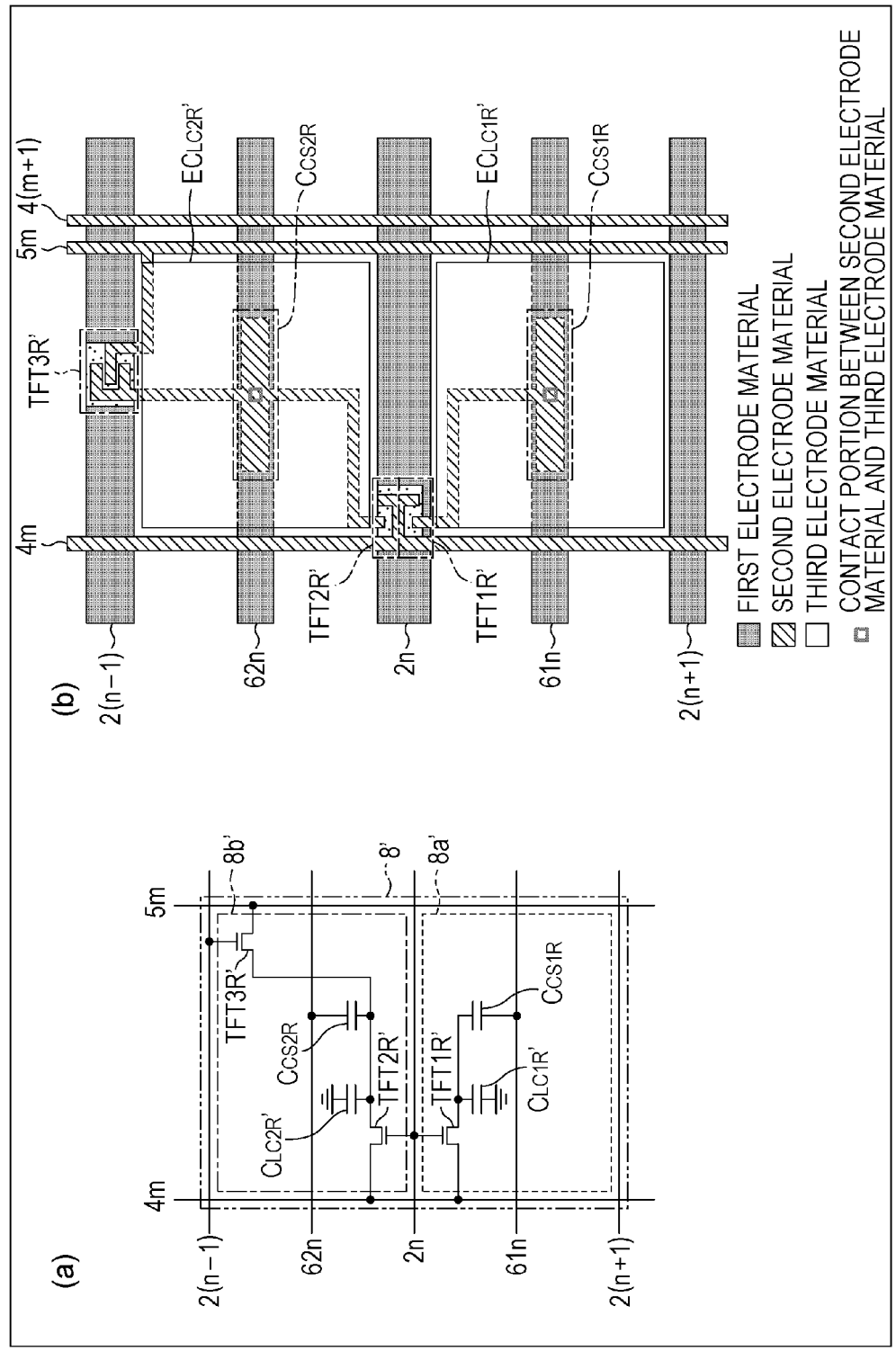

FIG. 17 illustrates a configuration of a liquid crystal panel according to a first modified example of the second embodiment of the present invention: part (a) is an equivalent circuit diagram of the liquid crystal panel according to this modified example; and part (b) is a plan view illustrating a layout of a specific configuration of the liquid crystal panel of this modified example.

Figure 18:
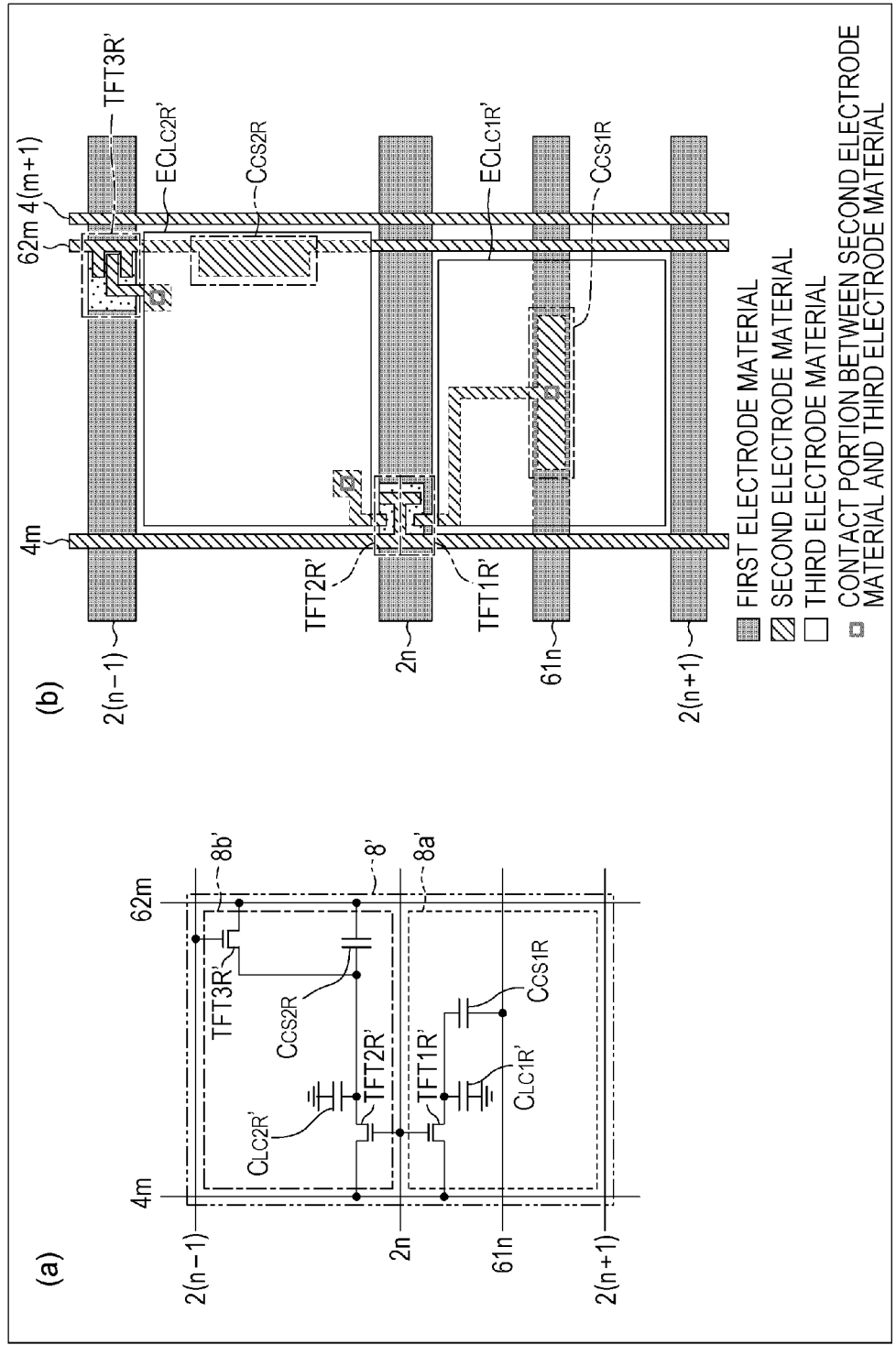

FIG. 18 illustrates a configuration of a liquid crystal panel according to a second modified example of the second embodiment of the present invention: part (a) is an equivalent circuit diagram of the liquid crystal panel according to this modified example; and part (b) is a plan view illustrating a layout of a specific configuration of the liquid crystal panel of this modified example.

Figure 19:
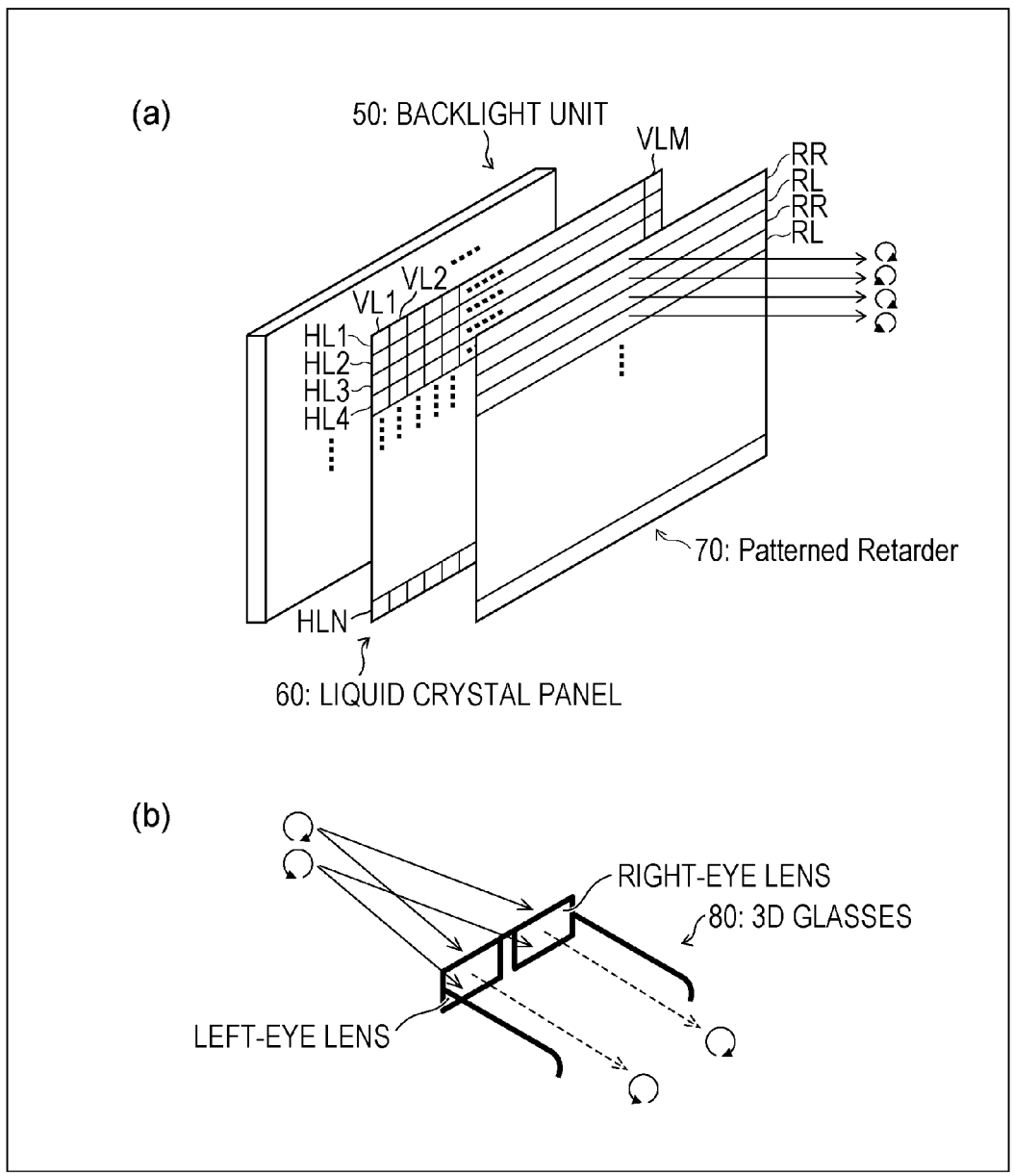

FIG. 19 illustrates a known liquid crystal display device: part (a) is an exploded perspective view illustrating a backlight unit, a liquid crystal panel, and a patterned retarder included in the known liquid crystal display device; and part (b) shows 3D glasses used together with the known liquid crystal display device.

Figure 20:
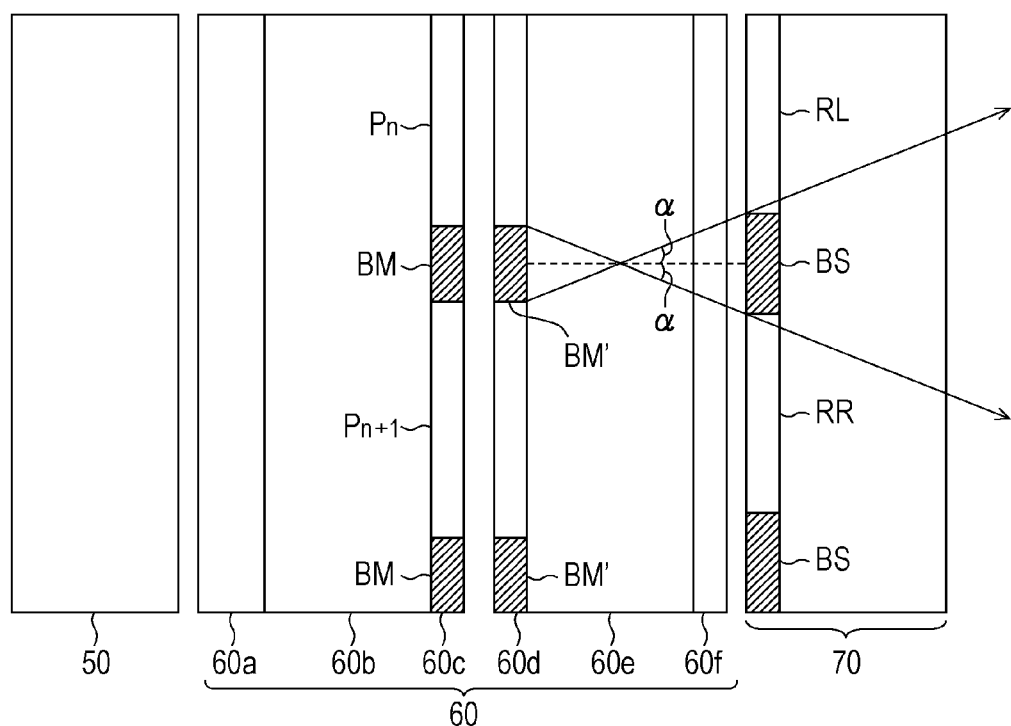

FIG. 20 is a sectional view, along a straight line parallel with a vertical scanning line, of the backlight unit, the liquid crystal panel, and the patterned retarder included in the known liquid crystal display device.

DESCRIPTION OF EMBODIMENTS

First Embodiment

A first embodiment of the present invention will be described below with reference to FIGS. 1 through 9. In the following description, a vertical alignment liquid crystal display device (VA (Vertical Alignment) liquid crystal display device) using a liquid crystal material exhibiting negative dielectric anisotropy is illustrated by way of example. However, the present invention is not restricted to this type of liquid crystal display device, and may be applicable to, for example, a TN (Twisted Nematic) type or an IPS (In-Plane Switching) type of liquid crystal display device. Additionally, in the following description, a normally black liquid crystal display device is illustrated by way of example, in which, as the absolute value of a voltage applied to a liquid crystal layer becomes greater, the transmittance of the liquid crystal layer increases. However, this embodiment is not restricted to this type of liquid crystal display device, and may be applicable to a normally white liquid crystal display device in which, as the absolute value of a voltage applied to a liquid crystal layer becomes greater, the transmittance of the liquid crystal layer decreases.

(Configuration of Liquid Crystal Display Device 1)

Figure 2:
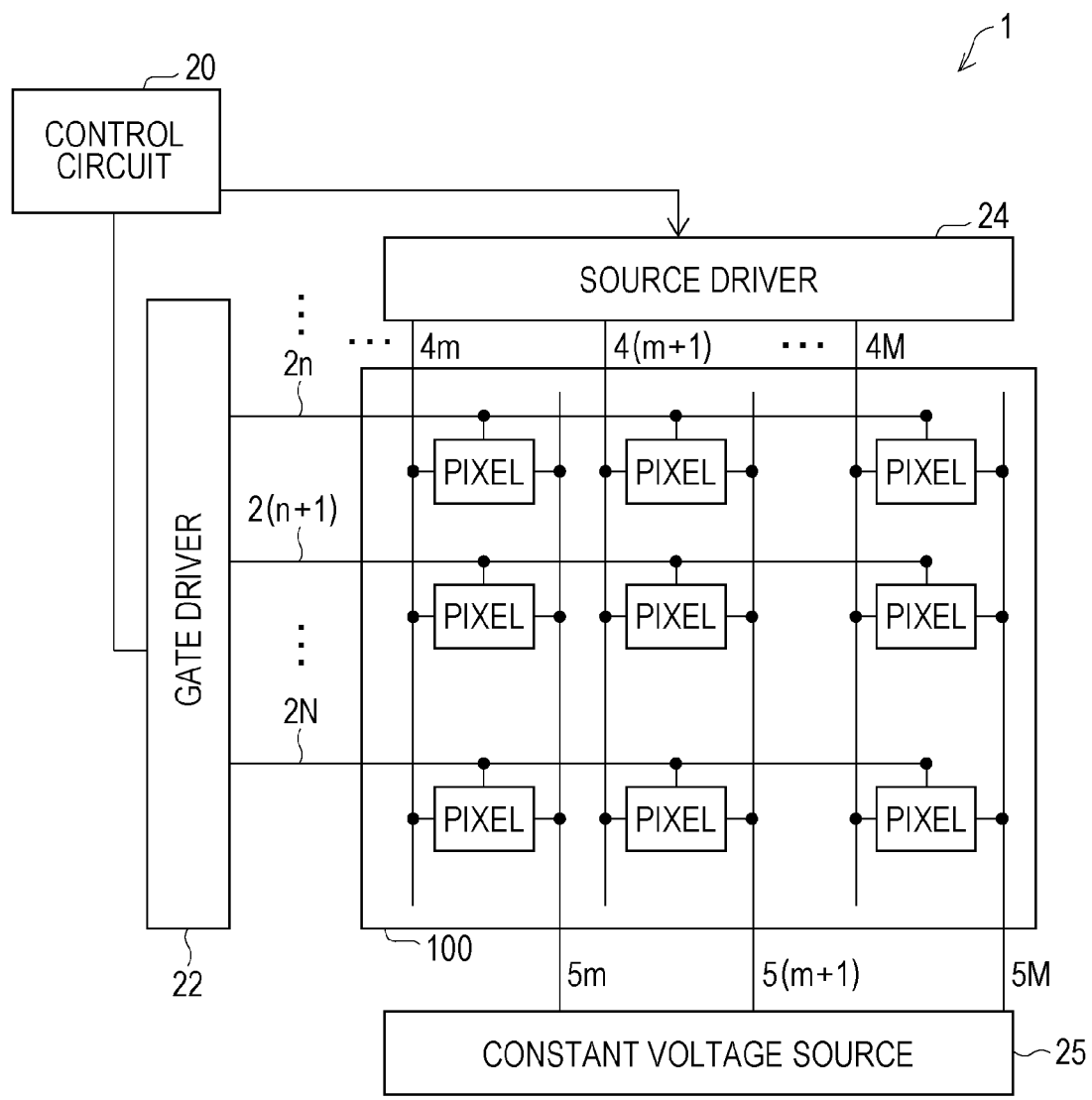
FIG. 2 illustrates the overall configuration of the liquid crystal display device according to the first embodiment of the present invention.

A description will first be given, with reference to FIGS. 2 and 3, of the overall configuration of the liquid crystal display device 1 according to this embodiment. FIG. 2 illustrates the overall configuration of the liquid crystal display device 1 according to this embodiment. The liquid crystal display device 1 includes, as shown in FIG. 2, a control circuit 20, a gate driver 22, a source driver 24, a constant voltage source 25, and a liquid crystal panel 100.

The liquid crystal display device 1 is operated in one of a 2D display mode in which images cannot be displayed three-dimensionally and a 3D display mode in which images can be displayed three-dimensionally. In this case, a user may be able to select one of the two display modes. Alternatively, the liquid crystal display device 1 may automatically select one of the two display modes by referring to mode information associated with image data indicating an image to be displayed.

One of the 2D display mode and the 3D display mode may also be referred to as a "first display mode", and the other mode may also be referred to as a "second display mode".

As shown in FIG. 2, the liquid crystal display device 1 includes, on the liquid crystal panel 100, a plurality of gate bus lines 2, a plurality of source bus lines 4, a plurality of common bus lines (auxiliary bus lines) 5, and pixels defined by the associated gate bus lines and the associated source bus lines. In this embodiment, the total number of gate bus lines 2 is N (N is a natural number), the total number of source bus lines is M, and the total number of common bus lines 5 is M (M is a natural number).

In FIG. 2, a gate bus line 2$n$ indicates the n-th gate bus line 2 (n is a natural number which satisfies 1≤n≤N). A source bus line 4$m$ indicates the m-th source bus line 4 (m is a natural number which satisfies 1≤m≤M). A common bus line 5$m$ indicates the m-th common bus line 5.

Hereinafter, pixels defined by the gate bus line 2$n$ may also be called pixels defined by the n-th horizontal scanning line HLn, and pixels defined by the source bus line 4$m$ may also be called pixels defined by the m-th vertical scanning line VLm.

(Driver)

As shown in FIG. 2, the gate driver 22 which supplies a gate signal to each of the gate bus lines 2, the source driver 24 which supplies a data signal to each of the source bus lines 4, and the constant voltage source 25 which supplies a constant voltage to each of the common bus lines 5 are connected to the liquid crystal panel of the liquid crystal display device 1. These drivers are all operated on the basis of a control signal output from the control circuit 20.

(Control Circuit)

The control circuit 20 calculates the tone value of each pixel from brightness information indicating the brightness of each picture element and from color difference information indicating the color difference of each picture element, the brightness information and the color difference information being included in image data indicating an image to be displayed. The picture element is a unit constituted by pixels which individually display a plurality of different colors. In this embodiment, one picture element is constituted by a pixel which displays red, a pixel which displays green, and a pixel which displays blue. This will be discussed later.

The control circuit 20 controls the timing of a gate signal supplied from the gate driver 22 and the timing of a data signal supplied from the source driver 24.

In this embodiment, when the 2D display mode is selected, the gate driver 22 supplies a gate signal to each of the gate bus lines 2 so that the scanning direction may be a forward direction. When the 3D display mode is selected, the gate driver 22 supplies a gate signal to each of the gate bus lines 2 so that the scanning direction may be a backward direction.

"The scanning direction is a forward direction (also called forward scanning)" means that gate signals are supplied sequentially in order from the first gate bus line 21 to the N-th gate bus line 2N. "The scanning direction is a backward direction (also called backward scanning)" means that gate signals are supplied sequentially in order from the N-th gate bus line 2N to the first gate bus line 21.

Accordingly, when the scanning direction is a forward direction, after a gate signal is supplied to the gate bus line 2$n$, a gate signal is supplied to the gate bus line 2($n$+1). When the scanning direction is a backward direction, after a gate signal is supplied to the gate bus line 2$n$, a gate signal is supplied to the gate bus line 2($n$−1).

(Configuration Around Liquid Crystal Panel 100)

Figure 3:
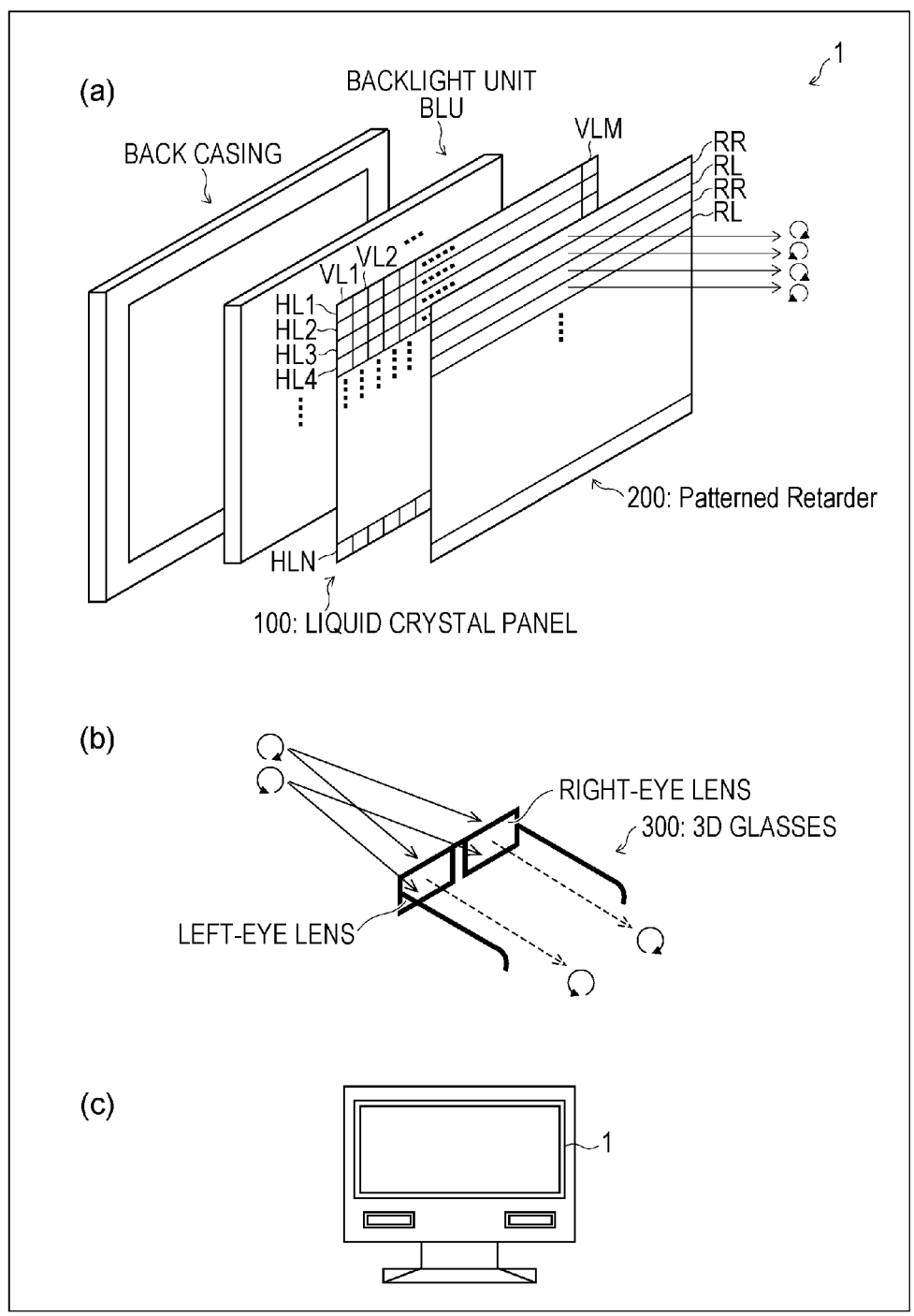
FIG. 3 illustrates the liquid crystal display device according to the first embodiment of the present invention: part (a) is an exploded perspective view illustrating a configuration around a liquid crystal panel 100 of the liquid crystal display device according to this embodiment; part (b) illustrates 3D glasses used together with the liquid crystal display device according to this embodiment; and part (c) illustrates the overall configuration of a liquid crystal color television receiver including the liquid crystal display device of this embodiment.

Part (a) of FIG. 3 is an exploded perspective view illustrating a configuration around the liquid crystal panel 100 of the liquid crystal display device 1. As shown in part (a) of FIG. 3, the liquid crystal display device 1 includes a backlight unit BLU at the back side of the liquid crystal panel 100 and a patterned retarder 200 at the front side of the liquid crystal panel 100. The backlight unit BLU, the liquid crystal panel 100, the control circuit 20 (not shown in part (a) of FIG. 3), the drivers (not shown in part (a) of FIG. 3), and the patterned retarder 200 are stored in a back casing. The front side of the patterned retarder 200 is covered with a transparent protective panel (not shown). Hereinafter, a combination of the liquid crystal panel 100 and the patterned retarder 200 may be called a display panel.

The backlight unit BLU supplies backlight to the liquid crystal panel 100 from the back side of the liquid crystal panel 100. The backlight unit BLU may be configured such that a plurality of LEDs (Light Emitting Diodes) which emit white light are disposed substantially uniformly on the back side of the liquid crystal panel 100 (direct-lighting LED configuration). In this case, the backlight unit BLU includes a diffuser, and light which emits from the above-described plurality of LEDs is formed into uniform backlight by using the diffuser and is then applied to the back side of the liquid crystal panel 100. With this configuration, the irregularity of the brightness of the backlight can be reduced, and also, the efficiency in using light can be increased, and thus, power consumption can be reduced.

The backlight unit BLU may be configured such that a backlighting light source, such as LEDs or a fluorescent tube, is disposed near an edge of the liquid crystal panel 100 (edge-lighting configuration). In this case, the backlight unit BLU further includes a waveguide and a reflector on the back side of the diffuser, and after light emitting from the light source is formed into uniform backlight by using the waveguide and the reflector, it is applied to the back side of the liquid crystal panel 100.

The patterned retarder 200 is a retarder plate unit having a length in the direction of the gate bus lines, and includes two types of retarder plates RR and RL having characteristics different from each other. The retarder plates RR convert linearly polarized light into right-handed circularly polarized light, while the retarder plates RL convert linearly polarized light into left-handed circularly polarized light. As shown in part (a) of FIG. 3, the retarder plates RR are disposed on the front side of pixels defined by the odd-numbered horizontal scanning lines HL1, HL3, and so on, while the retarder plates RL are disposed on the front side of pixels defined by the even-numbered horizontal scanning lines HL2, HL4, and so on.

Accordingly, an image to be displayed by pixels defined by the odd-numbered gate bus lines is represented by light which is right-handed circularly polarized after passing through the patterned retarder 200, while an image to be displayed by pixels defined by the even-numbered gate bus lines is represented by light which is left-handed circularly polarized after passing through the patterned retarder 200.

The retarder plates RR and RL may be constituted by, for example, λ/4 wave plates having optical axes different from each other.

It can also be said that, more generally, the retarder plates RR and RL are optical plates which generate outgoing light beams having polarization states different from each other from incident light.

One of the two types of retarder plates RR and RL may also be referred to as a "first optical plate" and the other type may also be referred to as a "second optical plate". Light converted by using the first optical plate may also be referred to as "outgoing light having a first polarization state" and light converted by using the second optical plate may also be referred to as "outgoing light having a second polarization state".

Part (b) of FIG. 3 shows 3D glasses 300 used in this embodiment. As shown in part (b) of FIG. 3, the 3D glasses 300 include a right-eye lens and a left-eye lens.

The right-eye lens transmits only right-handed circularly polarized light, while the left-eye lens transmits only left-handed circularly polarized light. Accordingly, by using the 3D glasses 300, among images displayed on the liquid crystal display device 1, the user is able to view right-eye images displayed by using pixels defined by the odd-numbered gate bus lines only with the right eye, and view left-eye images displayed by using pixels defined by the even-numbered gate bus lines only with the left eye.

Accordingly, by using the pixels defined by the odd-numbered gate bus lines and the pixels defined by the even-numbered gate bus lines, a right-eye image and a left-eye image which have viewpoints different from each other are displayed, thereby enabling the user to view the images three-dimensionally.

The liquid crystal display device 1 can also display 2D images by using both of the pixels defined by the odd-numbered gate bus lines and the pixels defined by the even-numbered gate bus lines. In this case, the user simply views images displayed on the liquid crystal display device 1 without using the 3D glasses 300.

The 3D glasses 300 used in this embodiment do not need electrical control, which is necessary for 3D glasses used in the active shutter system. Thus, the 3D glasses 300 can be implemented with a simple structure.

Part (c) of FIG. 3 illustrates the overall configuration of a liquid crystal color television receiver including the liquid crystal display device 1 of this embodiment. The liquid crystal display device 1 is mounted on a display section of the liquid crystal color television receiver. The liquid crystal display device 1 of this embodiment may be used for a notebook personal computer, various types of displays, a cellular telephone terminal, and a personal digital assistant, as well as a liquid crystal color television receiver.

(Pixel Structure)

Figure 1:
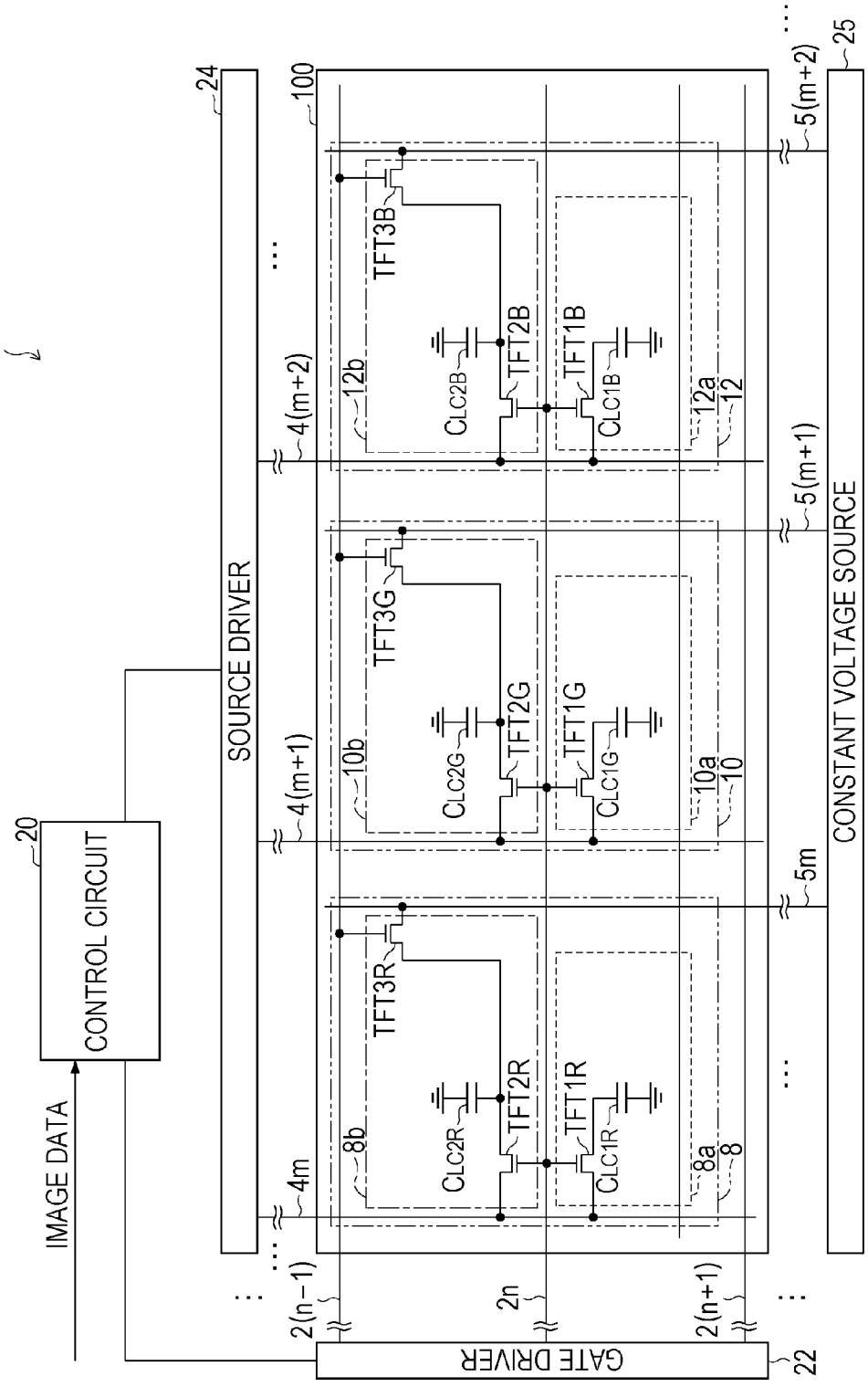
FIG. 1 illustrates, together with drivers, a constant voltage source, and a control circuit, an equivalent circuit of a liquid crystal panel of a liquid crystal display device according to a first embodiment of the present invention.

FIG. 1 illustrates, together with the drivers and the control circuit 20, an equivalent circuit of pixels having a multi-pixel structure forming one picture element on the liquid crystal panel 100 of the liquid crystal display device 1 according to this embodiment.

As shown in FIG. 1, a plurality of pixels are formed on the liquid crystal panel 100 of the liquid crystal display device 1, and the liquid crystal display device 1 drives individual pixels by using a driving method, such as a 3TFT driving method. The pixels each include a liquid crystal layer and an electrode which applies a voltage to the liquid crystal layer, and are arranged in a matrix form having rows and columns. The picture element is a unit constituted by pixels which individually display a plurality of different colors. In this embodiment, one picture element is constituted by an R pixel 8 which displays red, a G pixel 10 which displays green, and a B pixel which displays blue.

As shown in FIG. 1, the liquid crystal panel 100 of the liquid crystal display device 1 includes a plurality of gate bus lines 2, a plurality of source bus lines 4, a plurality of common bus lines 5, a plurality of switching elements TFT1 through TFT3, and a plurality of liquid crystal capacitors Clc1 and Clc2.

The plurality of gate bus lines 2 and the plurality of source bus lines 4 are formed such that they intersect with each other via an insulating film (not shown). In the liquid crystal display device 1, one of the R pixel 8 which displays red, the G pixel 10 which displays green, and the B pixel 12 which displays blue is formed in a region defined by one gate bus line 2 and one source bus line 4. The R pixel 8, the G pixel 10, and the B pixel 12 are formed adjacent to each other along the gate bus line 2. By using a combination of these pixels, a desired color image can be displayed.

A description will be given below of an example in which the liquid crystal display device 1 includes R pixels, G pixels, and B pixels. However, this embodiment is not restricted to such a configuration. For example, the liquid crystal display device 1 may include one or both of Ye pixels which display yellow and W pixels which display white, in addition to R pixels, G pixels, and B pixels. In this case, too, advantages described below will also be achieved.

(Bright Pixels and Dark Pixels)

Each of the R pixel 8, the G pixel 10, and the B pixel 12 has two sub pixels which can apply different voltages to the liquid crystal layers. As shown in FIG. 1, the R pixel 8 includes sub pixels 8a and 8b, the G pixel 10 includes sub pixels 10a and 10b, and the B pixel 12 includes sub pixels 12a and 12b. Hereinafter, the sub pixels 8a, 10a, and 12a may also be referred to as "bright pixels", and the sub pixels 8b, 10b, and 12b may also be referred to as "dark pixels". The reason for this will be discussed later.

In this embodiment, the pixels forming each picture element are arranged in the order of the R pixel 8, the G pixel 10, and the B pixel 12 along a gate bus line 2. The bright pixels are arranged on a first straight line parallel with a gate bus line 2, while the dark pixels are arranged on a second straight line parallel with a gate bus line 2.

The dark pixel 8b of the R pixel 8 defined by the gate bus line 2n and the bright pixel 8a of the R pixel 8 defined by the gate bus line 2(n+1) are adjacent to each other with a boundary which is parallel with a gate bus line 2 therebetween. The G pixel 10 and the B pixel 12 are also arranged in a similar manner.

The dark pixel 8b of the R pixel 8 and the dark pixel 10b of the G pixel 10 are adjacent to each other with a boundary which is parallel with a source bus line 4 therebetween, and the dark pixel 10b of the G pixel 10 and the dark pixel 12b of the B pixel 12 are adjacent to each other with a boundary which is parallel with a source bus line 4 therebetween. The bright pixels are also arranged in a similar manner.

(Liquid Crystal Capacitor)

The sub pixels of each pixel include liquid crystal capacitors. The bright pixels include liquid crystal capacitors Clc1, and the dark pixels include liquid crystal capacitors Clc2. More specifically, as shown in FIG. 1, the bright pixel 8a of the R pixel 8 includes Clc1R, and the dark pixel 8b of the R pixel 8 includes Clc2R. Similarly, the bright pixel 10a of the G pixel 10 includes Clc1G, and the dark pixel 10b of the G pixel 10 includes Clc2G. Similarly, the bright pixel 12a of the B pixel 12 includes Clc1B, and the dark pixel 12b of the R pixel 12 includes Clc2B.

Each of the liquid crystal capacitors is constituted by a sub pixel electrode, a liquid crystal layer, and a common electrode which opposes the sub pixel electrode with the liquid crystal layer therebetween.

(Switching Elements TFT1 and TFT2)

A TFT1 (thin-film transistor 1) and a TFT2 are formed in each of the R pixel 8, the G pixel 10, and the B pixel 12. Gate electrodes of the TFT1 and TFT2 are connected to the same gate bus line 2n, and source electrodes of the TFT1 and TFT2 are connected to the same source bus line 4. That is, as shown in FIG. 1, the source electrodes of the TFT1R and TFT2R of the R pixel 8 are connected to the source bus line 4m. Similarly, the source electrodes of the TFT1G and TFT2G of the G pixel 10 are connected to the source bus line 4(m+1), and the source electrodes of the TFT1B and TFT2B of the B pixel 12 are connected to the source bus line 4(m+2). The drain electrodes of the TFT1 and the TFT2 are connected to the corresponding sub pixel electrodes.

The TFT1 and TFT2, and a TFT3, which will be discussed below, enter a conducting state (ON state) when a high-level gate signal is applied to the gate electrodes of the TFT1 through the TFT3, and they enter a non-conducting state (OFF state, disconnection state) when a low-level gate signal is applied to the gate electrodes of the TFT1 through the TFT3.

(Switching Element TFT3)

The TFT3 is formed in a dark pixel of each of the R pixel 8, the G pixel 10, and the B pixel 12. More specifically, a TFT3R is formed in the dark pixel 8b of the R pixel 8, a TFT3G is formed in the dark pixel 10b of the G pixel 10, and a TFT3B is formed in the dark pixel 12b of the B pixel 12.

The gate electrode of the TFT3 is electrically connected to the gate bus line previous to the gate bus line which defines the pixel in which the TFT3 is formed, that is, it is electrically connected to the gate bus line 2(n−1). The drain electrode of each TFT3 is electrically connected to the sub pixel electrode of an associated one of the dark pixels 8b, 10b, and 12b. The source electrode of each TFT3 is connected to an associated common bus line 5. More specifically, the source electrode of the TFT3R is connected to the common bus line 5m, the source electrode of the TFT3G is connected to the common bus line 5(m+1), and the source electrode of the TFT3B is connected to the common bus line 5(m+2).

In the liquid crystal display device 1 of this embodiment, when the scanning direction is a backward direction, the gate bus line 2n is selected and electric charge is stored in the liquid crystal capacitors Clc1 of the bright pixels and in the liquid crystal capacitors Clc2 of the dark pixels. Then, after the lapse of a certain time, the gate bus line 2(n−1) is selected so as to turn ON the TFT3, thereby connecting the sub pixel electrodes of the dark pixels to the associated common bus lines 5.

Accordingly, when the scanning direction is a backward direction, after the previous gate bus line 2(n−1) has been selected, a voltage applied to the liquid crystal layer of each of the dark pixels is reduced, thereby decreasing the transmittance of the liquid crystal layers of the dark pixels.

A description has been given above, such that the gate electrode of the TFT3 is connected to the gate bus line 2(n−1) previous to the gate bus line 2n which defines the image. However, this embodiment is not restricted to this configuration, and, generally, the gate electrode of the TFT3 may be connected to the gate bus line 2(n−p) (p is a natural number which satisfies 1≤p<n) previous to the gate bus line 2n which defines the pixel.

(Layout of Each Sub Pixel)

A description will now be given, with reference to FIG. 4, of a specific configuration of a sub pixel on the liquid crystal panel 100. Hereinafter, the configuration of the R pixel 8 will be described, and the configurations of the G pixel 10 and the B pixel 12 are similar to the configuration of the R pixel 8.

Figure 4:
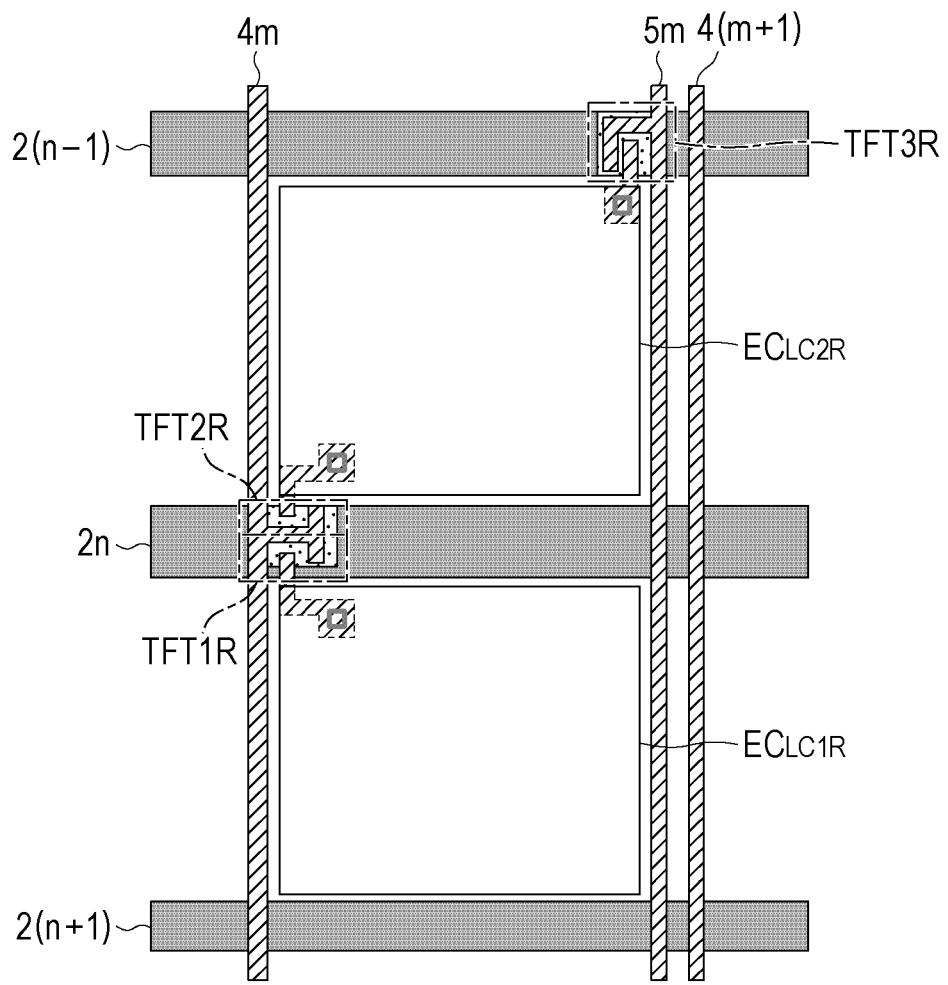
FIG. 4 is a plan view illustrating a layout of a specific configuration of a liquid crystal panel of the liquid crystal display device according to the first embodiment of the present invention.

FIG. 4 is a plan view illustrating a layout of a specific configuration of the R pixel 8 on the liquid crystal panel 100. As shown in FIG. 4, the gate bus lines 2 are formed by using a first electrode material, and the source bus lines 4 and the common bus line 5 are formed by using a second electrode material. In FIG. 4, ECLC1R and ECLC2R indicate sub pixel electrodes of the bright pixel 8a and the dark pixel 8b, respectively, and they are formed by using a third electrode material.

As shown in FIG. 4, the TFT1R and the TFT2R are formed on the gate bus line 2n, and the TFT3R is formed on the gate bus line 2(n−1). The source electrodes and the drain electrodes of the TFTs are formed by using the second electrode material. At the near side in the plane of FIG. 4, a liquid crystal layer corresponding to each of the sub pixels is disposed, and at the nearer side in the plane of FIG. 4, a common electrode is disposed, though they are not shown.

(Basic Operation of Liquid Crystal Display Device 1)

A basic driving method for the liquid crystal panel 100 of the liquid crystal display device 1 will be described below with reference to parts (a) through (e) of FIG. 5, parts (a) through (e) of FIG. 6, and parts (a) and (b) of FIG. 7. A description will first be given of the driving of the R pixel 8, followed by a description of the driving of the G pixel 10 and the B pixel 12.

Generally, the value of a liquid crystal capacitor and the value of a storage capacitor are dependent on voltages applied to the liquid crystal capacitor and the storage capacitor. However, since such a dependency is not a substantial factor in this embodiment, it will be ignored in the following description. Nevertheless, this assumption does not restrict this embodiment, and this embodiment may also be applicable even when there is such a dependency.

Moreover, a description will be given below, for a simple representation, of a case in which a positive voltage is supplied to individual sub pixel electrodes from a source bus line. However, a case in which a negative voltage is supplied to individual sub pixel electrodes from a source bus line may be equally considered.

(Driving of Liquid Crystal Panel 100 in 2D Display Mode)

The driving of the liquid crystal panel 100 in the 2D display mode, that is, the driving of the liquid crystal panel 100 when the scanning direction is a forward direction, will first be discussed.

Figure 5:
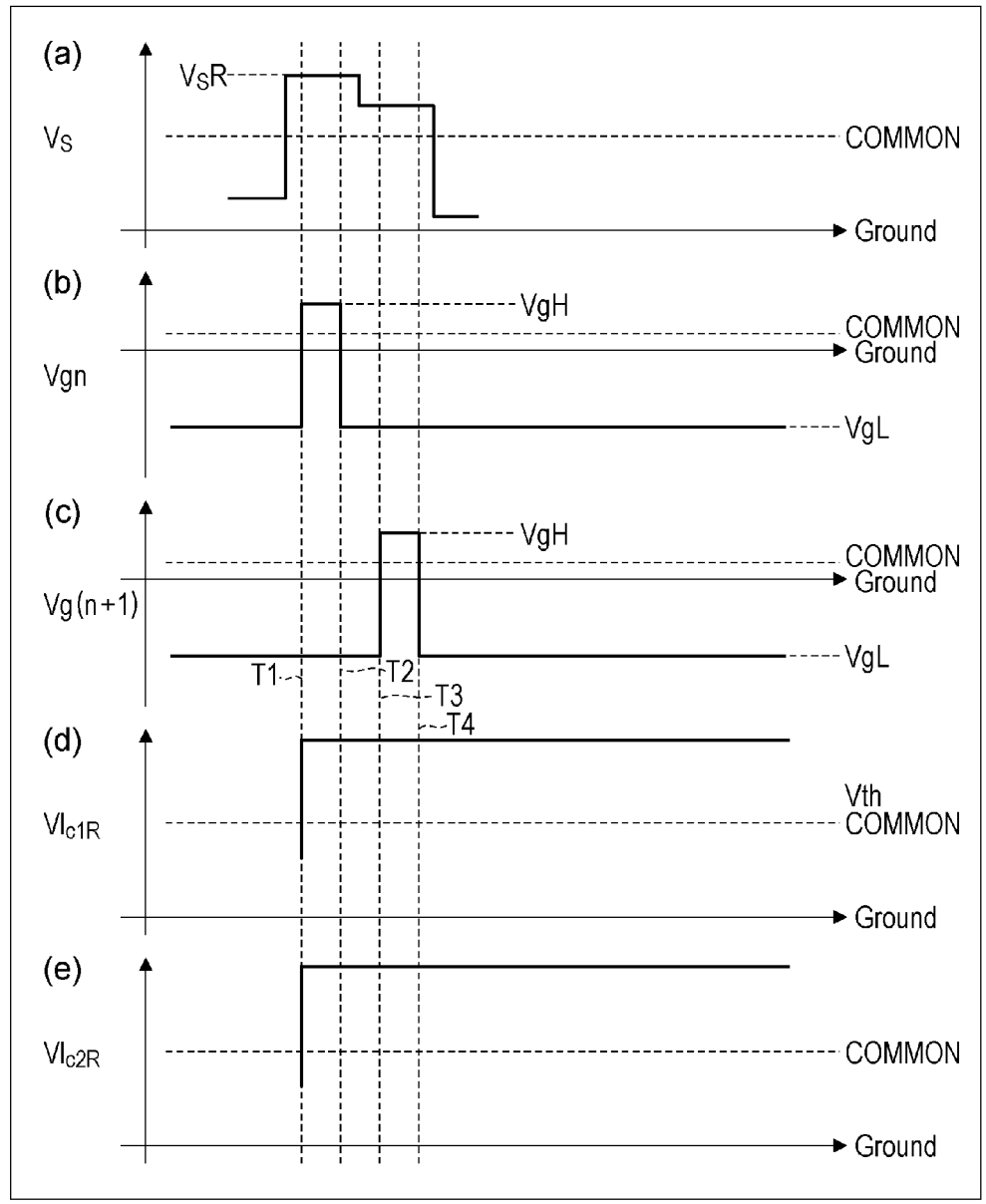
FIG. 5 is a timing chart schematically illustrating waveforms and timings of voltages when the liquid crystal display device according to the first embodiment of the present invention is driven in a 2D display mode: part (a) shows a voltage waveform of a data signal supplied from a source driver to a source bus line; part (b) shows a voltage waveform of a gate signal supplied from a gate driver to the n-th gate bus line; part (c) shows a voltage waveform of a gate signal supplied from the gate driver to the (n+1)-th gate bus line; part (d) shows a voltage waveform of a sub pixel electrode of a bright pixel disposed in a pixel which displays red; and part (e) shows a voltage waveform of a sub pixel electrode of a dark pixel disposed in a pixel which displays red.

Parts (a) through (e) of FIG. 5 are timing charts schematically illustrating waveforms and timings of voltages in the liquid crystal display device 1 when the scanning direction is a forward direction.

Part (a) of FIG. 5 shows a voltage waveform Vs of a data signal supplied from the source driver 24 to the source bus line 4. Part (b) of FIG. 5 shows a voltage waveform Vgn of a gate signal supplied from the gate driver 22 to the gate bus line 2n. Part (c) of FIG. 5 shows a voltage waveform Vg(n+1) of a gate signal supplied from the gate driver 22 to the gate bus line 2(n+1). Part (d) of FIG. 5 shows a voltage waveform Vlc1R of the sub pixel electrode of the bright pixel 8a disposed in the R pixel 8. Part (e) of FIG. 5 shows a voltage waveform Vlc2R of the sub pixel electrode of the dark pixel 8b disposed in the R pixel 8. The broken lines in FIG. 5 indicate a voltage waveform COMMON (Vcom) of the common electrodes.

(Driving of R Pixel 8)

At time T1, the voltage Vgn of a gate signal is changed from VgL (low) to VgH (high), thereby causing the TFT1R and TFT2R to be simultaneously in the conducting state (ON state). Then, the voltage of a data signal is applied to the sub pixel electrode of the bright pixel 8a and that of the dark pixel 8b via the source bus line 4, and the voltage Vlc1R of the sub pixel electrode of the bright pixel 8a and the voltage Vlc2R of the sub pixel electrode of the dark pixel 8b are changed to the voltage VsR of the data signal at time T1. Vlc1R and Vlc2R are expressed by equations (1a) and (1b), respectively.

$$Vlc1R = VsR \tag{1a}$$

$$Vlc2R = VsR \tag{1b}$$

The voltage VsR of the data signal transmitted via the source bus line 4 is a display voltage indicating a tone level to be displayed in the pixel, and is written into the corresponding pixel while the TFTs are in the ON state (a period in this state may also be called a "selection period").

In the selection period, the TFT3R is in the OFF state.

Subsequently, at time T2, the voltage Vgn of the gate signal is changed from VgH to VgL, thereby causing the TFT1R and TFT2R to be simultaneously in the non-conducting state (OFF state). Accordingly, the sub pixel electrode of the bright pixel 8a and that of the dark pixel 8b are all electrically insulated from the source bus line 4 (a period in this state may also be called a "non-selection period").

Generally, immediately after the TFT1R and TFT2R are switched from the ON state to the OFF state, due to a dropping phenomenon (also called a field-through phenomenon) caused by the influence of a parasitic capacitance, etc. of the TFT1R and TFT2R, the voltages Vlc1R and Vlc2R of the sub pixel electrodes are dropped by amounts of ΔVd1R and ΔVd2R, respectively. ΔVd1R and ΔVd2R are expressed by equations (2a) and (2b), respectively.

$$Vlc1R = VsR - \Delta Vd1R \tag{2a}$$

$$Vlc2R = VsR - \Delta Vd2R \tag{2b}$$

However, in the following description, the contribution of a voltage drop due to such a field-through phenomenon will be ignored. Similarly, the contribution of a field-through phenomenon in the TFT3 will also be ignored (in a second embodiment, such a contribution will also be ignored similarly).

Subsequently, the voltage Vg(n+1) of the gate signal is changed from VgL to VgH at time T3, and is changed from VgH to VgL at time T4. However, the voltages Vlc1R and Vlc2R of the sub pixel electrodes are not changed.

After the above-described process, effective voltages V1R_f and V2R_f applied to the liquid crystal layers of the bright pixel 8a and the dark pixel 8b, respectively, when the scanning direction is a forward direction are expressed by equations (3a) and (3b), respectively.

$$V1R\_f = VsR - Vcom \tag{3a}$$

$$V2R\_f = VsR - Vcom \tag{3b}$$

In this manner, in the 2D display mode, the effective voltages applied to the liquid crystal layers of the bright pixel 8a and the dark pixel 8b are equal to each other.

Accordingly, in the 2D display mode, the brightness level presented by the bright pixel 8a is substantially equal to that by the dark pixel 8b.

(Driving of G Pixel 10 and B Pixel 12)

The G pixel 10 is also driven in a similar manner. Effective voltages V1G_f and V2G_f applied to the liquid crystal layers of the bright pixel 10a and the dark pixel 10b when the scanning direction is a forward direction are expressed by equations (4a) and (4b), respectively.

$$V1G\_f = VsG - Vcom \tag{4a}$$

$$V2G\_f = VsG - Vcom \tag{4b}$$

The B pixel 12 is also driven in a similar manner. Effective voltages V1B_f and V2B_f applied to the liquid crystal layers of the bright pixel 12a and the dark pixel 12b when the scanning direction is a forward direction are expressed by equations (5a) and (5b), respectively.

$$V1B\_f = VsB - Vcom \tag{5a}$$

$$V2B\_f = VsB - Vcom \tag{5b}$$

In this manner, in the 2D display mode, the brightness level presented by the bright pixel 10a and that by the dark pixel 10b of the G pixel 10 are substantially equal to each other, and the brightness level presented by the bright pixel 12a and that by the dark pixel 12b of the B pixel 12 are substantially equal to each other.

Figure 7:
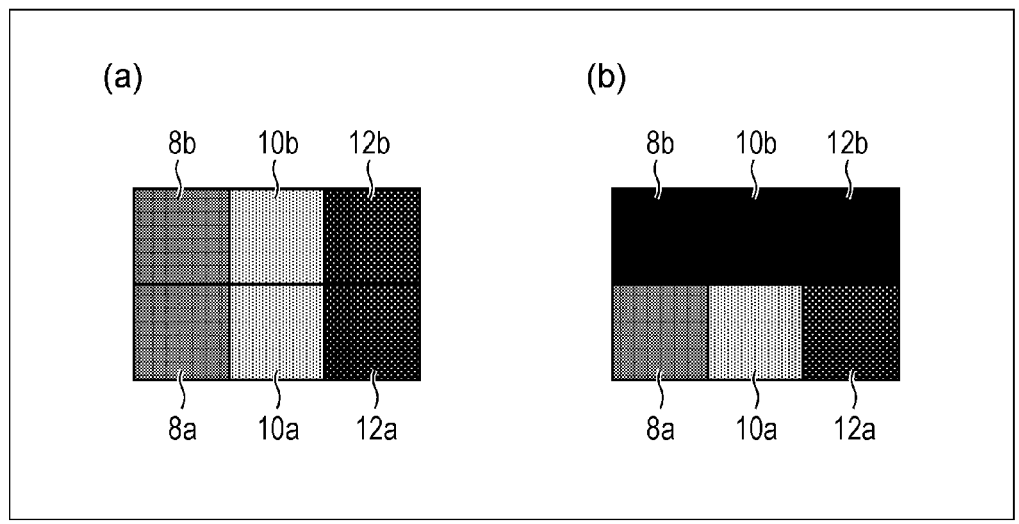
FIG. 7 schematically illustrates brightness levels presented by individual sub pixels of the liquid crystal display device according to the first embodiment of the present invention.

Part (a) of FIG. 7 schematically shows brightness levels presented by the sub pixels of the R pixel 8, the G pixel 10, and the B pixel 12 in the 2D display mode. As shown in part (a) of FIG. 7, in the 2D display mode, the bright pixel 8a and the dark pixel 8b indicate substantially the same brightness levels, the bright pixel 10a and the dark pixel 10b indicate substantially the same brightness levels, and the bright pixel 12a and the dark pixel 12b indicate substantially the same brightness levels.

(Driving of Liquid Crystal Panel 100 in 3D Display Mode)

A description will now be given of the driving of the liquid crystal panel 100 in the 3D display mode, that is, the driving of the liquid crystal panel 100 when the scanning direction is a backward direction. In the following description, a voltage supplied to the common bus line 5 will be represented by Vcom', and a voltage supplied to the common electrodes will be represented by Vcom. A description will be given below, assuming that Vcom'≥Vcom. However, this does not restrict this embodiment, and even when Vcom'<Vcom, this embodiment may also be implemented.

Figure 6:
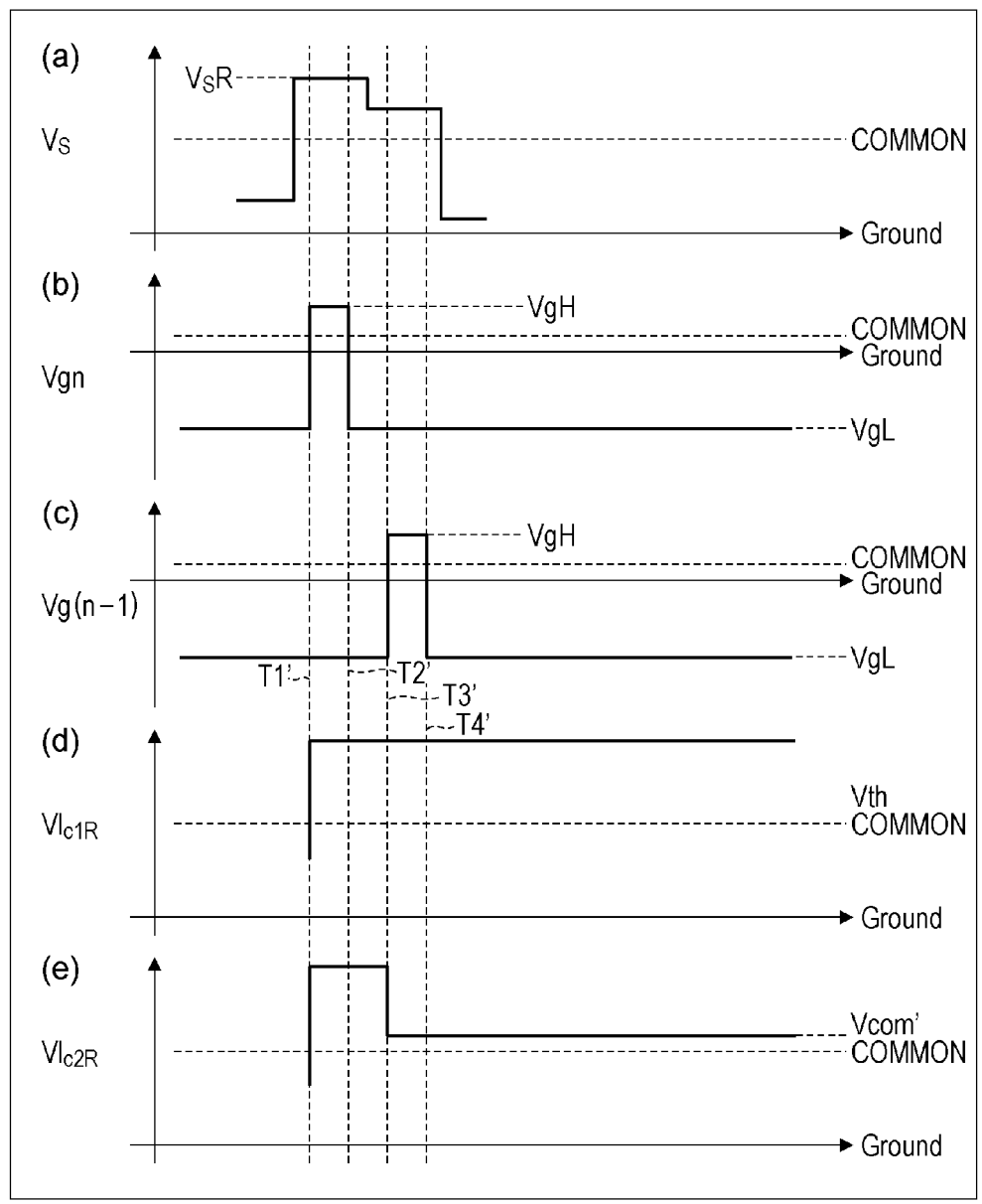
FIG. 6 is a timing chart schematically illustrating waveforms and timings of voltages when the liquid crystal display device according to the first embodiment of the present invention is driven in a 3D display mode: part (a) shows a voltage waveform of a data signal supplied from the source driver to a source bus line; part (b) shows a voltage waveform of a gate signal supplied from the gate driver to the n-th gate bus line; part (c) shows a voltage waveform of a gate signal supplied from the gate driver to the (n−1)-th gate bus line; part (d) shows a voltage waveform of a sub pixel electrode of a bright pixel disposed in a pixel which displays red; and part (e) shows a voltage waveform of a sub pixel electrode of a dark pixel disposed in a pixel which displays red.

Parts (a) through (e) of FIG. 6 are timing charts schematically illustrating waveforms and timings of voltages in the liquid crystal display device 1 when the scanning direction is a backward direction.

Part (a) of FIG. 6 shows a voltage waveform Vs of a data signal supplied from the source driver 24 to the source bus line 4. Part (b) of FIG. 6 shows a voltage waveform Vgn of a gate signal supplied from the gate driver 22 to the gate bus line 2n. Part (c) of FIG. 6 shows a voltage waveform Vg(n−1) of a gate signal supplied from the gate driver 22 to the gate bus line 2(n−1). Part (d) of FIG. 6 shows a voltage waveform Vlc1R of the sub pixel electrode of the bright pixel 8a of the R pixel 8. Part (e) of FIG. 6 shows a voltage waveform Vlc2R of the sub pixel electrode of the dark pixel 8*b* of the R pixel 8. The broken lines in FIG. 6 indicate voltage waveform COMMON (Vcom) of the common electrodes.

(Driving of R Pixel 8)

At time T1', the voltage Vgn of a gate signal is changed from VgL to VgH, thereby causing the TFT1R and TFT2R to be simultaneously in the conducting state (ON state). Then, the voltage of a data signal is applied to the sub pixel electrode of the bright pixel 8*a* and that of the dark pixel 8*b* via the source bus line 4, and the voltage Vlc1R of the sub pixel electrode of the bright pixel 8*a* and the voltage Vlc2R of the sub pixel electrode of the dark pixel 8*b* are changed to the voltage VsR of the data signal at time T1'. Vlc1R and Vlc2R are expressed by equations (6a) and (6b), respectively.

$$Vlc1R = VsR \tag{6a}$$

$$Vlc2R = VsR \tag{6b}$$

Subsequently, at time T2', the voltage Vgn of the gate signal is changed from VgH to VgL, thereby causing the TFT1R and TFT2R to be simultaneously in the OFF state. Accordingly, the sub pixel electrode of the bright pixel 8*a* and that of the dark pixel 8*b* are all electrically insulated from the source bus line 4.

Subsequently, at time T3', the voltage Vg(n−1) of the gate signal is changed from VgL to VgH, thereby causing the TFT3R to be in the ON state. Accordingly, the voltage Vlc2R of the sub pixel electrode of the dark pixel 8*b* is changed to the voltage Vcom' of the common bus line 5. In contrast, the voltage Vlc1R of the sub pixel electrode of the bright pixel 8*a* is not changed.

$$Vlc1R = VsR \tag{8a}$$

$$Vlc2R = Vcom' \tag{8b}$$

Subsequently, at time T4', the voltage Vg(n−1) of the gate signal is changed from VgH to VgL, thereby causing the TFT3R to be in the OFF state.

After the above-described process, effective voltages V1R_b and V2R_b applied to the liquid crystal layers of the bright pixel 8*a* and the dark pixel 8*b*, respectively, when the scanning direction is a backward direction are expressed by equations (9a) and (9b), respectively.

$$V1R\_b = VsR - Vcom \tag{9a}$$

$$V2R\_b = Vcom' - Vcom \tag{9b}$$

In this case, by setting the result of Vcom'−Vcom to be equal to or smaller than a threshold voltage Vth of the liquid crystal layer, the dark pixel 8*b* does not present brightness. For example, by setting that Vcom'=Vcom, the dark pixel 8*b* does not present brightness.

The threshold voltage Vth is a voltage at which the orientation of a liquid crystal starts to change as a voltage applied to the liquid crystal increases. A pixel provided in a VA-mode liquid crystal display device, such as that used in this embodiment, does not present brightness when the voltage applied to the liquid crystal of the pixel is equal to or smaller than the threshold voltage, and starts to present brightness when the voltage applied to the liquid crystal exceeds the threshold voltage.

In this manner, in the 3D display mode, the dark pixel 8*b* of the R pixel 8 does not present brightness.

(Driving of G Pixel 10 and B Pixel 12)

The G pixel 10 is also driven in a similar manner. Effective voltages V1G_b and V2G_b applied to the liquid crystal layers of the bright pixel 10*a* and the dark pixel 10*b* when the scanning direction is a backward direction are expressed by equations (10a) and (10b), respectively.

$$V1G\_b = VsG - Vcom \tag{10a}$$

$$V2G\_b = Vcom' - Vcom \tag{10b}$$

The B pixel 12 is also driven in a similar manner. Effective voltages V1B_b and V2B_b applied to the liquid crystal layers of the bright pixel 12*a* and the dark pixel 12*b* when the scanning direction is a backward direction are expressed by equations (11a) and (11b), respectively.

$$V1B\_b = VsB - Vcom \tag{11a}$$

$$V2B\_b = Vcom' - Vcom \tag{11b}$$

In a manner similar to the R pixel 8, by setting the result of Vcom'−Vcom to be equal to or smaller than the threshold voltage Vth of the liquid crystal layer, the dark pixels 10*b* and 12*b* do not present brightness.

In this manner, in the 3D display mode, the dark pixel 10*b* of the G pixel 10 and the dark pixel 12*b* of the B pixel 12 can be configured such that they do not present brightness.

Part (b) of FIG. 7 schematically shows brightness levels presented by the sub pixels of the R pixel 8, the G pixel 10, and the B pixel 12 in the 3D display mode. As shown in part (b) of FIG. 7, in the 3D display mode, the dark pixels 8*a*, 10*b*, and 12*b* of the R pixel 8, the G pixel 10, and the B pixel 12, respectively, do not present brightness.

Thus, the dark pixels of the R pixel 8, the G pixel 10, and the B pixel 12 function as black matrixes in the 3D display mode.

(Effect of Suppressing Crosstalk in 3D Display Mode)

The effect of suppressing the occurrence of crosstalk by using the liquid crystal display device 1 when the 3D display mode is selected will be discussed below.

FIG. 8 is a sectional view illustrating, by way of example, the backlight unit BLU, the liquid crystal panel 100, and the patterned retarder 200, having a cross section parallel with the source bus lines 4. In the example shown in FIG. 8, the liquid crystal panel 100 includes a first polarizing sheet 100*a*, a TFT-Glass 100*b*, a TFT substrate 100*c*, a color filter 100*d*, a CF-Glass 100*e*, and a second polarizing sheet 100*f*. The TFTs, the liquid crystal capacitors, and the storage capacitors of the individual pixels are formed on the TFT substrate 100*c*.

The polarization state of light which has emitted from the backlight unit BLU and which has passed through the liquid crystal panel 100 is such that it has been transformed into linearly polarized light due to the function of the second polarizing sheet 100*f*.

The patterned retarder 200 includes two types of retarder plates RR and RL on the side opposing the liquid crystal panel 100. The retarder plates RR convert linearly polarized light into right-handed circularly polarized light, while the retarder plates RL convert linearly polarized light into left-handed circularly polarized light. The boundary between the retarder plates RR and RL is set such that a line perpendicularly extending from the boundary to the TFT substrate 100*c* intersects with a dark pixel.

The boundary between the retarder plates RR and RL is preferably set such that a line perpendicularly extending from the boundary to the TFT substrate 100*c* intersects with a straight line which equally divides a dark pixel into two portions in the vertical direction. With this setting, the effect of suppressing the occurrence of crosstalk can be enhanced.

As stated above, in the 3D display mode, since dark pixels do not present brightness, they function as black matrixes.

As shown in FIG. 8, out of the amount of light emitting from a bright pixel disposed at the back side of the retarder plate RL, light emitting from and near the boundary between the bright pixel and the dark pixel passes through the retarder plate RL if the angle between the propagation direction of the light and the direction of a normal to the liquid crystal panel is within θ (theta) degrees in the vertically downward direction of the liquid crystal panel. Similarly, out of the amount of light emitting from a bright pixel disposed at the back side of the retarder plate RR, light emitting from and near the boundary between the bright pixel and the dark pixel passes through the retarder plate RR if the angle between the propagation direction of the light and the direction of a normal to the liquid crystal panel is within θ (theta) degrees in the vertically upward direction of the liquid crystal panel.

Accordingly, in the liquid crystal display device 1, as shown in FIG. 8, if the angle between the direction of a normal to the liquid crystal panel 100 and a viewing direction is within θ degrees along the vertical direction of the liquid crystal panel, it is possible to suppress the occurrence of crosstalk.

In the 2D display mode, the dark pixels provided in the liquid crystal display device 1 present brightness, and thus, the brightness of a displayed image is enhanced, compared with a configuration in which black matrixes which do not present brightness in any of the display modes are disposed, instead of dark pixels.

The configurations of the liquid crystal panel 100 and the patterned retarder 200 of this embodiment are not restricted to the examples shown in FIG. 8. For example, a black stripe having a width smaller than the vertical width of a dark pixel may be disposed around a boundary between retarder plates RR and RL. With this configuration, due to the presence of a black stripe, the effect of suppressing the occurrence of crosstalk can be enhanced. The vertical width of a black stripe is smaller than that of a dark pixel, and thus, the brightness of a displayed image is enhanced, compared with a configuration in which black matrixes which do not present brightness in any of the display modes are disposed, instead of dark pixels.

As discussed above, by using the liquid crystal display device 1 of this embodiment, in the 3D display mode, after the application of a common data voltage to the liquid crystal layers of the individual sub pixels, the voltage applied to the liquid crystal layer of a dark pixel is changed, thereby enabling the dark pixel to function as a black matrix. In contrast, in a known configuration in which data voltages are separately supplied to a dark pixel and a bright pixel, it is necessary that data bus lines for supplying the data voltages to the dark pixel and to the bright pixel be provided.

By using the liquid crystal display device 1 of this embodiment, the number of data bus lines can be reduced by half or less of that of such a known configuration.

(Appendixes Concerning 3D Display Mode)

A description has been given above, such that dark pixels provided in the liquid crystal display device 1 do not present brightness in the 3D display mode. However, this embodiment is not restricted by this configuration. For example, in the 3D display mode, the voltage Vcom' supplied to the common bus line 5 may be set so that the brightness presented by dark pixels will be equal to or smaller than a predetermined brightness level. With this setting, the occurrence of crosstalk can also be reduced.

Parts (a) through (d) of FIG. 9 show a case in which a voltage supplied to the common bus line 5 is set so that the brightness presented by dark pixels may be equal to or smaller than a predetermined brightness level. Part (a) is a sectional view showing part of the liquid crystal panel 100 and part of the patterned retarder 200. Part (b) shows image light viewed by a viewer when the viewing direction is a direction of a normal to the liquid crystal panel 100. Part (c) shows image light viewed by a viewer when the angle between a viewing direction and the direction of a normal to the liquid crystal panel 100, the angle being along the vertical direction of the liquid crystal panel 100, is a predetermined angle β (beta). Part (d) shows image light viewed by a viewer when the angle between a viewing direction and the direction of a normal to the liquid crystal panel 100, the angle being along the vertical direction of the liquid crystal panel 100, is greater than the predetermined angle β.

In parts (a) through (d) of FIG. 9, RB indicates a dark pixel which displays a right-eye image, and RA indicates a bright pixel which displays a right-eye image. Similarly, LB indicates a dark pixel which displays a left-eye image, and LA indicates a bright pixel which displays a left-eye image. The dark pixels RB and LB correspond to one of the dark pixels 8c, 10c, and 12c. The sub pixels RA and LA correspond to one of the bright pixels 8a, 10a, and 12a.

In the following description, as shown in part (a) of FIG. 9, the boundary between the retarder plates RR and RL is set such that a line perpendicularly extending from the boundary to the TFT substrate 100c intersects with a straight line which equally divides a dark pixel into two portions in the vertical direction. With this setting, the effect of reducing the occurrence of crosstalk can be enhanced.

As shown in part (c) of FIG. 9, the above-described predetermined angle β is an angle between a normal to the liquid crystal panel 100 and a straight line passing through both of (1) the boundary between the bright pixel RA and the dark pixel RB and (2) a portion of the boundary between the retarder plates RR and RL which is positioned closest to the dark pixel RB. The angle β is also an angle along the vertical direction of the liquid crystal panel 100. The angle β in part (c) of FIG. 9 corresponds to the angle θ in FIG. 8.

As shown in parts (b) through (d) of FIG. 9, the brightness of image light emitting from the dark pixel RB and passing through the retarder plate RL is represented by IRBL, the brightness of image light emitting from the bright pixel LA and passing through the retarder plate RL is represented by ILAL, the brightness of image light emitting from the dark pixel LB and passing through the retarder plate RL is represented by ILBL, and the brightness of image light emitting from the bright pixel RA and passing through the retarder plate RL is represented by IRAL.

The brightness IRBL, the brightness ILAL, the brightness ILBL, and the brightness IRAL are effective brightness levels of image light emitting from the associated sub pixels and passing through the retarder plates, that is, brightness levels after time T4' in the timing chart shown in FIG. 4.

The image light emitting from the dark pixel RB and passing through the retarder plate RL is image light which may cause crosstalk, and the image light emitting from the bright pixel LA and passing through the retarder plate RL and the image light emitting from the dark pixel LB and passing through the retarder plate RL are items of image light which do not cause crosstalk.

As shown in parts (b) and (c) of FIG. 9, when the angle between a viewing direction and the direction of a normal to the liquid crystal panel 100, the angle being along the longitudinal direction of the liquid crystal panel 100, is β or smaller, the brightness IRAL is 0. As shown in part (d) of FIG. 9, when the angle between a viewing direction and the direction of a normal to the liquid crystal panel 100, the angle being along the longitudinal direction of the liquid crystal panel 100, is greater than β, the brightness IRAL is not generally 0.

The inventors have discovered by experiment that, if the level of crosstalk is equal to or smaller than an amount of ±3 tone levels when 32 tone levels are displayed, a viewer does not recognize such crosstalk as crosstalk. The amount of ±3 tone levels when 32 tone levels are displayed corresponds to a brightness difference of 20%.

According to the above-described discovery made by the inventors, in the liquid crystal display device 1, the voltage Vcom' supplied to the common bus line 5 is preferably set so that the following inequality (A1) may hold true.

$$IRBL/(ILAL+ILBL)<0.2 \quad (A1)$$

It is preferable that the inequality (A1) also holds true in the case of the maximum tone level, that is, when the data voltage supplied to each sub pixel takes a maximum value.

In other words, the liquid crystal display device 1 may preferably drive the sub pixels so that, when the angle between a viewing direction and the direction of a normal to the liquid crystal panel 100, the angle being along the longitudinal direction of the liquid crystal panel 100, is the above-described angle β or smaller, the brightness of image light which has emitted from the liquid crystal panel 100 in the viewing direction and passed through the retarder plate RL and which may cause crosstalk will be smaller than 20% of the brightness of image light which has emitted from the liquid crystal panel 100 in the viewing direction and passed through the retarder plate RL and which does not cause crosstalk.

Similarly, the liquid crystal display device 1 may preferably drive the sub pixels so that, when the angle between a viewing direction and the direction of a normal to the liquid crystal panel 100, the angle being along the longitudinal direction of the liquid crystal panel 100, is the above-described angle β or smaller, the brightness of image light which has emitted from the liquid crystal panel 100 in the viewing direction and passed through the retarder plate RR and which may cause crosstalk will be smaller than 20% of the brightness of image light which has emitted from the liquid crystal panel 100 in the viewing direction and passed through the retarder plate RR and which does not cause crosstalk.

The inventors have discovered that if, image light which has passed through one of the retarder plates RL and RR and which may cause crosstalk is smaller than 20% of the brightness of image light which has passed through the same retarder plate and which does not cause crosstalk, a viewer does not recognize such crosstalk as crosstalk.

Accordingly, in the above-described configuration, even when the brightness presented by dark pixels is not 0, a viewer does not recognize the occurrence of crosstalk.

The retarder plates RR and RL may be formed so that the transmittances of these plates are substantially the same. In this case, if the brightness presented by the dark pixel RB is smaller than 20% of the brightness presented by the sub pixel LA, the inequality (A1) holds true in a viewing direction in which the brightness IRAL becomes 0.

Accordingly, in this configuration, too, the occurrence of crosstalk is not recognized by a viewer.

(Appendixes concerning Number of Sub Pixels in Each Pixel)

In the foregoing description, a configuration in which the R pixel 8, the G pixel 10, and the B pixel 12 each include two sub pixels (a bright pixel and a dark pixel) has been discussed by way of example. However, this embodiment is not restricted by this configuration. For example, the R pixel 8, the G pixel 10, and the B pixel 12 may also each include a sub pixel other than a dark pixel and a bright pixel (such a sub pixel may also be called an intermediate pixel). In this case, the brightness of the intermediate pixel is preferably lower than that of a bright pixel both in the 2D display mode and the 3D display mode. With this configuration, the viewing angle characteristics can be enhanced both in the 2D display mode and the 3D display mode.

(Application to Normally White Liquid Crystal Display Device)

In a normally white liquid crystal display device, as the absolute value of a voltage applied to a liquid crystal layer of a sub pixel becomes greater, the brightness presented by the sub pixel becomes smaller. Thus, when the above-described liquid crystal panel 100 is applied to a normally white liquid crystal display device, in the 3D display mode, for example, the absolute value of the difference between the voltage Vcom' supplied to the common bus line 5 and the voltage Vcom of the common electrode is set to be sufficiently large so that each dark pixel may not present brightness in the 3D display mode. With the application to a normally white liquid crystal display device, too, Vcom and Vcom' are set so that the above-described mathematical expression (A1) may hold true.

First Modified Example of First Embodiment

The circuit configuration of the liquid crystal panel 100 of this embodiment is not restricted to the configuration described above. A first modified example of this embodiment will be discussed below with reference to parts (a) and (b) of FIG. 10. Portions discussed above are designated by like reference numerals and signs, and an explanation thereof will thus be omitted.

Part (a) of FIG. 10 is an equivalent circuit diagram of a liquid crystal panel, concerning an R pixel 8, according to this modified example. As shown in part (a) of FIG. 10, the liquid crystal panel of this modified example includes an auxiliary capacitor CAR in the dark pixel 8b, in addition to the elements of the R pixel 8 on the above-described liquid crystal panel 100. The auxiliary capacitor CAR is connected to the drain electrode of the TFT2R while being connected in series with the liquid crystal capacitor Clc2R. More specifically, one end of the auxiliary capacitor CAR is connected to the drain electrode of the TFT2R and to the drain electrode of the TFT3R, and the other end of the auxiliary capacitor CAR is connected to the sub pixel electrode of the dark pixel 8b. The G pixel 10 and the B pixel 12 provided on the liquid crystal panel of this modified example are configured in a similar manner.

Part (b) of FIG. 10 is a plan view illustrating a layout of a specific configuration of the R pixel 8 on the liquid crystal panel of this modified example. As shown in part (b) of FIG. 10, the gate bus lines 2 are formed by using a first electrode material, and the source bus lines 4 and the common bus line 5 are formed by using a second electrode material. In part (b) of FIG. 10, ECLC1R and ECLC2R indicate sub pixel electrodes of the bright pixel 8a and the dark pixel 8b, respectively, and they are formed by using a third electrode material.

As shown in part (b) of FIG. 10, the TFT1R and the TFT2R are formed on the gate bus line 2n, and the TFT3R is formed on the gate bus line 2(n−1). The source electrodes and the drain electrodes of the TFTs are formed by using the second electrode material. Additionally, at the central portion of the sub pixel electrode ECLC2R of the dark pixel 8b, the auxiliary capacitor CAR is formed by using the sub pixel electrode ECLC2R itself and the second electrode material. In this case, it is preferable that an interlayer insulating film is not disposed between the second electrode material and the central portion of the sub pixel electrode ECLC2R in which the auxiliary capacitor CAR is formed. The sub pixel electrode ECLC2R is formed (at the near side in the plane of the drawing) in a layer higher than the second electrode material. Additionally, at the near side in the plane of part (b) of FIG. 10, a liquid crystal layer corresponding to each of the sub pixels is disposed, and at the nearer side in the plane of part (b) of FIG. 10, a common electrode is disposed, though they are not shown.

(Driving of Liquid Crystal Panel of this Modified Example)

The driving of the liquid crystal panel of this modified example is similar to that of the liquid crystal panel 100 discussed above, but it is different from that of the liquid crystal panel 100 in the following points.

In the liquid crystal panel of this modified example, due to the contribution of the auxiliary capacitor CAR, a voltage difference is generated between the effective voltage applied to the sub pixel electrode of the bright pixel 8a and that of the dark pixel 8b.

More specifically, effective voltages V1R_f and V2R_f applied to the liquid crystal layers of the bright pixel 8a and the dark pixel 8b, respectively, when the 2D display mode is selected, that is, when the scanning direction is a forward direction, are expressed by equations (12a) and (12b), respectively:

$$V1R\_f = VsR - Vcom \quad (12a)$$

$$V2R\_f = (VsR - Vcom) \times CAR/(CAR + Clc1R) \quad (12b)$$

where VsR is a voltage of a data signal at a time at which the TFT1R and TFT2R are changed to the ON state.

The effective voltages VCAR_f applied across the auxiliary capacitor CAR when the scanning direction is a forward direction is expressed by the following equation.

$$VCAR\_f = (VsR - Vcom) \times Clc1R/(CAR + Clc1R)$$

As is seen from mathematical equations (12a) and (12b), in the liquid crystal panel of this modified example, the effective voltage applied to the liquid crystal layer of the dark pixel 8b is smaller than that to the liquid crystal layer of the bright pixel 8a in the 2D display mode. Accordingly, in the liquid crystal panel of this modified example, the dark pixel 8b presents a lower level of brightness than the bright pixel 8a in the 2D display mode.

Effective voltages applied to the liquid crystal layers of the bright pixel 10a and the dark pixel 10b of the G pixel 10 and effective voltages applied to the liquid crystal layers of the bright pixel 12a and the dark pixel 12b of the B pixel 12 when the 2D display mode is selected are expressed in a similar manner.

In this manner, in the liquid crystal panel of this modified example, a dark pixel and a bright pixel present different levels of brightness in the 2D display mode, and thus, the effect of enhancing the viewing angle characteristics is also achieved.

On the other hand, effective voltages V1R_b and V2R_b applied to the liquid crystal layers of the bright pixel 8a and the dark pixel 8b, respectively, when the 3D display mode is selected, that is, when the scanning direction is a backward direction, are expressed by equations (13a) and (13b), respectively:

$$V1R\_b = VsR - Vcom \quad (13a)$$

$$V2R\_b = (Vcom' - Vcom) \times CAR/(CAR + Clc1R) \quad (13b)$$

where Vcom' and Vcom are voltages supplied to the common bus line 5 and the common electrodes, respectively, as stated above.

The effective voltages VCAR_b applied across the auxiliary capacitor CAR when the scanning direction is a backward direction is expressed by the following equation.

$$VCAR\_b = (Vcom' - Vcom) \times Clc1R/(CAR + Clc1R)$$

As is seen from mathematical equation (13b), by setting the result of (Vcom'−Vcom)×CAR/(CAR+Clc1R) to be equal to or smaller than the threshold voltage Vth of the liquid crystal layer, the dark pixel 8b does not present brightness.

Effective voltages applied to the liquid crystal layers of the bright pixel 10a and the dark pixel 10b of the G pixel 10 and effective voltages applied to the liquid crystal layers of the bright pixel 12a and the dark pixel 12b of the B pixel 12 when the 3D display mode is selected are expressed in a similar manner.

In this manner, in the liquid crystal panel of this modified example, a dark pixel and a bright pixel present different levels of brightness in the 2D display mode, thereby enhancing the viewing angle characteristics, and also, in the 3D display mode, each of the dark pixels functions as a black matrix.

Second Modified Example of First Embodiment

A second modified example of this embodiment will be discussed below with reference to parts (a) and (b) of FIG. 11. Portions discussed above are designated by like reference numerals and signs, and an explanation thereof will thus be omitted.

Part (a) of FIG. 11 is an equivalent circuit diagram of a liquid crystal panel, concerning an R pixel 8, according to this modified example. As shown in part (a) of FIG. 11, the liquid crystal panel of this modified example includes an auxiliary capacitor CAR in the dark pixel 8b, in addition to the elements of the R pixel 8 on the above-described liquid crystal panel 100. The auxiliary capacitor CAR is connected to the drain electrode of the TFT2R while being connected in series with the liquid crystal capacitor Clc2R. One end of the auxiliary capacitor CAR is connected to the drain electrode of the TFT2R and the other end of the auxiliary capacitor CAR is connected to the sub pixel electrode of the dark pixel 8b. Unlike the configuration of the first modified example of the first embodiment, the drain electrode of the TFT3R is connected to the sub pixel electrode of the dark pixel 8b. The G pixel 10 and the B pixel 12 on the liquid crystal panel of this modified example are configured in a similar manner.

Part (b) of FIG. 11 is a plan view illustrating a layout of a specific configuration of the R pixel 8 on the liquid crystal panel of this modified example. As shown in part (b) of FIG. 11, the gate bus lines 2 are formed by using a first electrode material, and the source bus lines 4 and the common bus line 5 are formed by using a second electrode material. In part (b) of FIG. 11, ECLC1R and ECLC2R indicate sub pixel electrodes of the bright pixel 8a and the dark pixel 8b, respectively, and they are formed by using a third electrode material.

As shown in part (b) of FIG. 11, the TFT1R and the TFT2R are formed on the gate bus line 2n, and the TFT3R is formed on the gate bus line 2(n−1). The source electrodes and the drain electrodes of the TFTs are formed by using the second electrode material. Additionally, at the central portion of the sub pixel electrode ECLC2R of the dark pixel 8b, the auxiliary capacitor CAR is formed by using the sub pixel electrode ECLC2R itself and the second electrode material. Unlike the configuration of the first modified example of the first embodiment, the drain electrode of the TFT3R is connected to the sub pixel electrode ECLC2R of the dark pixel 8b. In this case, it is preferable that an interlayer insulating film is not disposed between the second electrode material and the central portion of the sub pixel electrode ECLC2R in which the auxiliary capacitor CAR is formed. The sub pixel electrode ECLC2R is formed in a layer (at the near side in the plane of the drawing) higher than the second electrode material. Additionally, at the near side in the plane of part (b) of FIG. 11, a liquid crystal layer corresponding to each of the sub pixels is disposed, and at the nearer side in the plane of part (b) of FIG. 11, a common electrode is disposed, though they are not shown.

(Driving of Liquid Crystal Panel of this Modified Example)

The driving of the liquid crystal panel of this modified example is similar to that of the liquid crystal panel of the first modified example of the first embodiment which has been discussed above, but it is different from that of the liquid crystal panel of the first modified example discussed above in the following points.

In the liquid crystal panel of this modified example, unlike the liquid crystal panel of the first modified example of the first embodiment, the drain electrode of the TFT3R is connected to the sub pixel electrode of the dark pixel 8b. Thus, effective voltages V1R_b and V2R_b applied to the liquid crystal layers of the bright pixel 8a and the dark pixel 8b, respectively, when the 3D display mode is selected are expressed by equations (13a) and (13b'), respectively.

$$V1R\_b = VsR - Vcom \quad (13a)$$

$$V2R\_b = (Vcom' - Vcom) \quad (13b')$$

As is seen from mathematical equation (13b'), in this modified example, by setting the result of (Vcom'−Vcom) to be equal to or smaller than the threshold voltage Vth of the liquid crystal layer, the dark pixel 8b does not present brightness. The G pixel 10 and the B pixel 12 are configured in a similar manner.

In this manner, in this modified example, too, each of the dark pixels functions as a black matrix in the 3D display mode.

It is noted that effective voltages applied to the liquid crystal layers of the bright pixel 8a and the dark pixel 8b in the 2D display mode are similar to those applied to the liquid crystal layers of the bright pixel 8a and the dark pixel 8b in the 2D display mode in the first modified example of the first embodiment.

Accordingly, in this modified example, too, a dark pixel and a bright pixel present different levels of brightness in the 2D display mode, thereby enhancing the viewing angle characteristics.

In the liquid crystal panel of this modified example, it is less likely that the sub pixel electrodes will be in the floating state than those of the liquid crystal panel of the first modified example.

Second Embodiment

A second embodiment of the present invention will be described below with reference to FIGS. 12 through 18. In the following description, as in the first embodiment, a vertical alignment liquid crystal display device (VA (Vertical Alignment) liquid crystal display device) using a liquid crystal material exhibiting negative dielectric anisotropy is illustrated by way of example. However, the present invention is not restricted to this type of liquid crystal display device, and may be applicable to, for example, a TN (Twisted Nematic) type or an IPS (In-Plane Switching) type of liquid crystal display device. Additionally, in the following description, a normally black liquid crystal display device is illustrated by way of example, in which, as the absolute value of a voltage applied to a liquid crystal layer becomes greater, the transmittance of the liquid crystal layer increases. However, this embodiment is not restricted to this type of liquid crystal display device, and may be applicable to a normally white liquid crystal display device in which, as the absolute value of a voltage applied to a liquid crystal layer becomes greater, the transmittance of the liquid crystal layer decreases.

(Configuration of Liquid Crystal Display Device 1')

The configuration of a liquid crystal display device 1' according to this embodiment will be described below with reference to FIG. 12 and parts (a) and (b) of FIG. 13. The liquid crystal display device 1' is operated in one of a 2D display mode in which images cannot be displayed three-dimensionally and a 3D display mode in which images can be displayed three-dimensionally. In this case, as in the liquid crystal display device 1, a user may be able to select one of the two display modes. Alternatively, the liquid crystal display device 1' may automatically select one of the two display modes by referring to mode information associated with image data indicating an image to be displayed. Portions described in the first embodiment are designated by like reference numerals and signs, and an explanation thereof will thus be omitted.

FIG. 12 illustrates the configuration of the liquid crystal display device 1' according to this embodiment. The liquid crystal display device 1' includes, as shown in FIG. 12, a liquid crystal panel 100', a control circuit 20', a gate driver 22, a source driver 24, and a CS driver 26. FIG. 12 illustrates an equivalent circuit of pixels having a multi-pixel structure forming one picture element on the liquid crystal panel 100'.

As shown in FIG. 12, the liquid crystal display device 1' includes, on the liquid crystal panel 100', a plurality of gate bus lines 2, a plurality of source bus lines 4, a plurality of CS bus lines (auxiliary capacitor bus lines) 61, a plurality of CS bus lines 62 (auxiliary capacitor bus lines), and pixels defined by the associated gate bus lines and the associated source bus lines. In FIG. 12, a CS bus line 61n indicates the n-th CS bus line 61 and a CS bus line 62n indicates the n-th CS bus line 62. Hereinafter, a combination of a CS bus line 61 and a CS bus line 62 may also be denoted by a CS bus line 6.

(Driver)

As shown in FIG. 12, the gate driver 22 which supplies a gate signal to each of the gate bus lines 2, the source driver 24 which supplies a data signal to each of the source bus lines 4, and the CS driver 26 which supplies an auxiliary capacitor driving signal (auxiliary capacitor signal) (CS signal) to each of the CS bus lines 6 are connected to the liquid crystal panel 100' of the liquid crystal display device 1'. These drivers are all operated on the basis of a control signal output from the control circuit 20'.

(Control Circuit 20')

The control circuit 20' calculates the tone value of each pixel from brightness information indicating the brightness of each picture element and from color difference information indicating the color difference of each picture element, the brightness information and the color difference information being included in image data indicating an image to be displayed.

The control circuit 20' controls the timing of a gate signal supplied from the gate driver 22, the timing of a data signal supplied from the source driver 24, and the timing of a CS signal supplied from the CS driver 26.

As in the first embodiment, when the 2D display mode is selected, the gate driver 22 supplies a gate signal to each of the gate bus lines 2 so that the scanning direction may be a forward direction. When the 3D display mode is selected, the gate driver 22 supplies a gate signal to each of the gate bus lines 2 so that the scanning direction may be a backward direction.

Additionally, when the 2D display mode is selected, the CS driver 26 of this embodiment supplies square signals having opposite phases to the CS bus lines 61 and 62, and when the 3D display mode is selected, the CS driver 26 supplies a constant voltage to the CS bus lines 61 and 62.

(Configuration around Liquid Crystal Panel 100')

The configuration around the liquid crystal panel 100' is similar to that of the liquid crystal panel 100 shown in parts (a) through (c) of FIG. 3, and an explanation thereof will thus be omitted.

(Pixel Structure)

As shown in FIG. 12, a plurality of pixels are formed on the liquid crystal panel 100' of the liquid crystal display device 1'. The liquid crystal display device 1' drives the individual pixels by using an MPD (Multi Pixel Drive) method as the driving method in the 2D display mode, and drives the individual pixels by using, a driving method, such as a 3TFT driving method in the 3D display mode. The pixels each include a liquid crystal layer and an electrode which applies a voltage to the liquid crystal layer, and are arranged in a matrix form having rows and columns.

As shown in FIG. 12, the liquid crystal panel 100' of the liquid crystal display device 1' includes a plurality of gate bus lines 2, a plurality of source bus lines 4, a plurality of CS bus lines 61, a plurality of CS bus lines 62, a plurality of switching elements TFT1' through TFT3', and a plurality of liquid crystal capacitors Clc1' and Clc2'.

The plurality of gate bus lines 2 and the plurality of source bus lines 4 are formed such that they intersect with each other via an insulating film (not shown). In the liquid crystal display device 1', one of an R pixel 8' which displays red, a G pixel 10' which displays green, and a B pixel 12' which displays blue is formed in a region defined by one gate bus line 2 and one source bus line 4. The R pixel 8', the G pixel 10', and the B pixel 12' are formed adjacent to each other along the gate bus line 2. By using a combination of these pixels, a desired color image can be displayed.

A description will be given below of an example in which the liquid crystal display device 1' includes R pixels, G pixels, and B pixels. However, this embodiment is not restricted to such a configuration. For example, the liquid crystal display device 1 may include one or both of Ye pixels which display yellow and W pixels which display white, in addition to R pixels, G pixels, and B pixels. In this case, too, advantages described below will also be achieved.

(Bright Pixels and Dark Pixels)

Each of the R pixel 8', the G pixel 10', and the B pixel 12' has two sub pixels which can apply different voltages to the liquid crystal layers. As shown in FIG. 12, the R pixel 8' includes sub pixels 8a' and 8b', the G pixel 10' includes sub pixels 10a' and 10b', and the B pixel 12' includes sub pixels 12a' and 12b'. Hereinafter, the sub pixels 8a', 10a', and 12a' may also be referred to as "bright pixels", and the sub pixels 8b', 10b', and 12b' may also be referred to as "dark pixels". The reason for this will be discussed later.

In this embodiment, the pixels forming each picture element are arranged in the order of the R pixel 8', the G pixel 10', and the B pixel 12' along the gate bus lines 2, in a manner similar to the first embodiment. The bright pixels are arranged on a first straight line parallel with a gate bus line 2, while the dark pixels are arranged on a second straight line parallel with a gate bus line 2.

The dark pixel 8b' of the R pixel 8' defined by the gate bus line 2n and the bright pixel 8a' of the R pixel 8' defined by the gate bus line 2(n+1) are adjacent to each other with a boundary which is parallel with a gate bus line 2 therebetween. The G pixel 10' and the B pixel 12' are also arranged in a similar manner.

The dark pixel 8b' of the R pixel 8' and the dark pixel 10b' of the G pixel 10' are adjacent to each other with a boundary which is parallel with a source bus line 4 therebetween, and the dark pixel 10b' of the G pixel 10' and the dark pixel 12b' of the B pixel 12' are adjacent to each other with a boundary which is parallel with a source bus line 4 therebetween. The bright pixels are also arranged in a similar manner.

(Liquid Crystal Capacitor)

The sub pixels of each pixel include liquid crystal capacitors. The bright pixels include liquid crystal capacitors Clc1', while the dark pixels include liquid crystal capacitors Clc2'. More specifically, as shown in FIG. 12, the bright pixel 8a' of the R pixel 8' includes Clc1R', and the dark pixel 8b' of the R pixel 8' includes Clc2R'. Similarly, the bright pixel 10a' of the G pixel 10' includes Clc1G', and the dark pixel 10b' of the G pixel 10' includes Clc2G'. Similarly, the bright pixel 12a' of the B pixel 12' includes Clc1B', and the dark pixel 12b' of the B pixel 12' includes Clc2B'.

Each of the liquid crystal capacitors is constituted by a sub pixel electrode, a liquid crystal layer, and a common electrode which opposes the sub pixel electrode with the liquid crystal layer therebetween.

(Switching Elements TFT1' and TFT2')

A TFT1' (thin-film transistor 1') and a TFT2' are formed in each of the R pixel 8', the G pixel 10', and the B pixel 12'. The functions of the TFT1' and the TFT2' and the connection modes of the electrodes of the TFT1' and the TFT2' are similar to those of the TFT1 and the TFT2 in the first embodiment, and an explanation thereof will thus be omitted.

(Switching Element TFT3')

The TFT3' is formed in a dark pixel of each of the R pixel 8', the G pixel 10', and the B pixel 12'. More specifically, a TFT3R' is formed in the dark pixel 8b' of the R pixel 8', a TFT3G' is formed in the dark pixel 10b' of the G pixel 10', and a TFT3B' is formed in the dark pixel 12b' of the B pixel 12'.

The gate electrode of the TFT3' is electrically connected to the gate bus line previous to the gate bus line of the pixel in which the TFT3' is formed, that is, it is electrically connected to the gate bus line 2(n−1). The drain electrode of each TFT3' is electrically connected to the sub pixel electrode of an associated one of the dark pixels 8b', 10b', and 12b'. The source electrode of the TFT3' is connected to an associated CS bus line 62n.

(Auxiliary Capacitor Ccs)

An auxiliary capacitor Ccs is formed in each of the sub pixels of the R pixel 8', the G pixel 10', and the B pixel 12'. Each of the auxiliary capacitors Ccs is constituted by an auxiliary capacitor electrode connected to the associated sub pixel electrode and an auxiliary capacitor common electrode which opposes the auxiliary capacitor electrode with an insulating layer therebetween and which is connected to the associated CS bus line.

More specifically, as shown in FIG. 12, the auxiliary capacitor electrode of the auxiliary capacitor Ccs1R is connected to the sub pixel electrode of the liquid crystal capacitor Clc1R', and the auxiliary capacitor common electrode of the auxiliary capacitor Ccs1R is connected to the CS bus line 61n. Similarly, the auxiliary capacitor electrode of the auxiliary capacitor Ccs2R is connected to the sub pixel electrode of the liquid crystal capacitor Clc2R', and the auxiliary capacitor common electrode of the auxiliary capacitor Ccs2R is connected to the CS bus line 62n. The auxiliary capacitors Ccs1G, Ccs2G, and Ccs1B, and Ccs2B shown in FIG. 12 are configured in a similar manner.

A description has been given above, such that the gate electrode of the TFT3' is connected to the gate bus line 2(n−1) previous to the gate bus line 2n of the image. However, this embodiment is not restricted to this configuration, and, generally, the gate electrode of the TFT3' may be connected to the gate bus line 2(n−p) (p is a natural number of one or more) previous to the gate bus line 2n of the pixel.

(Layout of Each Sub Pixel)

A description will now be given, with reference to parts (a) and (b) of FIG. 13, of a specific configuration of a sub pixel on the liquid crystal panel 100'. Hereinafter, the configuration of the R pixel 8' will be described, and the configurations of the G pixel 10' and the B pixel 12' are similar to the configuration of the R pixel 8'.

Part (a) of FIG. 13 is a plan view illustrating a layout of a specific configuration of the R pixel 8' on the liquid crystal panel 100'. As shown in part (a) of FIG. 13, the gate bus lines 2 and the CS bus lines 6 are formed by using a first electrode material, and the source bus lines 4 are formed by using a second electrode material. In part (a) of FIG. 13, ECLC1R' and ECLC2R' indicate sub pixel electrodes of the bright pixel 8a' and the dark pixel 8b', respectively, and they are formed by using a third electrode material.

As shown in part (a) of FIG. 13, the TFT1R' and the TFT2R' are formed on the gate bus line 2n, and the TFT3R' is formed on the gate bus line 2(n−1). The source electrode and the drain electrode of each TFT' are formed by using the second electrode material.

Around the central portion of the sub pixel electrode ECLC1R' of the dark pixel 8a', the auxiliary capacitor Ccs1R is formed by using the first electrode material forming the CS bus line 61 and the second electrode material connected to the drain electrode of the TFT1R'. Around the central portion of the sub pixel electrode ECLC2R' of the dark pixel 8b', the auxiliary capacitor Ccs2R is formed by the first electrode material forming the CS bus line 62 and the second electrode material connected to the drain electrode of the TFT2R'. The sub pixel electrodes ECLC1R' and ECLC2R' are formed in a layer (at the near side in the plane of the drawing) higher than the second electrode material. At the near side in the plane of part (a) of FIG. 13, a liquid crystal layer corresponding to each of the sub pixels is disposed, and at the nearer side in the plane of FIG. 13, a common electrode is disposed, though they are not shown.

As shown in part (a) of FIG. 13, part of the third electrode material is used for a contact portion Pcon insulated from the sub pixel electrode ECLC2R' of the dark pixel 8b'. Part (b) of FIG. 13 is a sectional view of a cross section shown in part (a) of FIG. 13. As shown in part (b) of FIG. 13, the third electrode material is used for electrically connecting the first electrode material and the second electrode material at the contact portion Pcon. By the provision of the contact portion Pcon, the source electrode of the TFT3R and the CS bus line 62n are electrically connected.

(Basic Operation of Liquid Crystal Display Device 1')

A basic driving method for the liquid crystal panel 100' of the liquid crystal display device 1' will be described below with reference to parts (a) through (g) of FIG. 14, parts (a) through (g) of FIG. 15, and parts (a) and (b) of FIG. 16. A description will first be given of the driving of the R pixel 8', followed by a description of the driving of the G pixel 10' and the B pixel 12'.

Generally, the value of a liquid crystal capacitor and the value of a storage capacitor are dependent on voltages applied to the liquid crystal capacitor and the storage capacitor. However, since such a dependency is not a substantial factor in this embodiment, it will be ignored in the following description. Nevertheless, this assumption does not restrict this embodiment, and this embodiment may also be applicable even when there is such a dependency.

Moreover, a description will be given below, for a simple representation, of a case in which a positive voltage is supplied to individual sub pixel electrodes from a source bus line. However, a case in which a negative voltage is supplied to individual sub pixel electrodes from a source bus line may be equally considered.

(Driving of Liquid Crystal Panel 100' in 2D Display Mode)

The driving of the liquid crystal panel 100' in the 2D display mode, that is, the driving of the liquid crystal panel 100' when the scanning direction is a forward direction, will first be discussed.

Parts (a) through (g) of FIG. 14 are timing charts schematically illustrating waveforms and timings of voltages when the liquid crystal panel 100' is driven.

Part (a) of FIG. 14 shows a voltage waveform Vs of a data signal supplied from the source driver 24 to the source bus line 4. Part (b) of FIG. 14 shows a voltage waveform (that is, a voltage waveform of the CS bus line 61n) Vcs1 of an auxiliary capacitor driving signal supplied from the CS driver 26 to the CS bus line 61n. Part (c) of FIG. 14 shows a voltage waveform (that is, a voltage waveform of the CS bus line 62n) Vcs2 of an auxiliary capacitor driving signal supplied from the CS driver 26 to the CS bus line 62n. Part (d) of FIG. 14 shows a voltage waveform Vgn of a gate signal supplied from the gate driver 22 to the gate bus line 2n. Part (e) of FIG. 14 shows a voltage waveform Vg(n+1) of a gate signal supplied from the gate driver 22 to the gate bus line 2(n+1). Part (f) of FIG. 14 shows a voltage waveform Vlc1R' of the sub pixel electrode of the bright pixel 8a' disposed in the R pixel 8'. Part (g) of FIG. 14 shows a voltage waveform Vlc2R' of the sub pixel electrode of the dark pixel 8b' disposed in the R pixel 8'. The broken lines in FIG. 14 indicate a voltage waveform COMMON (Vcom) of the common electrodes.

(Driving of R Pixel 8')

At time T11, the voltage Vgn of a gate signal is changed from VgL (low) to VgH (high), thereby causing the TFT1R' and TFT2R' to be simultaneously in the conducting state (ON state). Then, the voltage of a data signal is applied to the sub pixel electrode of the bright pixel 8a' and that of the dark pixel 8b' via the source bus line 4, and both of the voltage of the sub pixel electrode of the bright pixel 8a' and that of the dark pixel 8b' are changed to the voltage VsR' of the data signal at time T11. These voltages are expressed by equations (14a) and (14b), respectively.

$$Vlc1R'=VsR' \quad (14a)$$

$$Vlc2R'=VsR' \quad (14b)$$

The voltage of a data signal is also applied via the source bus line 4 to the auxiliary capacitor Ccs1R' of the bright pixel 8a' and the auxiliary capacitor Ccs2R' of the dark pixel 8b', and both of the voltage of the auxiliary capacitor electrode of the bright pixel 8a' and that of the dark pixel 8b' are changed to the voltage VsR' of the data signal.

Subsequently, at time T12, the voltage Vg of the gate signal is changed from VgH to VgL, thereby causing the TFT1R' and TFT2R' to be simultaneously in the non-conducting state (OFF state). Then, the sub pixel electrode of the bright pixel 8a' and that of the dark pixel 8b', and the auxiliary capacitor electrode of the bright pixel 8a' and that of the dark pixel 8b' are all electrically insulated from the source bus line 4.

At this time, the voltage Vcs1 of the CS bus line 61*n* and the voltage Vcs2 of the CS bus line 62*n* are expressed by equations (16a) and (16b), respectively.

$$Vcs1 = Vcom - (\tfrac{1}{2})Vad \qquad (16a)$$

$$Vcs2 = Vcom + (\tfrac{1}{2})Vad \qquad (16a)$$

That is, the waveforms of the voltages Vcs1 and Vcs2 of the auxiliary capacitor driving signals supplied to the CS bus lines 61*n* and 62*n*, respectively, are square waves (having a duty ratio of 1:1) having a full width Vad and having opposite phases (out of phase from each other by 180°).

Subsequently, at time T13, the voltage Vcs1 of the CS bus line 61*n* connected to the auxiliary capacitor Ccs1 is changed from Vcom−(½)Vad to Vcom+(½)Vad, and the voltage Vcs2 of the CS bus line 62*n* connected to the auxiliary capacitor Ccs2 is changed from Vcom+(½)Vad to Vcom−(½)Vad. Accordingly, the voltage Vlc1R' of the sub pixel electrode of the bright pixel 8*a*' and the voltage Vlc2R' of the sub pixel electrode of the dark pixel 8*b*' are changed and expressed by equations (17a) and (17b), respectively:

$$Vlc1R' = VsR' + K1R \times Vad \qquad (17a)$$

$$Vlc2R' = VsR' - K2R \times Vad \qquad (17b)$$

where K1R and K2R are expressed by equations (18a) and (18b), respectively.

$$K1R = Ccs1R/(Clc1R' + Ccs1R) \qquad (18a)$$

$$K2R = Ccs2R/(Clc2R' + Ccs2R) \qquad (18b)$$

Subsequently, the voltage Vg(n+1) of the gate signal is changed from VgL to VgH at time T14, and is changed from VgH to VgL at time T15. However, the voltages Vlc1R' and Vlc2R' of the sub pixel electrodes of the bright pixel 8*a*' and the dark pixel 8*b*', respectively, are not changed.

Subsequently, at time T16, Vcs1 is changed from Vcom+(½)Vad to Vcom−(½)Vad, and voltage Vcs2 is changed from Vcom−(½)Vad to Vcom+(½)Vad. Accordingly, Vlc1R' and Vlc2R' are respectively changed from values represented by mathematical equations (17a) and (17b) to the values represented by mathematical equations (15a) and (15b).

Subsequently, at time T17, Vcs1 is changed from Vcom−(½)Vad to Vcom+(½)Vad, and voltage Vcs2 is changed from Vcom+(½)Vad to Vcom−(½)Vad. Accordingly, Vlc1R' and Vlc2R' are respectively changed from values represented by mathematical equations (15a) and (15b) to the values represented by mathematical equations (17a) and (17b).

A determination as to whether the repeating period between T16 and T17 is set to be one time, two times, three times, or longer of the horizontal writing time 1H may be suitably set according to the driving method (for example, polarity inversion method) of the liquid crystal display device or the display state (flickering, grainy texture of display, and so on). This repeating period continues until the pixel is overwritten the next time, that is, until a time equivalent to T11 arrives. Accordingly, the effective values of Vlc1R and Vlc2R are expressed by equations (19a) and (19b), respectively.

$$Vlc1R' = VsR' + K1R \times (\tfrac{1}{2})Vad \qquad (19a)$$

$$Vlc2R' = VsR' - K2R \times (\tfrac{1}{2})Vad \qquad (19b)$$

Thus, effective voltages V1R_f' and V2R_f' applied to the liquid crystal layers of the bright pixel 8*a*' and the dark pixel 8*b*', respectively, when the scanning direction is a forward direction are expressed by equations (20a) and (20b), respectively.

$$V1R\_f' = Vlc1R' - Vcom \qquad (20a)$$

$$V2R\_f' = Vlc2R' - Vcom \qquad (20b)$$

That is, equations (21a) and (21b) hold true.

$$V1R\_f' = VsR' + K1R \times (\tfrac{1}{2})Vad - Vcom \qquad (21a)$$

$$V2R\_f' = VsR' - K2R \times (\tfrac{1}{2})Vad - Vcom \qquad (21b)$$

In this manner, in the 2D display mode, the effective voltage V1R_f' applied to the liquid crystal layer of the bright pixel 8*a*' is greater than the effective voltage V2R_f' applied to the liquid crystal layer of the dark pixel 8*b*'. Accordingly, the transmittance of the liquid crystal layer of the bright pixel 8*a*' is higher than that of the dark pixel 8*b*'. Thus, in the 2D display mode, the bright pixel 8*a*' presents a higher level of brightness than the dark pixel 8*b*'.

(Driving of G Pixel 10' and B Pixel 12')

The G pixel 10' is also driven in a similar manner. Effective voltages V1G_f' and V2G_f' applied to the liquid crystal layers of the bright pixel 10*a*' and the dark pixel 10*b*', respectively, when the scanning direction is a forward direction are expressed by equations (22a) and (22b), respectively:

$$V1G\_f' = VsG' + K1G \times (\tfrac{1}{2})Vad - Vcom \qquad (22a)$$

$$V2G\_f' = VsG' - K2G \times (\tfrac{1}{2})Vad - Vcom \qquad (22b)$$

where K1G and K2G are expressed by equations (23a) and (23b), respectively.

$$K1G = Ccs1G/(Clc1G' + Ccs1G) \qquad (23a)$$

$$K2G = Ccs2G/(Clc2G' + Ccs2G) \qquad (23b)$$

The B pixel 12' is also driven in a similar manner. Effective voltages V1B_f' and V2B_f' applied to the liquid crystal layers of the bright pixel 12*a*' and the dark pixel 12*b*', respectively, when the scanning direction is a forward direction are expressed by equations (24a) and (24b), respectively:

$$V1B\_f' = VsB' + K1B \times (\tfrac{1}{2})Vad - Vcom \qquad (24a)$$

$$V2B\_f' = VsB' - K2B \times (\tfrac{1}{2})Vad - Vcom \qquad (24b)$$

where K1B and K2B are expressed by equations (25a) and (25b), respectively.

$$K1B = Ccs1B/(Clc1B' + Ccs1B) \qquad (25a)$$

$$K2B = Ccs2B/(Clc2B' + Ccs2B) \qquad (25b)$$

In this manner, in the 2D display mode, the effective voltages V1G_f' and V1B_f' applied to the liquid crystal layers of the bright pixels 10*a*' and 12*a*', respectively, are greater than the effective voltages V2G_f' and V2B_f' applied to the liquid crystal layers of the dark pixels 10*b*' and 12*b*', respectively. Accordingly, the transmittances of the liquid crystal layers of the bright pixels 10*a*' and 12*a*' are higher than those of the dark pixel 10*b*' and 12*b*', respectively. Thus, in the 2D display mode, the bright pixels 10*a*' and 12*a*' present higher levels of brightness than the dark pixel 10*b*' and 12*b*', respectively.

Part (a) of FIG. 16 schematically shows brightness levels presented by the sub pixels of the R pixel 8', the G pixel 10', and the B pixel 12' in the 2D display mode. As shown in part (a) of FIG. 16, in the 2D display mode, the bright pixels present higher levels of brightness than the dark pixels. In this manner, in the 2D display mode, since the sub pixels of each of the R pixel 8', the G pixel 10', and the B pixel 12' present different levels of brightness, the effect of enhancing the viewing angle characteristics is achieved.

(Driving of Liquid Crystal Panel 100' in 3D Display Mode)

A description will now be given of the driving of the liquid crystal panel 100' in the 3D display mode, that is, the driving of the liquid crystal panel 100' when the scanning direction is a backward direction. In the following description, both of signals supplied to the CS bus lines 61$n$ and 62$n$ have a constant voltage Vcom". A description will be given below, assuming that the voltage Vcom supplied to the common electrodes and Vcom" supplied to the CS bus lines 61$n$ and 62$n$ satisfy a relationship expressed by Vcom"≥Vcom. However, this does not restrict this embodiment, and even when Vcom"<Vcom, this embodiment may also be implemented.

Parts (a) through (g) of FIG. 15 are timing charts schematically illustrating waveforms and timings of voltages when the liquid crystal panel 100' is driven.

Part (a) of FIG. 15 shows a voltage waveform Vs of a data signal supplied from the source driver 24 to the source bus line 4. Part (b) of FIG. 15 shows a voltage waveform (that is, a voltage waveform of the CS bus line 61$n$) Vcs1 of an auxiliary capacitor driving signal supplied from the CS driver 26 to the CS bus line 61$n$. Part (c) of FIG. 15 shows a voltage waveform (that is, a voltage waveform of the CS bus line 62$n$) Vcs2 of an auxiliary capacitor driving signal supplied from the CS driver 26 to the CS bus line 62$n$. Part (d) of FIG. 15 shows a voltage waveform Vgn of a gate signal supplied from the gate driver 22 to the gate bus line 2$n$. Part (e) of FIG. 15 shows a voltage waveform Vg(n−1) of a gate signal supplied from the gate driver 22 to the gate bus line 2($n$−1). Part (f) of FIG. 15 shows a voltage waveform Vlc1R' of the sub pixel electrode of the bright pixel 8$a$' of the R pixel 8'. Part (g) of FIG. 15 shows a voltage waveform Vlc2R' of the sub pixel electrode of the dark pixel 8$b$' of the R pixel 8'. The broken lines in FIG. 15 indicate a voltage waveform COMMON (Vcom) of the common electrodes.

(Driving of R Pixel 8')

At time T11', the voltage Vgn of a gate signal is changed from VgL to VgH, thereby causing the TFT1R' and TFT2R' to be simultaneously in the ON state. Then, the voltage of a data signal is applied to the sub pixel electrode of the bright pixel 8$a$' and that of the dark pixel 8$b$' via the source bus line 4, and the voltage Vlc1R' of the sub pixel electrode of the bright pixel 8$a$' and the voltage Vlc2R' of the sub pixel electrode of the dark pixel 8$b$' are changed to the voltage VsR' of the data signal at time T11'. Vlc1R' and Vlc2R' are expressed by equations (26a) and (26b), respectively.

$$Vlc1R'=VsR' \tag{26a}$$

$$Vlc2R'=VsR' \tag{26b}$$

Subsequently, at time T12', the voltage Vgn of the gate signal is changed from VgH to VgL, thereby causing the TFT1R' and TFT2R' to be simultaneously in the OFF state. Accordingly, the sub pixel electrode of the bright pixel 8$a$' and that of the dark pixel 8$b$' are all electrically insulated from the source bus line 4.

Subsequently, at time T13', the voltage Vg(n−1) of the gate signal is changed from VgL to VgH, thereby causing the TFT3R' to be in the ON state. Accordingly, the voltage Vlc2R' of the sub pixel electrode of the dark pixel 8$b$' is changed to the voltage Vcom" of the CS bus line 62$n$. In contrast, the voltage Vlc1R' of the sub pixel electrode of the bright pixel 8$a$' is not changed.

$$Vlc1R'=VsR' \tag{28a}$$

$$Vlc2R'=Vcom'' \tag{28b}$$

Subsequently, at time T14', the voltage Vg(n−1) of the gate signal is changed from VgH to VgL, thereby causing the TFT3R' to be in the OFF state.

After the above-described process, effective voltages V1R_b' and V2R_b' applied to the liquid crystal layers of the bright pixel 8$a$' and the dark pixel 8$b$' when the scanning direction is a backward direction are expressed by equations (29a) and (29b), respectively.

$$V1R\_b'=VsR'-Vcom \tag{29a}$$

$$V2R\_b'=Vcom''-Vcom \tag{29b}$$

In this case, by setting the result of Vcom"−Vcom equal to or smaller than a threshold voltage Vth of the liquid crystal layer, the dark pixel 8$b$' does not present brightness. For example, by setting that Vcom"=Vcom, the dark pixel 8$b$ does not present brightness.

In this manner, in the 3D display mode, the dark pixel 8$b$' of the R pixel 8' does not present brightness.

(Driving of G Pixel 10' and B Pixel 12')

The G pixel 10' is also driven in a similar manner. Effective voltages V1G_b' and V2G_b' applied to the liquid crystal layers of the bright pixel 10$a$' and the dark pixel 10$b$' when the scanning direction is a backward direction are expressed by equations (30a) and (30b), respectively.

$$V1G\_b'=VsG'-Vcom \tag{30a}$$

$$V2G\_b'=Vcom''-Vcom \tag{30b}$$

The B pixel 12' is also driven in a similar manner. Effective voltages V1B_b' and V2B_b' applied to the liquid crystal layers of the bright pixel 12$a$' and the dark pixel 12$b$' when the scanning direction is a backward direction are expressed by equations (31a) and (31b), respectively.

$$V1B\_b'=VsB'-Vcom \tag{31a}$$

$$V2B\_b'=Vcom''-Vcom \tag{31b}$$

In a manner similar to the R pixel 8', by setting the result of Vcom"−Vcom to be equal to or smaller than the threshold voltage Vth of the liquid crystal layer, the dark pixels 10$b$' and 12$b$' do not present brightness.

In this manner, in the 3D display mode, the dark pixel 10$b$' of the G pixel 10' and the dark pixel 12$b$' of the B pixel 12' can be configured such that they do not present brightness.

Part (b) of FIG. 16 schematically shows brightness levels presented by the sub pixels disposed in the R pixel 8', the G pixel 10', and the B pixel 12' in the 3D display mode. As shown in part (b) of FIG. 16, in the 3D display mode, the dark pixels 8$a$', 10$b$', and 12$b$' of the R pixel 8', the G pixel 10', and the B pixel 12', respectively, do not present brightness.

Thus, the dark pixels of the R pixel 8', the G pixel 10', and the B pixel 12' function as black matrixes in the 3D display mode.

(Effect of Suppressing Crosstalk in 3D Display Mode)

As stated above, since the dark pixels of the liquid crystal panel 100' function as black matrixes in the 3D display mode, the occurrence of crosstalk can be suppressed for reasons similar to those discussed about the liquid crystal panel 100 of the first embodiment.

In the 2D display mode, the dark pixels of the liquid crystal display panel 100' present brightness, and thus, the brightness of a displayed image is enhanced, compared with a configuration in which black matrixes which do not present brightness in any of the display modes are disposed, instead of dark pixels.

As discussed above, by using the liquid crystal display device 1' of this embodiment, in the 3D display mode, by reversing the scanning direction, after applying a common data voltage to the liquid crystal layers of the individual sub pixels, the dark pixels can function as black matrixes. In contrast, in a known configuration in which data voltages are separately supplied to a dark pixel and a bright pixel, it is necessary to provide data bus lines for supplying the data voltages to the dark pixel and the bright pixel.

By using the liquid crystal display device 1' of this embodiment, the number of data bus lines can be reduced by half or less of that of such a known configuration.

(Appendixes concerning 3D Display Mode)

A description has been given above, such that dark pixels of the liquid crystal display device 1' do not present brightness in the 3D display mode. However, this embodiment is not restricted to this configuration. For example, in the 3D display mode, the voltage Vcom" supplied to the CS bus line 62n may be set so that the brightness presented by dark pixels will be equal to or smaller than a predetermined brightness level. With this setting, the occurrence of crosstalk can also be reduced.

That is, by setting Vcom and Vcom" so that the mathematical expression (A1) discussed in the first embodiment can hold true, the occurrence of crosstalk can also be suppressed.

A more specific description thereof is similar to that discussed in the section (Appendixes concerning 3D Display Mode) of the first embodiment, and is thus omitted here. In this embodiment, however, "voltage Vcom' supplied to the common bus line 5" in the section (Appendixes concerning 3D Display Mode) of the first embodiment should be read as "voltage Vcom" supplied to the CS bus line 62n".

A description has been given above, such that in the 3D display mode, both of the signals supplied to the CS bus lines 61n and 62n are the constant voltage Vcom", but this does not restrict this embodiment.

For example, concerning the CS bus line 62n, in the 3D display mode, an auxiliary capacitor driving signal may be supplied to the CS bus line 62n so that the voltage effectively applied to the sub pixel electrode of a dark pixel will be equal to or smaller than the threshold voltage Vth of the liquid crystal layer. In contrast, concerning the CS bus line 61n, in the 3D display mode, as well as the 2D display mode, an auxiliary capacitor driving signal having a waveform similar to that shown in part (b) of FIG. 14 may be supplied to the CS bus line 61n.

(Appendixes Concerning Number of Sub Pixels in Each Pixel)

In the foregoing description, a configuration in which the R pixel 8', the G pixel 10', and the B pixel 12' each include two sub pixels (a bright pixel and a dark pixel) has been discussed by way of example. However, this embodiment is not restricted to this configuration. For example, the R pixel 8', the G pixel 10', and the B pixel 12' may also each include a sub pixel other than a dark pixel and a bright pixel (such a sub pixel may also be called an intermediate pixel). In this case, the brightness of the intermediate pixel is preferably lower than that of a bright pixel both in the 2D display mode and the 3D display mode. With this configuration, the viewing angle characteristics can be enhanced both in the 2D display mode and the 3D display mode.

(Application to Normally White Liquid Crystal Display Device)

In a normally white liquid crystal display device, as the absolute value of a voltage applied to a liquid crystal layer of a sub pixel becomes greater, the brightness presented by the sub pixel becomes smaller. Thus, when the above-described liquid crystal panel 100 is applied to a normally white liquid crystal display device, in the 3D display mode, for example, the absolute value of the difference between the voltage Vcom" supplied to the CS bus line 6 and the voltage Vcom of the common electrode is set to be sufficiently large so that each dark pixel may not present brightness in the 3D display mode. With the application to a normally white liquid crystal display device, too, Vcom and Vcom" can be set so that the above-described mathematical expression (A1) may hold true.

First Modified Example of Second Embodiment

The circuit configuration of the liquid crystal panel 100' of this embodiment is not restricted to the configuration described above. A first modified example of this embodiment will be discussed below with reference to parts (a) and (b) of FIG. 17. Portions discussed above are designated by like reference numerals and signs, and an explanation thereof will thus be omitted.

Part (a) of FIG. 17 is an equivalent circuit diagram of a liquid crystal panel, concerning an R pixel 8', according to this modified example. As shown in part (a) of FIG. 17, the liquid crystal panel of this modified example includes a common bus line 5 similar to that of the liquid crystal panel 100 of the first embodiment, in addition to the elements of the above-described liquid crystal panel 100'. The liquid crystal panel of this modified example includes a constant voltage source 25 similar to that of the liquid crystal panel 100, though it is not shown.

As shown in part (b) of FIG. 17, in the liquid crystal panel of this modified example, the source electrode of the TFT3R' is connected to the common bus line 5m. The G pixel 10' and the B pixel 12' of the liquid crystal panel of this modified example are configured in a similar manner.

Part (b) of FIG. 17 is a plan view illustrating a layout of a specific configuration of the R pixel 8' on the liquid crystal panel of this modified example. As shown in part (b) of FIG. 17, the common bus line 5 is formed by using a second electrode material, and is connected to the source electrode of the TFT3R. In the liquid crystal panel of this modified example, unlike the liquid crystal panel 100', a contact portion Pcon is not necessary. Accordingly, the configuration of the dark pixels of the liquid crystal panel of this modified example is simpler than that of the liquid crystal panel 100'. Additionally, since the contact portion Pcon is not necessary, the area of the sub pixel electrode of each of the dark pixels can be made larger than that of the liquid crystal panel 100', thereby increasing the aperture ratio.

The configurations of the other portions of the R pixel 8' in the liquid crystal panel of this modified example are similar to those of the liquid crystal panel 100', and an explanation thereof will thus be omitted. In part (b) of FIG. 17, the sub pixel electrode ECLC2R' is formed in a layer (at the near side in the plane of the drawing) higher than the second electrode material. Additionally, at the near side in the plane of part (b) of FIG. 17, a liquid crystal layer corresponding to each of the sub pixels is disposed, and at the nearer side in the plane of part (b) of FIG. 17, a common electrode is disposed, though they are not shown.

(Driving of Liquid Crystal Panel of this Modified Example)

The driving of the liquid crystal panel of this modified example is similar to that of the liquid crystal panel 100' discussed above, but it is different from that of the liquid crystal panel 100' in the following points.

In the liquid crystal panel of this modified example, effective voltages V1R_b' and V2R_b' applied to the liquid crystal layers of the bright pixel 8a' and the dark pixel 8b', respectively, when the 3D display mode is selected, that is, when the scanning direction is a backward direction, are expressed by equations (32a) and (32b), respectively.

$$V1R\_b' = VsR' - V\text{com}  \quad (32a)$$

$$V2R\_b' = V\text{com}' - V\text{com}  \quad (32b)$$

Vcom' denotes a voltage supplied to the common bus line 5. Mathematical equation (32a) is the same as mathematical equation (29a). In contrast, as represented by mathematical equation (32b), in this modified example, V2R_b' is a function of the voltage Vcom' of the common bus line 5. Accordingly, by setting the result of Vcom'−Vcom to be equal to or smaller than the threshold voltage Vth of the liquid crystal layer, the dark pixel 8*b*' does not present brightness.

An effective voltage applied to the liquid crystal layer of the dark pixel 10*b*' of the G pixel 10' and that of the dark pixel 12*b*' of the B pixel 12' when the 3D display mode is selected are expressed in a similar manner.

In this manner, in the liquid crystal panel of this modified example, too, when the 3D display mode is selected, each of the dark pixels functions as a black matrix.

Second Modified Example of Second Embodiment

A second modified example of this embodiment will be discussed below with reference to parts (a) and (b) of FIG. 18. Portions discussed above are designated by like reference numerals and signs, and an explanation thereof will thus be omitted.

Part (a) of FIG. 18 is an equivalent circuit diagram of a liquid crystal panel, concerning an R pixel 8', according to this modified example. As shown in part (a) of FIG. 18, in the liquid crystal panel of this modified example, the CS bus line 62*m*, which is the m-th CS bus line 62, is formed substantially parallel with the source bus line 4*m*. Additionally, the source electrode of the TFT3R' and the auxiliary capacitor common electrode of the auxiliary capacitor Ccs2R are connected to the CS bus line 62*m*. The configurations of the other portions of the liquid crystal panel are similar to those of the liquid crystal panel 100'.

The G pixel 10' and the B pixel 12' on the liquid crystal panel of this modified example are configured in a manner similar to the R pixel 8' on the liquid crystal panel of this modified example.

Part (b) of FIG. 18 is a plan view illustrating a layout of a specific configuration of the R pixel 8' on the liquid crystal panel of this modified example. As shown in part (b) of FIG. 18, the CS bus line 62*m* is formed by using a second electrode material, and is connected to the source electrode of the TFT3R' and to the auxiliary capacitor common electrode of the auxiliary capacitor Ccs2R. In the liquid crystal panel of this modified example, unlike the liquid crystal panel 100', a contact portion Pcon is not necessary. Accordingly, the configuration of the dark pixels of the liquid crystal panel of this modified example is simpler than that of the liquid crystal panel 100'. Additionally, since the contact portion Pcon is not necessary, the area of the sub pixel electrode of each of the dark pixels can be made larger than that of the liquid crystal panel 100', thereby increasing the aperture ratio.

Moreover, in the liquid crystal panel of this modified example, as shown in part (b) of FIG. 18, the auxiliary capacitor Ccs2R is formed along the CS bus line 62*m*. The configurations of the other portions of the R pixel 8' in the liquid crystal panel of this modified example are similar to those of the liquid crystal panel 100', and an explanation thereof will thus be omitted. In part (b) of FIG. 18, the sub pixel electrode ECLC2R' is formed in a layer (at the near side in the plane of the drawing) higher than the second electrode material. Additionally, at the near side in the plane of part (b) of FIG. 18, a liquid crystal layer corresponding to each of the sub pixels is disposed, and at the nearer side in the plane of part (b) of FIG. 18, a common electrode is disposed, though they are not shown.

(Driving of Liquid Crystal Panel of this Modified Example)

The driving of the liquid crystal panel of this modified example is similar to that of the above-described liquid crystal panel 100', and an explanation thereof will thus be omitted. It is noted that, however, a voltage similar to that of the CS bus line 62*n* discussed in the section (Basic Operation of Liquid Crystal Display Device 1') is supplied to the CS bus line 62*m*.

In the liquid crystal panel of this modified example, too, when the 3D display mode is selected, each of the dark pixels functions as a black matrix.

(Appendixes Concerning First Embodiment and Second Embodiment)

In the first and second embodiments, the following liquid crystal display device has been described by way of example. The gate electrode of the TFT3 disposed in a pixel defined by the n-th gate bus line is connected to the (n−1)-th or prior gate bus line, and the forward scanning is performed in the 2D display mode and the backward scanning is performed in the 3D display mode. However, the above-described embodiments are not restricted to this type of liquid crystal display device.

For example, in the above-described embodiments, the gate electrode of the TFT3 disposed in a pixel defined by the n-th gate bus line may be connected to the (n+1)-th or subsequent gate bus line. In the case of this configuration, the backward scanning is performed in the 2D display mode, and the forward scanning is performed in the 3D display mode. Then, advantages similar to those described above can be obtained.

APPENDIXES

As described above, a liquid crystal display device of the present invention is a liquid crystal display device that is capable of performing display in a first display mode and a second display mode. The liquid crystal display device includes: a liquid crystal panel including a plurality of pixels disposed in a matrix having N rows and M columns (N and M are natural numbers), auxiliary bus lines, a gate bus line disposed in each row, a data bus line disposed in each column, a plurality of sub pixels disposed in, among the plurality of pixels, a pixel positioned in the n-th row and the m-th column (n and m are natural numbers which satisfy 1≤n≤N and 1≤m≤M, respectively), a sub pixel electrode disposed in each of the sub pixels and opposing a common electrode with a liquid crystal layer therebetween, and an input transistor disposed in each of the sub pixels, the input transistor having a drain electrode connected to the sub pixel electrode, a source electrode connected to a data bus line in the m-th column, and a gate electrode connected to a gate bus line in the n-th row; and an optical panel including first optical plates which generate outgoing light having a first polarization state from incident light and second optical plates which generate outgoing light having a second polarization state, which is different from the first polarization state, from the incident light, the first optical plates and the second optical plates being formed at positions corresponding to odd-numbered rows and even-numbered rows, respectively, of the liquid crystal panel. Among the plurality of sub pixels disposed in the pixel positioned in the n-th row and the m-th column, a boundary-proximity sub pixel, which is positioned closest to a boundary between the associated first optical plate and the associated second optical plate, further includes an output transistor, the output transistor having a drain electrode electrically connected to the sub pixel electrode of the boundary-proximity sub pixel, a source electrode connected to the associated auxiliary bus line, and a gate electrode connected to a gate bus line in the (n−1)-th or prior row. In the second display mode, gate signals are sequentially supplied to the gate bus lines in order from the first to the N-th rows, and in the first display mode, gate signals are sequentially supplied to the gate bus lines in order from the N-th to the first rows.

In the liquid crystal display device of the present invention configured as described above, in the second display mode, by sequentially supplying gate signals to the gate bus lines in order from the first to the N-th rows, that is, by performing scanning in a forward direction, a common data voltage is applied to the sub pixel electrodes disposed in each pixel via the data bus line. Then, each of the sub pixels presents a desired level of brightness, thereby displaying an image.

On the other hand, in the first display mode, the above-described liquid crystal display device sequentially supplies gate signals to the gate bus lines in order from the N-th to the first rows, that is, the liquid crystal display device performs scanning in a backward direction. In this case, when a gate signal is supplied to the gate bus line in the n-th row, a common data voltage is applied to the sub pixel electrodes of the sub pixels disposed in a pixel positioned in the n-th row. Subsequently, when a gate signal is supplied to the gate bus line in the (n−1)-th or prior row, the output transistor is changed to the ON state, thereby changing the potential of the sub pixel electrode of the boundary-proximity sub pixel, among the sub pixels, to the potential of the above-described auxiliary bus line.

Accordingly, in the liquid crystal display device of the present invention configured as described above, it is possible to apply different voltages to the liquid crystal layer of the boundary-proximity sub pixel and to the liquid crystal layers of the sub pixels other than the boundary-proximity sub pixel without increasing the number of data bus lines. Additionally, by suitably setting the potential of the auxiliary bus line, the brightness presented by the boundary-proximity sub pixel can be made lower than that by the sub pixels other than the boundary-proximity sub pixel.

In the first mode, by displaying an image which can be viewed three-dimensionally by using a patterned retarder system, the above-described phenomenon of crosstalk can be suppressed.

In the second display mode, in each pixel, the boundary-proximity sub pixel presents the same level of brightness as that of the sub pixels other than the boundary-proximity sub pixel. Thus, by displaying an image which cannot be viewed three-dimensionally in the second mode, an image having a higher level of brightness can be displayed than in a known configuration in which a black matrix, which does not present brightness regardless of whether an image which cannot be viewed three-dimensionally or an image which can be viewed three-dimensionally is displayed is provided.

In the liquid crystal display device of the present invention, a constant voltage may preferably be supplied to the auxiliary bus lines both in the first display mode and in the second display mode.

With the above-described configuration, by using a simple configuration in which a constant voltage is supplied to the auxiliary bus lines, the phenomenon of crosstalk in the first display mode can be suppressed.

In the liquid crystal display device of the present invention, the drain electrode of the input transistor disposed in the boundary-proximity sub pixel may preferably be connected to the sub pixel electrode of the boundary-proximity sub pixel via an auxiliary capacitor.

With the above-described configuration, the drain electrode of the input transistor disposed in the boundary-proximity sub pixel is connected to the sub pixel electrode of the boundary-proximity sub pixel via the auxiliary capacitor. Accordingly, both in the first display mode and in the second display mode, a data voltage supplied from the data bus line is distributed over the liquid crystal layer of the boundary-proximity sub pixel and the auxiliary capacitor. Thus, the absolute value of a voltage applied to the sub pixel electrode of the boundary-proximity sub pixel becomes smaller than the absolute value of a data voltage supplied from the data bus line.

In the second display mode, since the scanning direction is a forward direction, even when the output transistor is changed to the ON state, the voltage applied to the liquid crystal layer of the boundary-proximity sub pixel is not changed. With the above-described configuration, therefore, in the second display mode, in each pixel, a brightness difference is generated between the boundary-proximity sub pixel and the sub pixels other than the boundary-proximity sub pixel, thereby enhancing viewing angle characteristics.

In contrast, in the first display mode, since the scanning direction is a backward direction, when the output transistor is changed to the ON state, the voltage applied to the liquid crystal layer of the boundary-proximity sub pixel is changed to a voltage determined by a potential difference between the potential of the common electrode and the potential of the auxiliary bus line. In this case, by suitably setting the potential of the auxiliary bus line, the brightness presented by the boundary-proximity sub pixel can be made lower than that by the sub pixels other than the boundary-proximity sub pixel. Thus, the phenomenon of crosstalk in the first display mode can be suppressed.

In the liquid crystal display device of the present invention, the drain electrode of the output transistor disposed in the boundary-proximity sub pixel may preferably be connected to the sub pixel electrode of the boundary-proximity sub pixel via the auxiliary capacitor.

With the above-described configuration, both in the first display mode and in the second display mode, a data voltage supplied from the data bus line is distributed over the liquid crystal layer of the boundary-proximity sub pixel and the auxiliary capacitor. Thus, the absolute value of a voltage applied to the sub pixel electrode of the boundary-proximity sub pixel becomes smaller than the absolute value of a data voltage supplied from the data bus line.

In the second display mode, since the scanning direction is a forward direction, even when the output transistor is changed to the ON state, the voltage applied to the liquid crystal layer of the boundary-proximity sub pixel is not changed. With the above-described configuration, therefore, in the second display mode, in each pixel, a brightness difference is generated between the boundary-proximity sub pixel and the sub pixels other than the boundary-proximity sub pixel, thereby enhancing viewing angle characteristics.

In contrast, in the first display mode, since the scanning direction is a backward direction, when the output transistor is changed to the ON state, the voltage applied to the liquid crystal layer of the boundary-proximity sub pixel is changed to a voltage determined by a potential difference between the potential of the common electrode and the potential of the auxiliary bus line. In this case, by suitably setting the potential of the auxiliary bus line, the brightness presented by the boundary-proximity sub pixel can be made lower than that by the sub pixels other than the boundary-proximity sub pixel. Thus, the phenomenon of crosstalk in the first display mode can be suppressed.

Preferably, the liquid crystal display device of the present invention may further include a first auxiliary capacitor bus line and a second auxiliary capacitor bus line, which is insulated from the first auxiliary capacitor bus line. The sub pixel electrode of the boundary-proximity sub pixel may preferably be connected to the first auxiliary capacitor bus line via a first auxiliary capacitor. The sub pixel electrodes of the sub pixels other than the boundary-proximity sub pixel may preferably be connected to the second auxiliary capacitor bus line via a second auxiliary capacitor. In the second display mode, an auxiliary capacitor signal may preferably be supplied to the first auxiliary capacitor bus line, and an auxiliary capacitor signal may preferably be supplied to the second auxiliary capacitor bus line, waveforms of the auxiliary capacitor signals supplied to the first and second auxiliary capacitor bus lines being opposite to each other. In the first display mode, an auxiliary capacitor signal having a constant voltage level may preferably be supplied to the first auxiliary capacitor bus line and the second auxiliary capacitor bus line.

With the above-described configuration, in the second display mode, auxiliary capacitor signals having waveforms different from each other are supplied to the first auxiliary capacitor bus line and the second auxiliary capacitor bus line. Accordingly, the effective voltage applied to the liquid crystal layer of the boundary-proximity sub pixel and the effective voltage applied to the liquid crystal layer of the pixels other than the boundary-proximity sub pixel become different. With the above-described configuration, therefore, in the second display mode, in each pixel, a brightness difference is generated between the boundary-proximity sub pixel and the sub pixels other than the boundary-proximity sub pixel, thereby enhancing viewing angle characteristics.

In contrast, in the first display mode, since the scanning direction is a backward direction, when the output transistor is changed to the ON state, the voltage applied to the liquid crystal layer of the boundary-proximity sub pixel is changed to a voltage determined by a potential difference between the potential of the common electrode and the potential of the auxiliary bus line. In this case, by suitably setting the potential of the auxiliary bus line, the brightness presented by the boundary-proximity sub pixel can be made lower than that by the sub pixels other than the boundary-proximity sub pixel. Thus, the phenomenon of crosstalk in the first display mode can be suppressed.

In the liquid crystal display device of the present invention, the auxiliary bus lines may preferably include a first auxiliary capacitor bus line and a second auxiliary capacitor bus line, which is insulated from the first auxiliary capacitor bus line. The source electrode of the output transistor may preferably be connected to the first auxiliary capacitor bus line. The sub pixel electrode of the boundary-proximity sub pixel may preferably be connected to the first auxiliary capacitor bus line via a first auxiliary capacitor. The sub pixel electrodes of the sub pixels other than the boundary-proximity sub pixel may preferably be connected to the second auxiliary capacitor bus line via a second auxiliary capacitor. In the second display mode, an auxiliary capacitor signal may preferably be supplied to the first auxiliary capacitor bus line, and an auxiliary capacitor signal may preferably be supplied to the second auxiliary capacitor bus line, waveforms of the auxiliary capacitor signals supplied to the first and second auxiliary capacitor bus lines being opposite to each other. In the first display mode, an auxiliary capacitor signal having a constant voltage level may preferably be supplied to the first auxiliary capacitor bus line and the second auxiliary capacitor bus line.

With the above-described configuration, in the second display mode, auxiliary capacitor signals having waveforms different from each other are supplied to the first auxiliary capacitor bus line and the second auxiliary capacitor bus line. Accordingly, the effective voltage applied to the liquid crystal layer of the boundary-proximity sub pixel and the effective voltage applied to the liquid crystal layer of the pixels other than the boundary-proximity sub pixel become different. With the above-described configuration, therefore, in the second display mode, in each pixel, a brightness difference is generated between the boundary-proximity sub pixel and the sub pixels other than the boundary-proximity sub pixel, thereby enhancing viewing angle characteristics.

In contrast, in the first display mode, since the scanning direction is a backward direction, when the output transistor is changed to the ON state, the voltage applied to the liquid crystal layer of the boundary-proximity sub pixel is changed to a voltage determined by a potential difference between the potential of the common electrode and the potential of the auxiliary bus line. In this case, by suitably setting the potential of the auxiliary bus line, the brightness presented by the boundary-proximity sub pixel can be made lower than that by the sub pixels other than the boundary-proximity sub pixel. Thus, the phenomenon of crosstalk in the first display mode can be suppressed.

With the above-described configuration, the auxiliary bus line includes a first auxiliary capacitor bus line and a second auxiliary capacitor bus line which is electrically independent of the first auxiliary capacitor bus line, and the source electrode of the output transistor is connected to the first auxiliary capacitor bus line. Thus, the circuit configuration and the configuration of bus lines can be made simpler than a configuration in which the source electrode of the output transistor is connected to a bus line other than the first auxiliary capacitor bus line.

In the liquid crystal display device of the present invention, in the first mode, in each of the pixels, a maximum value of brightness presented by the boundary-proximity sub pixel may preferably be smaller than 20% of a maximum value of brightness presented by the sub pixels other than the boundary-proximity sub pixel.

The inventors have discovered that, if the maximum value of brightness presented by the boundary-proximity sub pixel is smaller than 20% of the maximum value of brightness presented by the boundary-proximity sub pixel, a viewer recognizes the boundary-proximity sub pixel as a black pixel.

With the above-described configuration, in each of the pixels, the maximum value of brightness presented by the boundary-proximity sub pixel is smaller than 20% of the maximum value of brightness presented by the sub pixels other than the boundary-proximity sub pixel. Thus, a viewer recognizes the boundary-proximity sub pixel as a black pixel, that is, a black matrix.

Accordingly, with the above-described configuration, the boundary-proximity sub pixel functions as a black matrix, and thus, the occurrence of crosstalk can be effectively suppressed.

In the liquid crystal display device of the present invention, in each of the pixels, a boundary between the boundary-proximity sub pixel and a sub pixel adjacent to the boundary-proximity sub pixel may preferably be formed along a direction of rows. If an angle obtained by projecting an angle between a viewing direction and a direction of a normal to the liquid crystal panel onto a plane having a direction of a normal perpendicular to both the direction of a normal to the liquid crystal panel and a column direction of the liquid crystal panel is equal to or smaller than an angle obtained by projecting an angle between the direction of a normal to the liquid crystal panel and a straight line which passes the boundary between the boundary-proximity sub pixel disposed in a pixel and a sub pixel disposed in the pixel adjacent to the boundary-proximity sub pixel and which passes a portion of the boundary between the first optical plate and the second optical plate positioned closest to the boundary-proximity sub pixel onto the plane having a direction of a normal perpendicular to both the direction of a normal to the liquid crystal panel and a column direction of the liquid crystal panel, in the first display mode, a maximum value of brightness of image light which emits from the boundary-proximity sub pixel in the viewing direction and which passes through one of the first optical plate and the second optical plate of the optical panel may preferably be smaller than 20% of a maximum value of brightness of image light which emits in the viewing direction from a pixel that is adjacent to the boundary-proximity sub pixel with the boundary formed in the direction of rows and which passes through the same optical plate as the optical plate through which the image light emitting from the boundary-proximity sub pixel passes.

The inventors have also discovered that, if the brightness of image light which emits from the boundary-proximity sub pixel and which passes through one of the first optical plate and the second optical plate of the optical panel is smaller than 20% of the maximum value of brightness of image light which emits in the viewing direction from a pixel that is adjacent to the boundary-proximity sub pixel with the boundary formed in the direction of rows and which passes through the same optical plate as the optical plate through which the image light emitting from the boundary-proximity sub pixel passes, a viewer recognizes the boundary-proximity sub pixel as a black pixel.

With the above-described configuration, a viewer recognizes the boundary-proximity sub pixel as a black pixel, that is, a black matrix.

Accordingly, with the above-described configuration, the boundary-proximity sub pixel functions as a black matrix, and thus, the occurrence of crosstalk can be more effectively suppressed.

A display apparatus of the present invention is a display apparatus including the above-described liquid crystal display device. The display apparatus displays an image which can be viewed three-dimensionally in the first display mode.

In the display apparatus configured as described above, in the first display mode, an image which can be viewed three-dimensionally is displayed, thereby suppressing the occurrence of crosstalk.

The present invention is not restricted to the above-described embodiments. Various modifications may be made within the scope of claims, and an embodiment obtained by suitably combining technical means disclosed in the different embodiments is encompassed in the technical scope of the present invention.

INDUSTRIAL APPLICABILITY

The present invention can be suitably applied to a liquid crystal display device that may display images three-dimensionally by using a patterned retarder system.

REFERENCE SIGNS LIST 1, 1' liquid crystal display device
100, 100' liquid crystal panel
200 patterned retarder (optical panel)
2 gate bus line
4 source bus line
5 common bus line (auxiliary bus line)
6 CS bus line (auxiliary bus line, auxiliary capacitor bus line)
8, 8' R pixel (pixel)
8a, 8a' bright pixel of R pixel (sub pixel)
8b, 8b' dark pixel of R pixel (sub pixel, boundary-proximity sub pixel)
10, 10' G pixel (pixel)
10a, 10a' bright pixel of G pixel (sub pixel)
10b, 10b' dark pixel of G pixel (sub pixel, boundary-proximity sub pixel)
12, 12' B pixel (pixel)
12a, 12a' bright pixel of B pixel (sub pixel)
12b, 12b' dark pixel of B pixel (sub pixel, boundary-proximity sub pixel)
TFT1R, TFT2R thin-film transistor (input transistor)
TFT3R thin-film transistor (output transistor)
TFT1G, TFT2G thin-film transistor (input transistor)
TFT3G thin-film transistor (output transistor)
TFT1B, TFT2B thin-film transistor (input transistor)
TFT3B thin-film transistor (output transistor)
Clc1R, Clc2R liquid crystal capacitor
Clc1G, Clc2G liquid crystal capacitor
Clc1B, Clc2B liquid crystal capacitor
Ccs1R, Ccs2R auxiliary capacitor
Ccs1G, Ccs2G auxiliary capacitor
Ccs1B, Ccs2B auxiliary capacitor
RR retarder plate
RL retarder plate

The invention claimed is:

1. A liquid crystal display device that is capable of performing display in a first display mode and a second display mode, comprising:

a liquid crystal panel including a plurality of pixels disposed in a matrix having N rows and M columns (N and M are natural numbers), auxiliary bus lines, a gate bus line disposed in each row, a data bus line disposed in each column, a plurality of sub pixels disposed in, among the plurality of pixels, a pixel positioned in the n-th row and the m-th column (n and m are natural numbers which satisfy $1 \leq n \leq N$ and $1 \leq m \leq M$, respectively), a sub pixel electrode disposed in each of the sub pixels and opposing a common electrode with a liquid crystal layer therebetween, and an input transistor disposed in each of the sub pixels, the input transistor having a drain electrode connected to the sub pixel electrode, a source electrode connected to a data bus line in the m-th column, and a gate electrode connected to a gate bus line in the n-th row; and an optical panel including first optical plates which generate outgoing light having a first polarization state from incident light and second optical plates which generate outgoing light having a second polarization state, which is different from the first polarization state, from the incident light, the first optical plates and the second optical plates being formed at positions corresponding to odd-numbered rows and even-numbered rows, respectively, of the liquid crystal panel, wherein:

among the plurality of sub pixels disposed in the pixel positioned in the n-th row and the m-th column, a boundary-proximity sub pixel, which is positioned closest to a boundary between the associated first optical plate and the associated second optical plate, further includes an output transistor, the output transistor having a drain electrode electrically connected to the sub pixel electrode of the boundary-proximity sub pixel, a source electrode connected to the associated auxiliary bus line, and a gate electrode connected to a gate bus line in the (n−1)-th or prior row;

in the second display mode, gate signals are sequentially supplied to the gate bus lines in order from the first to the N-th rows;

in the first display mode, gate signals are sequentially supplied to the gate bus lines in order from the N-th to the first rows; and in the first display mode, in each of the pixels, a maximum value of brightness presented by the boundary-proximity sub pixel is smaller than 20% of a maximum value of brightness presented by the sub pixels other than the boundary-proximity sub pixel.

2. The liquid crystal display device according to claim 1, wherein a constant voltage is supplied to the auxiliary bus lines both in the first display mode and in the second display mode.

3. The liquid crystal display device according to claim 1, wherein the drain electrode of the input transistor disposed in the boundary-proximity sub pixel is connected to the sub pixel electrode of the boundary-proximity sub pixel via an auxiliary capacitor.

4. The liquid crystal display device according to claim 3, wherein the drain electrode of the output transistor disposed in the boundary-proximity sub pixel is connected to the sub pixel electrode of the boundary-proximity sub pixel via the auxiliary capacitor.

5. The liquid crystal display device according to claim 1, further comprising:

a first auxiliary capacitor bus line and a second auxiliary capacitor bus line, which is insulated from the first auxiliary capacitor bus line, wherein:

the sub pixel electrode of the boundary-proximity sub pixel is connected to the first auxiliary capacitor bus line via a first auxiliary capacitor;

the sub pixel electrodes of the sub pixels other than the boundary-proximity sub pixel are connected to the second auxiliary capacitor bus line via a second auxiliary capacitor;

in the second display mode, an auxiliary capacitor signal is supplied to the first auxiliary capacitor bus line, and an auxiliary capacitor signal is supplied to the second auxiliary capacitor bus line, waveforms of the auxiliary capacitor signals supplied to the first and second auxiliary capacitor bus lines being opposite to each other; and in the first display mode, an auxiliary capacitor signal having a constant voltage level is supplied to the first auxiliary capacitor bus line and the second auxiliary capacitor bus line.

6. The liquid crystal display device according to claim 1, wherein:

the auxiliary bus lines include a first auxiliary capacitor bus line and a second auxiliary capacitor bus line, which is insulated from the first auxiliary capacitor bus line;

the source electrode of the output transistor is connected to the first auxiliary capacitor bus line;

the sub pixel electrode of the boundary-proximity sub pixel is connected to the first auxiliary capacitor bus line via a first auxiliary capacitor;

the sub pixel electrodes of the sub pixels other than the boundary-proximity sub pixel are connected to the second auxiliary capacitor bus line via a second auxiliary capacitor;

in the second display mode, an auxiliary capacitor signal is supplied to the first auxiliary capacitor bus line, and an auxiliary capacitor signal is supplied to the second auxiliary capacitor bus line, waveforms of the auxiliary capacitor signals supplied to the first and second auxiliary capacitor bus lines being opposite to each other; and in the first display mode, an auxiliary capacitor signal having a constant voltage level is supplied to the first auxiliary capacitor bus line and the second auxiliary capacitor bus line.

7. A liquid crystal display device that is capable of performing display in a first display mode and a second display mode, comprising:

a liquid crystal panel including a plurality of pixels disposed in a matrix having N rows and M columns (N and M are natural numbers), auxiliary bus lines, a gate bus line disposed in each row, a data bus line disposed in each column, a plurality of sub pixels disposed in, among the plurality of pixels, a pixel positioned in the n-th row and the m-th column (n and m are natural numbers which satisfy 1≤n≤N and 1≤m≤M, respectively), a sub pixel electrode disposed in each of the sub pixels and opposing a common electrode with a liquid crystal layer therebetween, and an input transistor disposed in each of the sub pixels, the input transistor having a drain electrode connected to the sub pixel electrode, a source electrode connected to a data bus line in the m-th column, and a gate electrode connected to a gate bus line in the n-th row; and an optical panel including first optical plates which generate outgoing light having a first polarization state from incident light and second optical plates which generate outgoing light having a second polarization state, which is different from the first polarization state, from the incident light, the first optical plates and the second optical plates being formed at positions corresponding to odd-numbered rows and even-numbered rows, respectively, of the liquid crystal panel, wherein:

among the plurality of sub pixels disposed in the pixel positioned in the n-th row and the m-th column, a boundary-proximity sub pixel, which is positioned closest to a boundary between the associated first optical plate and the associated second optical plate, further includes an output transistor, the output transistor having a drain electrode electrically connected to the sub pixel electrode of the boundary-proximity sub pixel, a source electrode connected to the associated auxiliary bus line, and a gate electrode connected to a gate bus line in the (n−1)-th or prior row;

in the second display mode, gate signals are sequentially supplied to the gate bus lines in order from the first to the N-th rows;

in the first display mode, gate signals are sequentially supplied to the gate bus lines in order from the N-th to the first rows;

in each of the pixels, a boundary between the boundary-proximity sub pixel and a sub pixel adjacent to the boundary-proximity sub pixel is formed along a direction of rows;

if an angle obtained by projecting an angle between a viewing direction and a direction of a normal to the liquid crystal panel onto a plane having a direction of a normal perpendicular to both the direction of a normal to the liquid crystal panel and a column direction of the liquid crystal panel is equal to or smaller than an angle obtained by projecting an angle between the direction of a normal to the liquid crystal panel and a straight line which passes the boundary between the boundary-proximity sub pixel disposed in a pixel and a sub pixel disposed in the pixel adjacent to the boundary-proximity sub pixel and which passes a portion of the boundary between the first optical plate and the second optical plate positioned closest to the boundary-proximity sub pixel onto the plane having a direction of a normal perpendicular to both the direction of a normal to the liquid crystal panel and a column direction of the liquid crystal panel, in the first display mode, a maximum value of brightness of image light which emits from the boundary-proximity sub pixel in the viewing direction and which passes through one of the first optical plate and the second optical plate of the optical panel is smaller than 20% of a maximum value of brightness of image light which emits in the viewing direction from a pixel that is adjacent to the boundary-proximity sub pixel with the boundary formed in the direction of rows and which passes through the same optical plate as the optical plate through which the image light emitting from the boundary-proximity sub pixel passes.

8. A display apparatus comprising the liquid crystal display device according to claim 1, wherein the display apparatus displays an image which is viewable three-dimensionally in the first display mode.

9. The liquid crystal display device according to claim 7, wherein a constant voltage is supplied to the auxiliary bus lines both in the first display mode and in the second display mode.

10. The liquid crystal display device according to claim 7, wherein the drain electrode of the input transistor disposed in the boundary-proximity sub pixel is connected to the sub pixel electrode of the boundary-proximity sub pixel via an auxiliary capacitor.

11. The liquid crystal display device according to claim 10, wherein the drain electrode of the output transistor disposed in the boundary-proximity sub pixel is connected to the sub pixel electrode of the boundary-proximity sub pixel via the auxiliary capacitor.

12. The liquid crystal display device according to claim 7, further comprising:
 a first auxiliary capacitor bus line and a second auxiliary capacitor bus line, which is insulated from the first auxiliary capacitor bus line, wherein:
  the sub pixel electrode of the boundary-proximity sub pixel is connected to the first auxiliary capacitor bus line via a first auxiliary capacitor;
  the sub pixel electrodes of the sub pixels other than the boundary-proximity sub pixel are connected to the second auxiliary capacitor bus line via a second auxiliary capacitor;
  in the second display mode, an auxiliary capacitor signal is supplied to the first auxiliary capacitor bus line, and an auxiliary capacitor signal is supplied to the second auxiliary capacitor bus line, waveforms of the auxiliary capacitor signals supplied to the first and second auxiliary capacitor bus lines being opposite to each other; and
  in the first display mode, an auxiliary capacitor signal having a constant voltage level is supplied to the first auxiliary capacitor bus line and the second auxiliary capacitor bus line.

13. The liquid crystal display device according to claim 7, wherein:
 the auxiliary bus lines include a first auxiliary capacitor bus line and a second auxiliary capacitor bus line, which is insulated from the first auxiliary capacitor bus line;
 the source electrode of the output transistor is connected to the first auxiliary capacitor bus line;
 the sub pixel electrode of the boundary-proximity sub pixel is connected to the first auxiliary capacitor bus line via a first auxiliary capacitor;
 the sub pixel electrodes of the sub pixels other than the boundary-proximity sub pixel are connected to the second auxiliary capacitor bus line via a second auxiliary capacitor;
 in the second display mode, an auxiliary capacitor signal is supplied to the first auxiliary capacitor bus line, and an auxiliary capacitor signal is supplied to the second auxiliary capacitor bus line, waveforms of the auxiliary capacitor signals supplied to the first and second auxiliary capacitor bus lines being opposite to each other; and
 in the first display mode, an auxiliary capacitor signal having a constant voltage level is supplied to the first auxiliary capacitor bus line and the second auxiliary capacitor bus line.

14. A display apparatus comprising the liquid crystal display device according to claim 7, wherein the display apparatus displays an image which is viewable three-dimensionally in the first display mode.

* * * * *